(12) United States Patent
Tie et al.

(10) Patent No.: US 12,526,157 B2
(45) Date of Patent: Jan. 13, 2026

(54) IDENTITY AUTHENTICATION METHOD AND APPARATUS, AND DEVICE, CHIP, STORAGE MEDIUM AND PROGRAM

(71) Applicant: CHINA IWNCOMM CO., LTD., Shaanxi (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Xiang Yan, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 288 days.

(21) Appl. No.: 18/259,292

(22) PCT Filed: Dec. 21, 2021

(86) PCT No.: PCT/CN2021/139997
§ 371 (c)(1),
(2) Date: Jun. 26, 2023

(87) PCT Pub. No.: WO2022/135377
PCT Pub. Date: Jun. 30, 2022

(65) Prior Publication Data
US 2024/0064024 A1   Feb. 22, 2024

(30) Foreign Application Priority Data
Dec. 26, 2020   (CN) .......................... 202011569233.5

(51) Int. Cl.
*H04L 29/06* (2006.01)
*H04L 9/08* (2006.01)
*H04L 9/32* (2006.01)

(52) U.S. Cl.
CPC .......... *H04L 9/3247* (2013.01); *H04L 9/0825* (2013.01); *H04L 9/0869* (2013.01); *H04L 9/3265* (2013.01)

(58) Field of Classification Search
CPC ... H04L 9/3247; H04L 9/0825; H04L 9/0869; H04L 9/3265; H04L 9/0847;
(Continued)

(56) References Cited

U.S. PATENT DOCUMENTS 8,689,283 B2   4/2014  Tie
9,450,756 B2   9/2016  Du
(Continued)

FOREIGN PATENT DOCUMENTS

CN   101631113 A     1/2010
CN   101795281 A  *  8/2010  ............. G06F 63/08
(Continued)

OTHER PUBLICATIONS

Sandeep K. Sood, & others, A secure dynamic identity based authentication protocol for multi-server architecture, Journal of Network and Computer Applications, vol. 34, Issue 2, Mar. 2011, pp. 609-618. (Year: 2011).*
(Continued)

*Primary Examiner* — Sher A Khan
(74) *Attorney, Agent, or Firm* — Cooper Legal Group, LLC

(57) ABSTRACT

Disclosed in the present application are an identity authentication method and apparatus, and a device, a chip, a storage medium and a program. The identity information of a requesting device is confidentially processed to prevent the identity information of the requesting device from being exposed during transmission, thereby ensuring that an attacker cannot obtain the private information of the requesting device. In addition, by introducing an authentication
(Continued)

server, real-time two-way identity authentication between the requesting device and an authentication access controller is achieved while ensuring the confidentiality of entity identity-related information.

21 Claims, 13 Drawing Sheets

(58) Field of Classification Search
CPC ............... H04L 9/3263; H04L 63/0442; H04L 63/0892; H04L 63/123; H04L 63/0823; H04L 9/0841; H04L 9/085; H04L 9/3228; H04L 9/3242; H04L 63/0435; H04L 63/0869; H04W 12/037; H04W 12/069
See application file for complete search history.

(56) References Cited

U.S. PATENT DOCUMENTS

| | | | | |
|---|---|---|---|---|
| 10,291,614 | B2* | 5/2019 | Du | H04L 9/3247 |
| 11,323,276 | B2* | 5/2022 | Le Saint | H04L 9/3268 |
| 2009/0144541 | A1* | 6/2009 | Kim | H04L 9/321 |
| | | | | 717/178 |
| 2011/0055561 | A1 | 3/2011 | Lai | |
| 2012/0151554 | A1 | 6/2012 | Tie | |
| 2013/0205374 | A1* | 8/2013 | Du | H04L 63/08 |
| | | | | 726/4 |
| 2013/0212390 | A1* | 8/2013 | Du | H04L 9/3271 |
| | | | | 713/168 |
| 2014/0064480 | A1* | 3/2014 | Hartley | H04L 9/0877 |
| | | | | 380/30 |
| 2014/0241527 | A1* | 8/2014 | Nagai | H04N 21/4181 |
| | | | | 380/277 |
| 2017/0063843 | A1 | 3/2017 | Kumaran | |
| 2017/0201499 | A1* | 7/2017 | McLaughlin | H04W 12/122 |
| 2017/0208464 | A1* | 7/2017 | Guertler | G06Q 20/40145 |
| 2018/0351941 | A1* | 12/2018 | Chhabra | H04L 63/08 |
| 2018/0359231 | A1* | 12/2018 | Vemulapalli | H04L 9/3242 |
| 2019/0245844 | A1 | 8/2019 | Kumaran | |
| 2020/0052905 | A1* | 2/2020 | Mathias | H04L 9/0861 |
| 2021/0152546 | A1 | 5/2021 | Kumaran | |
| 2023/0032116 | A1 | 2/2023 | Kumaran | |
| 2023/0388279 | A1* | 11/2023 | Zheng | H04L 9/3247 |

FOREIGN PATENT DOCUMENTS

| | | | | | |
|---|---|---|---|---|---|
| CN | 102014386 | A | | 4/2011 | |
| CN | 102202065 | A | | 9/2011 | |
| CN | 105723425 | A | * | 6/2016 | ............... G07C 9/29 |
| CN | 104506534 | B | * | 11/2017 | |
| CN | 109462484 | A | * | 3/2019 | ............ H04L 9/3236 |
| CN | 105991650 | B | * | 9/2019 | .............. H04L 63/08 |
| CN | 113743939 | A | * | 12/2021 | ......... G06Q 20/4014 |
| DE | 102014204252 | A1 | * | 9/2015 | .............. H04L 9/006 |
| JP | 2004151886 | A | * | 5/2004 | |
| WO | WO-2012048552 | A1 | * | 4/2012 | ............ H04L 63/08 |
| WO | WO-2017004470 | A1 | * | 1/2017 | ............ H04L 9/3265 |
| WO | WO-2022135376 | A1 | * | 6/2022 | ......... H04L 63/0414 |
| WO | WO-2022135399 | A1 | * | 6/2022 | ............ H04L 63/08 |

OTHER PUBLICATIONS

International Search Report in the international application No. PCT/CN2021/139997, mailed on Mar. 9, 2022, 2 pages.
English translation of the Written Opinion of the International Search Authority in the international application No. PCT/CN2021/139997, mailed on Mar. 9, 2022, 5 pages.
Supplementary European Search Report in the European application No. 21909373.9, mailed on Apr. 22, 2024, 6 pages.

* cited by examiner

IDENTITY AUTHENTICATION METHOD AND APPARATUS, AND DEVICE, CHIP, STORAGE MEDIUM AND PROGRAM

CROSS-REFERENCE TO RELATED APPLICATION

This application claims priority to Chinese Patent Application No. 202011569233.5, filed on Dec. 26, 2020 and entitled "IDENTITY AUTHENTICATION METHOD AND APPARATUS, AND DEVICE, CHIP, STORAGE MEDIUM AND PROGRAM", the disclosure of which is hereby incorporated by reference in its entirety.

TECHNICAL FIELD

The present application relates to the field of network communication security technologies, and in particular, to an identity authentication method and apparatus, and a device, a chip, a storage medium and a program.

BACKGROUND

In a communication network, a Requester (REQ) may access a network through an Authentication Access Controller (AAC). In some cases requiring high security, the AAC needs to perform authentication on the identity of the REQ, and the REQ also needs to perform authentication on the identity of the AAC, so as to ensure that the REQ accessing the network belongs to a legal user, and the network to which the REQ accesses belongs to a legal network. In addition, for node-to-node transmission in a blockchain technology, a trust relationship also needs to be established between different nodes, such that it is also very important for identity authentication for the nodes.

During the process of performing Mutual Identity Authentication (MIA) between the REQ and the AAC, both the REQ and the AAC need to provide self-identity information for identity authentication. However, such identity information usually carries private and sensitive information, such as ID numbers, home addresses, bank card information, geographical location information, and affiliated institution information. In addition, during a practical application process, identity information of the REQ and identity information of the AAC are generally included in a physical digital certificate, and the digital certificate is used as a physical identity certificate.

If, during MIA of the REQ and the AAC, the identity information of the REQ or the AAC is intercepted by an attacker for illegal use, a great security risk is caused to the AAC, the REQ and the network.

SUMMARY

The present application provides an identity authentication method and apparatus, and a device, a chip, a storage medium and a program. By means of involving an authentication server, MIA between the AAC and the REQ is achieved while the confidentiality of entity identity related information is guaranteed.

According to a first aspect, an embodiment of the present application provides an identity authentication method. The method includes the following operations.

An AAC acquires an identity ciphertext message sent by an REQ. The identity ciphertext message includes identity information ciphertext of the REQ, and the identity information ciphertext is generated by encrypting, using a public key of an encryption certificate, to-be-encrypted data including a digital certificate of the REQ and a second key.

The AAC sends a first authentication request message to a first Authentication Server (AS) which is trusted by the AAC. The first authentication request message includes the identity information ciphertext of the REQ and a digital certificate of the AAC.

The AAC receives a first authentication response message sent by the first AS. The first authentication response message includes first authentication result information, a first digital signature, second authentication result information ciphertext and a second digital signature. The first authentication result information includes a first verification result for the digital certificate of the AAC. The first digital signature is a digital signature which is generated by a second AS trusted by the REQ performing calculation on to-be-signed data including the first authentication result information. The second authentication result information ciphertext is obtained by encrypting, using the second key, information including second authentication result information. The second authentication result information includes a second verification result for the digital certificate of the REQ; and the second digital signature is a digital signature which is generated by the first AS performing calculation on to-be-signed data including the second authentication result information ciphertext.

The AAC verifies the second digital signature by using a public key of the first AS. If the verification of the second digital signature is successful, the AAC sends a third authentication response message to the REQ. The third authentication response message includes authentication result information ciphertext. The authentication result information ciphertext is generated by encrypting, using a message encryption key, to-be-encrypted data including the first authentication result information and the first digital signature.

The REQ decrypts the authentication result information ciphertext using the message encryption key, so as to obtain the first authentication result information and the first digital signature.

The REQ verifies the first digital signature by using a public key of the second AS. If the verification is successful, the REQ determines an identity authentication result of the AAC according to an first verification result in the first authentication result information. If the REQ determines that the identity authentication result of the AAC is legal, the REQ sends a fourth authentication response message to the AAC.

Or the REQ verifies the first digital signature by using the public key of the second AS If the verification is successful, the REQ sends the fourth authentication response message to the AAC, and determines the identity authentication result of the AAC according to the first verification result in the first authentication result information.

Or the REQ verifies the first digital signature by using the public key of the second AS. If the verification of the first digital signature is successful, the REQ determines the identity authentication result of the AAC according to the first verification result in the first authentication result information; and the REQ sends the fourth authentication response message to the AAC.

The fourth authentication response message includes second key ciphertext, and the second key ciphertext is obtained by encrypting, using the message encryption key, information including the second key.

After receiving the fourth authentication response message, the AAC decrypts the second key ciphertext using the message encryption key, so as to obtain the second key, decrypts the second authentication result information ciphertext using the second key, so as to obtain the second authentication result information, and determines an identity authentication result of the REQ according to the second verification result in the second authentication result information.

According to a second aspect, an embodiment of the present application provides an AAC. The AAC includes an acquisition portion, a first sending portion, a first receiving portion, a first verification portion, a second sending portion, a second receiving portion, a decryption portion, and a first determination portion.

The acquisition portion is configured to acquire an identity ciphertext message sent by an REQ. The identity ciphertext message includes identity information ciphertext of the REQ, and the identity information ciphertext is generated by encrypting, using a public key of an encryption certificate, to-be-encrypted data including a digital certificate of the REQ and a second key.

The first sending portion is configured to send a first authentication request message to a first AS which is trusted by the AAC. The first authentication request message includes the identity information ciphertext of the REQ and a digital certificate of the AAC.

The first receiving portion is configured to receive a first authentication response message sent by the first AS. The first authentication response message includes first authentication result information, a first digital signature, second authentication result information ciphertext and a second digital signature; the first authentication result information includes a first verification result for the digital certificate of the AAC; the first digital signature is a digital signature which is generated by a second AS trusted by the REQ performing calculation on to-be-signed data including the first authentication result information; the second authentication result information ciphertext is obtained by encrypting, using the second key, information including second authentication result information: the second authentication result information includes a second verification result for the digital certificate of the REQ; and the second digital signature is a digital signature which is generated by the first AS performing calculation on to-be-signed data including the second authentication result information ciphertext.

The first verification portion is configured to verify the second digital signature by using a public key of a first AS.

The second sending portion is configured to send a third authentication response message to the REQ when the verification of the second digital signature is successful. The third authentication response message includes authentication result information ciphertext; and the authentication result information ciphertext is generated by encrypting, using a message encryption key, to-be-encrypted data including the first authentication result information and the first digital signature.

The second receiving portion is configured to receive a fourth authentication response message sent by the REQ. The fourth authentication response message includes second key ciphertext; and the second key ciphertext is obtained by encrypting, using the message encryption key, information including the second key.

The decryption portion is configured to decrypt the second key ciphertext using the message encryption key, so as to obtain the second key, and decrypt the second authentication result information ciphertext using the second key, so as to obtain the second authentication result information.

The first determination portion is configured to determine an identity authentication result of the REQ according to the second verification result in the second authentication result information.

According to a third aspect, an embodiment of the present application provides an REQ. The REQ includes a first sending portion, a first receiving portion, a first decryption portion, and a first verification portion.

The first sending portion is configured to send an identity ciphertext message to an AAC. The identity ciphertext message includes identity information ciphertext of the REQ; and the identity information ciphertext is generated by encrypting, using a public key of an encryption certificate, to-be-encrypted data including a digital certificate of the REQ and a second key.

The first receiving portion is configured to receive a third authentication response message sent by the AAC. The third authentication response message includes authentication result information ciphertext; and the authentication result information ciphertext is generated by encrypting, using a message encryption key, to-be-encrypted data including the first authentication result information and the first digital signature.

The first decryption portion is configured to decrypt, using the message encryption key, the authentication result information ciphertext, so as to obtain the first authentication result information and the first digital signature.

The first verification portion is configured to verify the first digital signature by using a public key of the second AS. The first determination portion is further configured to determine an identity authentication result of the AAC according to the first verification result in the first authentication result information if the verification of the first digital signature is successful, and the second sending portion is further configured to send a fourth authentication response message to the AAC when the first determination portion determines that the identity authentication result of the AAC is legal.

Or the first verification portion is configured to verify the first digital signature by using the public key of the second AS. The second sending portion is further configured to send the fourth authentication response message to the AAC if the verification of the first digital signature is successful, and the first determination portion is further configured to determine the identity authentication result of the AAC according to the first verification result in the first authentication result information.

Or the first verification portion is configured to verify the first digital signature by using the public key of the second AS, the first determination portion is further configured to determine the identity authentication result of the AAC according to the first verification result in the first authentication result information if the verification of the first digital signature is successful; and the second sending portion is further configured to send a fourth authentication response message to the AAC.

The fourth authentication response message includes second key ciphertext, and the second key ciphertext is obtained by encrypting, using the message encryption key, information including the second key.

According to a fourth aspect, an embodiment of the present application provides a first Authentication Server (AS). The first AS is an AS trusted by an AAC, and includes a first receiving portion and a first sending portion.

The first receiving portion is configured to receive a first authentication request message sent by the AAC. The first authentication request message includes identity information ciphertext of an REQ and a digital certificate of the AAC, and the identity information ciphertext is generated by encrypting, using a public key of an encryption certificate, to-be-encrypted data including a digital certificate of the REQ and a second key.

The first sending portion is configured to send a first authentication response message to the AAC. The first authentication response message includes first authentication result information, a first digital signature, second authentication result information ciphertext and a second digital signature; the first authentication result information includes a first verification result for the digital certificate of the AAC; the first digital signature is a digital signature which is generated by a second AS trusted by the REQ performing calculation on to-be-signed data including the first authentication result information; the second authentication result information ciphertext is obtained by encrypting, using the second key, information including second authentication result information; the second authentication result information includes a second verification result for the digital certificate of the REQ; and the second digital signature is a digital signature which is generated by the first AS performing calculation on to-be-signed data including the second authentication result information ciphertext.

According to a fifth aspect, an embodiment of the present application provides a second Authentication Server (AS). The second AS is an AS trusted by an REQ. In a case that a first AS trusted by an AAC and the second AS trusted by the REQ are two different ASs, the second AS includes a receiving portion, a verification portion, a decryption portion, a generation portion, and a sending portion.

The receiving portion is configured to receive a second authentication request message sent by the first AS. The second authentication request message includes first authentication result information, identity information ciphertext of the REQ, and a third digital signature; the third digital signature is a digital signature, which is generated by the first AS performing calculation on to-be-signed data including the first authentication result information and the identity information ciphertext of the REQ; and the identity information ciphertext is generated by encrypting, using a public key of an encryption certificate, to-be-encrypted data including a digital certificate of the REQ and a second key.

The verification portion is configured to verify the third digital signature by using a public key of the first AS.

The decryption portion is configured to decrypt the identity information ciphertext of the REQ by using the private key corresponding to the encryption certificate when the verification of the third digital signature is successful, so as to obtain the digital certificate of the REQ and the second key.

The verification portion is further configured to perform legality verification on the digital certificate of the REQ, so as to obtain a second verification result.

The generation portion is configured to generate a second authentication result information according to information including the second verification result, generate second authentication result information ciphertext by encrypting, using the second key, information including the second authentication result information, generate a first digital signature by performing calculation on to-be-signed data including the first authentication result information, and generate a fourth digital signature by performing calculation on to-be-signed data including the second authentication result information ciphertext to.

The sending portion is configured to send a second authentication response message to the first AS. The second authentication response message includes the first authentication result information, the first digital signature, the second authentication result information ciphertext, and the fourth digital signature.

According to a sixth aspect, an embodiment of the present application provides an AAC. The AAC includes a processor and a memory. The memory is configured to store a computer program; and the processor is configured to call and run the computer program stored in the memory, so as to execute steps, which are executed by the AAC in the identity authentication method as described in the first aspect.

According to a seventh aspect, an embodiment of the present application provides an REQ. The REQ includes a processor and a memory. The memory is configured to store a computer program; and the processor is configured to call and run the computer program stored in the memory, so as to execute steps, which are executed by the REQ in the identity authentication method as described in the first aspect.

According to an eighth aspect, an embodiment of the present application provides a first AS. The first AS is an AS trusted by an AAC, and includes a processor and a memory. The memory is configured to store a computer program; and the processor is configured to call and run the computer program stored in the memory, so as to execute steps, which are executed by the first AS in the identity authentication method as described in the first aspect.

According to a ninth aspect, an embodiment of the present application provides a second AS. The second AS is an AS trusted by an REQ. If a first AS trusted by an AAC and the second AS trusted by the REQ are two different ASs, the second AS includes a processor and a memory. The memory is configured to store a computer program; and the processor is configured to call and run the computer program stored in the memory, so as to execute steps, which are executed by the second AS in the identity authentication method as described in the first aspect.

According to a tenth aspect, an embodiment of the present application provides a chip. The chip includes: a processor, configured to call and run a computer program from a memory, to enable:
- an AAC having the chip mounted to execute steps, which are executed by the AAC in the identity authentication method as described in the first aspect.
- or an REQ having the chip mounted to execute steps, which are executed by the REQ in the identity authentication method as described in the first aspect.
- or a first AS having the chip mounted to execute steps, which are executed by the AS-AAC in the identity authentication method as described in the first aspect.
- or a second AS having the chip mounted to execute steps, which are executed by the AS-REQ in the identity authentication method as described in the first aspect.

According to an eleventh aspect, an embodiment of the present application provides a computer storage medium. The computer storage medium is configured to store a computer program. The computer program enables an AAC to execute steps, which are executed by the AAC in the identity authentication method as described in the first aspect.

Or the computer program enables an REQ to execute steps, which are executed by the REQ in the identity authentication method as described in the first aspect.

Or the computer program enables a first AS to execute steps, which are executed by the AS-AAC in the identity authentication method as described in the first aspect.

Or the computer program enables a second AS to execute steps, which are executed by the second AS in the identity authentication method as described in the first aspect.

According to a twelfth aspect, an embodiment of the present application provides a computer program. The computer program enables an AAC to execute steps, which are executed by the AAC in the identity authentication method as described in the first aspect.

Or the computer program enables an REQ to execute steps, which are executed by the REQ in the identity authentication method as described in the first aspect.

Or the computer program enables a first AS to execute steps, which are executed by the AS-AAC in the identity authentication method as described in the first aspect.

Or the computer program enabling a second AS to execute steps, which are executed by the second AS in the identity authentication method as described in the first aspect.

From the above technical solutions, it can be seen that, identify information of the REQ is subjected to confidential processing during identity authentication, and when the identify information is transmitted between the REQ and the AAC, the identify information of the AAC is subjected to confidential processing, so as to prevent the identify information of the REQ and the AAC from being exposed during a transmission process, thereby ensuring that an attacker cannot obtain private and sensitive information. Moreover, by means of involving an authentication server, real-time mutual identity authentication between the REQ and the AAC is achieved while the confidentiality of entity identity related information is guaranteed, such that the foundation that only a legal user can access a legal network is laid.

In order to make the above purposes, features and advantages of the present disclosure more obvious and easier to understand, detailed descriptions of preferred embodiments are made below with reference to the drawings.

BRIEF DESCRIPTION OF THE DRAWINGS

In order to more clearly illustrate the embodiments of the present application or the technical solutions in the related art, the drawings used in the description of the embodiments or the related art will be briefly described below. It is apparent that the drawings in the following descriptions are merely some embodiments of the present application. Other drawings can be obtained from those skilled in the art according to these drawings without any creative work.

DETAILED DESCRIPTION

Figure 1:
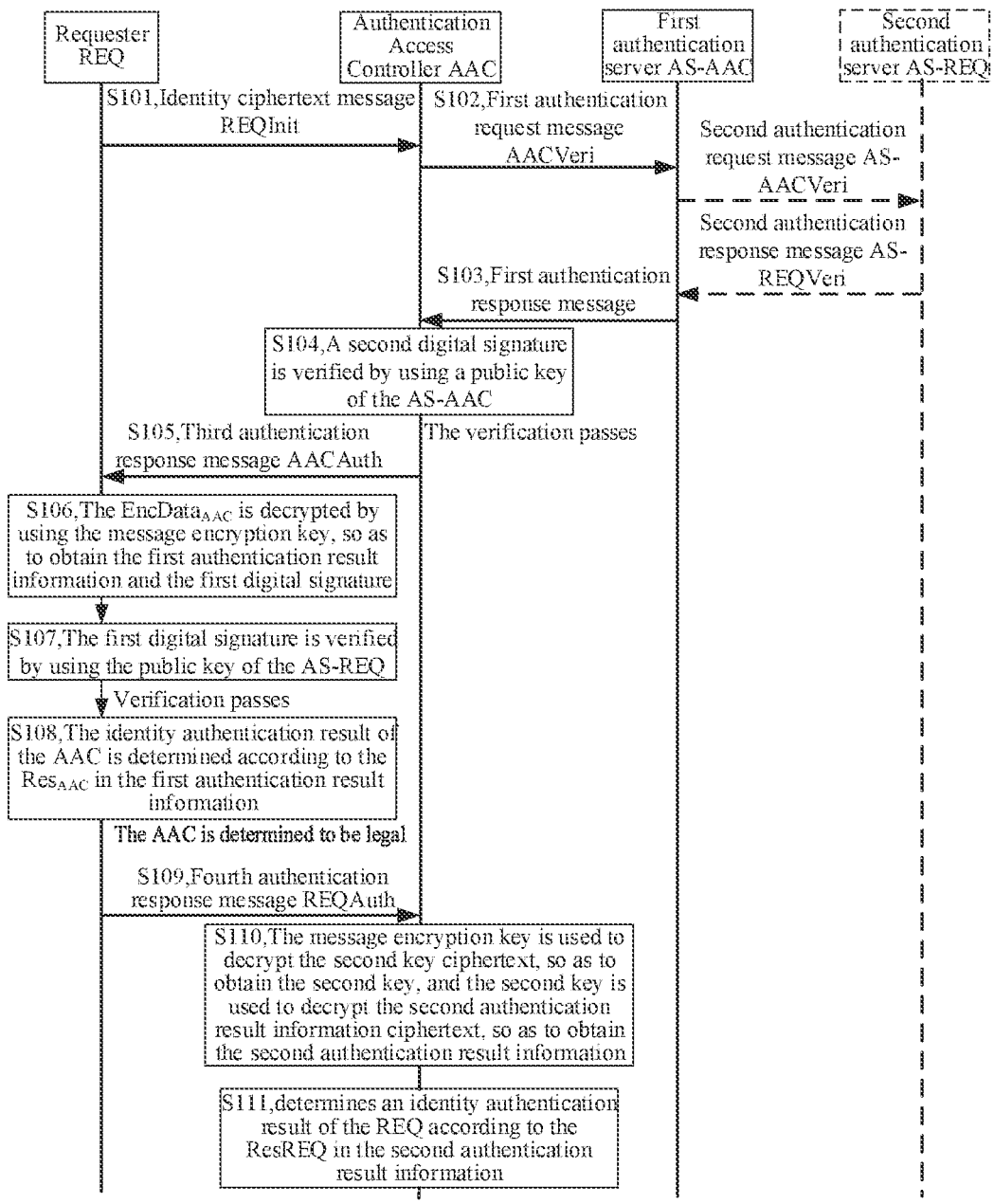
FIG. 1 is a schematic diagram of an identity authentication method according to an embodiment of the present application.

The technical solutions in the embodiments of the present application will be described below with reference to the drawings in the embodiments of the present application. It is apparent that the described embodiments are only part of the embodiments of the present application, not all the embodiments. All other embodiments obtained by those of ordinary skill in the art on the basis of the embodiments in the present application without creative work all fall within the scope of protection of the present application.

The technical solutions described in the embodiments of the present application may be arbitrarily combined without conflict.

In a communication network, an REQ may access a network through an AAC. In order to ensure that the REQ accessing the network belongs to a legal user, the AAC needs to perform identity authentication on the REQ. Likewise, in order to ensure that the network which is accessed by the REQ belongs to a legal network, the REQ also needs to perform identity authentication on the AAC.

By using a current wireless communication and mobile communication scenario as an example, in a scenario that the REQ accesses a wireless network through the AAC, the REQ may be a terminal device such as a mobile phone, a Personal Digital Assistant (PDA) and a tablet computer, and the AAC may be a network-side device such as a wireless access node and a wireless router. In a scenario that the REQ accesses a wired network through the AAC, the REQ may be the terminal device such as a desktop computer and a notebook computer; and the AAC may be the network-side device such as a switch or a router. In a scenario that the REQ accesses a 4th/5th Generation mobile communication technology (4G/5G) network through the AAC, the REQ may be the terminal device such as the mobile phone and the tablet computer, and the AAC may be the network-side device such as a base station. Definitely, the present application is also suitable for various data communication scenarios such as other wired networks and short-range communication networks.

However, during the process of performing MIA between the REQ and the AAC, both the REQ and the AAC need to provide self-identity information for identity authentication. The identity information may generally be included in a physical digital certificate, and usually carries private and sensitive information. If, during identity authentication, the identity information is intercepted by an attacker for illegal use, a great security risk is caused to the AAC, the REQ and even the network.

In order to solve the above technical problems, an embodiment of the present application provides an identity authentication method. The method includes the following operations. An AAC acquires an identity ciphertext message sent by an REQ, where the identity ciphertext message includes identity information ciphertext of the REQ, and the identity information ciphertext is generated by using a public key of an encryption certificate to encrypt to-be-encrypted data including a digital certificate of the REQ and a second key; The AAC sends a first authentication request message to a first AS which is trusted by the AAC, where the first authentication request message includes the identity information ciphertext of the REQ and a digital certificate of the AAC. The AAC receives a first authentication response message sent by the first AS, where the first authentication response message includes first authentication result information, a first digital signature, second authentication result information ciphertext and a second digital signature, the first authentication result information includes a first verification result for the digital certificate of the AAC, the first digital signature is a digital signature which is generated by performing calculation on, by a second AS trusted by the REQ, to-be-signed data including the first authentication result information, the second authentication result information ciphertext is obtained by using the second key to encrypt information including second authentication result information, and the second digital signature is a digital signature which is generated by performing calculation on, by the first AS, to-be-signed data including the second authentication result information ciphertext. The AAC verifies the second digital signature by using a public key of the first AS, and sends a third authentication response message to the REQ if the verification is successful, where the third authentication response message includes authentication result information ciphertext; and the authentication result information ciphertext is generated by using a message encryption key to encrypt to-be-encrypted data including the first authentication result information and the first digital signature. The REQ uses the message encryption key to decrypt the authentication result information ciphertext, so as to obtain the first authentication result information and the first digital signature, verifies the first digital signature by using the public key of the second AS, and if the verification is successful, determines the identity authentication result of the AAC according to the first verification result in the first authentication result information; when determining that the AAC is legal, the REQ sends a fourth authentication response message to the AAC, where the fourth authentication response message includes second key ciphertext, and the second key ciphertext is obtained by using the message encryption key to encrypt information including the second key. The AAC uses the message encryption key to decrypt the second key ciphertext, so as to obtain the second key, uses the second key to decrypt the second authentication result information ciphertext, so as to obtain the second authentication result information, and determines an identity authentication result of the REQ according to the second verification result in the second authentication result information.

It is understandable that, the first authentication result information in this embodiment of the present application is obtained by performing, by the AS-AAC trusted by the AAC, legality verification on the digital certificate of the AAC; the second authentication result information is obtained by performing, by the AS-REQ trusted by the REQ, legality verification on the digital certificate of the REQ. The AS-AAC and the AS-REQ may be two independent servers for identity authentication, or the same server for identity authentication. The above are only some examples of the REQ, the AAC and AS, and shall not be understood as limitations to the REQ, the AAC and the AS. In other possible implementations of the embodiments of the present application, the REQ, the AAC and the AS may be other devices.

The identity authentication method provided in the embodiments of the present application is to implement MIA between the REQ and the AAC.

For ease of introduction, in the embodiments of the present application, the identity authentication method of the present application is introduced by using the REQ, the AAC and the AS as examples.

The AS trusted by the AAC is called the AS-AAC, and the AS trusted by the REQ is called the AS-REQ. The AS-AAC has the capability of verifying the legality of the digital certificate of the AAC; and the AS-AAC holds the digital certificate complying with regulations of ISO/IEC 9594-8/ITU X.509, other standards or other technical systems, and a private key corresponding to the digital certificate. The AS-REQ has the capability of verifying the legality of the digital certificate of the REQ; and the AS-REQ holds the digital certificate complying with regulations of ISO/IEC 9594-8/ITU X.509, other standards or other technical systems, and a private key corresponding to the digital certificate. A Certificate Sever-Decrypt (CS-DEC) holds an encryption certificate complying with regulations of ISO/IEC 9594-8/ITU X.509, other standards or other technical systems, and a private key corresponding to the encryption certificate. The AS-AAC and the AS-REQ have the capability of transmitting the digital certificate to other ASs for verification, and also have the capability of transmitting verification result information of the digital certificate to other ASs. When the AS-AAC is different from the AS-REQ, the AS-AAC and the AS-REQ are trusted with each other, and know each other's digital certificate or the public key in the digital certificate.

The REQ may be an endpoint involved in the identity authentication process, establishes a connection with the AAC, so as to access services provided by the AAC, and accesses the AS through the AAC. The REQ holds a digital certificate complying with regulations of ISO/IEC 9594-8/ITU X.509, other standards or other technical systems, and a private key corresponding to the digital certificate, knows a digital certificate of the AS-REQ or a public key in AS-REQ's digital certificate, and knows a encryption certificate of the CS-DEC or a public key in the encryption certificate. The CS-DEC may be an independent server, or may reside in the AS-REQ. The AAC may be the other endpoint involved in the identity authentication process, establishes a connection with the REQ, so as to provide services, communicates with the REQ, and may directly access the AS-AAC. The AAC holds a digital certificate complying with regulations of ISO/IEC 9594-8/ITU X.509, other standards or other technical systems, and a private key corresponding to the digital certificate, and knows the digital certificate of the AS-AAC or the public key in AS-AAC's digital certificate.

In combination with FIG. 1, an identity authentication method provided in the embodiments of the present application is described below. The method includes the following operations.

At S101, an AAC acquires an identity ciphertext message REQInit sent by a REQ.

The REQInit includes identity information ciphertext $EncPub_{AS}$ of the REQ. The $EncPub_{AS}$ is generated by the REQ using a public key of an encryption certificate of the CS-DEC to encrypt to-be-encrypted data including the digital certificate $Cert_{REQ}$ of the REQ and a second key. Therefore, during the identity authentication process, the identity information of the REQ is subjected to confidential processing, so as to prevent the identity information of the REQ from being exposed during transmission. In the present application, an object to be encrypted is called the to-be-encrypted data.

At S102, the AAC sends a first authentication request message AACVeri to an AS-AAC trusted by the AAC.

The AACVeri includes the digital certificate $Cert_{AAC}$ of the AAC and the $EncPub_{AS}$.

At S103, the AAC receives a first authentication response message ASVeri sent by the AS-AAC.

The ASVeri includes a first authentication result information, a first digital signature, a second authentication result information ciphertext and a second digital signature. The first authentication result information includes a first verification result $Res_{AAC}$ for the $Cert_{AAC}$. The first digital signature is a digital signature which is generated by an AS-REQ trusted by the REQ performing calculation on to-be-signed data including the first authentication result information. The second authentication result information ciphertext is obtained by using the second key to encrypt information including second authentication result information. The second authentication result information includes a second verification result $Res_{REQ}$ for the $Cert_{REQ}$. The second digital signature is a digital signature which is generated by the AS-AAC performing calculation on to-be-signed data including the second authentication result information ciphertext. In the present application, an object to be signed is called the to-be-signed data.

It is to be noted that, if the AS-REQ trusted by the REQ and the AS-AAC trusted by the AAC are the same AS, that is, the REQ and the AAC commonly trust the same AS, in this case, the AS commonly trusted by the REQ and the AAC may be represented by the AS-AAC (or the AS-REQ). In this case, the AS-AAC (or the AS-REQ) may be used to perform legality verification on the $Cert_{AAC}$ to obtain the $Res_{AAC}$, and perform legality verification on the $Cert_{REQ}$ obtained by decrypting the $EncPub_{AS}$, so as to obtain the $Res_{REQ}$. The AS-AAC (or the AS-REQ) may decrypt the $EncPub_{AS}$ by using the private key corresponding to the encryption certificate of the CS-DEC resided in the AS-AAC (or the AS-REQ), or the AS-AAC (or the AS-REQ) may send the $EncPub_{AS}$ to the CS-DEC having an interaction and trust relationship with the AS-AAC (or the AS-REQ) for decryption, and acquire the $Cert_{REQ}$ obtained by means of decryption. Then, the AS-AAC (or the AS-REQ) may generate the first authentication result information according to the information including the $Res_{AAC}$, generate the second authentication result information according to the information including the $Res_{REQ}$, use the second key obtained by decrypting the $EncPub_{AS}$ to encrypt the information including the second authentication result information, so as to generate the second authentication result information ciphertext, perform calculation on the to-be-signed data including the first authentication result information to generate the first digital signature $Sig_{AS\_AAC1}$ (or $Sig_{AS\_REQ1}$), perform calculation on the to-be-signed data including the second authentication result information ciphertext to generate the second digital signature $Sig_{AS\_AAC2}$ (or $Sig_{AS\_REQ2}$), and generate the first authentication response message ASVeri according to the information including the first authentication result information, the first digital signature $Sig_{AS\_AAC1}$ (or $Sig_{AS\_REQ1}$), the second authentication result information ciphertext, and the second digital signature $Sig_{AS\_AAC2}$ (or $Sig_{AS\_REQ2}$).

If the AS-REQ trusted by the REQ and the AS-AAC trusted by the AAC are two different ASs, the AS-AAC performs legality verification on the $Cert_{AAC}$ to obtain the $Res_{AAC}$, and the AS-REQ performs legality verification on the $Cert_{REQ}$ obtained by decrypting the $EncPub_{AS}$, so as to obtain the $Res_{REQ}$. Therefore, after generating the first authentication result information, the AS-AAC sends a second authentication request message AS-AACVeri to the AS-REQ. The AS-AACVeri includes the first authentication result information, the $EncPub_{AS}$, and a third digital signature $Sig_{AS\_AAC3}$. The $Sig_{AS\_AAC3}$ is generated by the AS-AAC performing calculation for to-be-signed data including the first authentication result information and the $EncPub_{AS}$. The AS-REQ verifies the $Sig_{AS\_AAC3}$ by using the public key of the AS-AAC; if the verification is successful, the AS-REQ performs legality verification on the $Cert_{REQ}$ obtained by decrypting the $EncPub_{AS}$, so as to obtain the $Res_{REQ}$, and generates the second authentication result information according to the information including the $Res_{REQ}$. The AS-REQ decrypts the $EncPub_{AS}$ by using the private key corresponding to the encryption certificate of the CS-DEC resided in the AS-REQ; or the AS-REQ may send the $EncPub_{AS}$ to the CS-DEC having an interaction and trust relationship with the AS-REQ for decryption, and acquire the $Cert_{REQ}$ obtained by means of decryption. The AS-REQ uses the second key obtained by decrypting the $EncPub_{AS}$ to encrypt the information including the second authentication result information, so as to generate the second authentication result information ciphertext, and sends the second authentication response message AS-REQVeri to the AS-AAC. The AS-REQVeri includes the first authentication result information ciphertext, the $Sig_{AS\_REQ1}$, the second authentication result information ciphertext and the $Sig_{AS\_REQ4}$. The $Sig_{AS\_REQ1}$ is generated by the AS-REQ performing calculation for the to-be-signed data including the first authentication result information; and the $Sig_{AS\_REQ4}$ is generated by the AS-REQ performing calculation on the to-be-signed data including the second authentication result information ciphertext. After receiving the AS-REQVeri, the AS-AAC verifies the $Sig_{AS\_REQ4}$ by using the public key of the AS-REQ. If the verification is successful, the AS-AAC performs calculation on the to-be-signed data including the second authentication result information ciphertext, so as to generate the $Sig_{AS\_AAC2}$, and generates the first authentication response message ASVeri according to the information including the first authentication result information, the $Sig_{AS\_REQ1}$, the second authentication result information ciphertext and the $Sig_{AS\_AAC2}$.

At S104, the AAC verifies the second digital signature by using the public key of the AS-AAC.

If the verification is successful, the AAC executes the following operations.

At S105, the AAC sends a third authentication response message AACAuth to the REQ.

The AACAuth includes authentication result information ciphertext $EncData_{AAC}$. The $EncData_{AAC}$ is generated by the AAC using the message encryption key to encrypt to-be-encrypted data including the first authentication result information and the first digital signature.

At S106, the REQ decrypts the $EncData_{AAC}$ by using the message encryption key, so as to obtain the first authentication result information and the first digital signature.

The message encryption key may be obtained by means of negotiation between the REQ and the AAC, or may be shared by the REQ and the AAC in advance. Since the AAC uses the message encryption key to encrypt the to-be-encrypted data including the first authentication result information and the first digital signature via a symmetric encryption algorithm, so as to obtain the $EncData_{AAC}$, after receiving the AACAuth, the AAC may decrypt the $EncData_{AAC}$ by using the message encryption key, so as to obtain the first authentication result information and the first digital signature.

At S107, the REQ verifies the first digital signature by using the public key of the AS-REQ.

At S108, the REQ determines the identity authentication result of the AAC according to the $Res_{AAC}$ in the first authentication result information.

At S109, the REQ sends a fourth authentication response message REQAuth to the AAC.

The REQAuth includes second key ciphertext, and the second key ciphertext is obtained by the REQ using the message encryption key to encrypt information including the second key.

It is to be noted that, the order of execution of S107 to S109 does not affect the implementation of the present application, and in practical applications, the order of execution of S107 to S109 may be set according to requirements. Preferably, it is recommended that S107 is executed first. When the verification for first digital signature by the REQ is failed, the AACAuth is discarded. When the REQ has verified the first digital signature, S108 is then executed. When the REQ determines that the AAC is legal, S109 is then executed. When the REQ determines that the AAC is illegal, the REQ determines according to a local policy, whether to execute S109. Considering the efficiency, the preferred solution is not to perform and terminate this authentication process.

At S110, the AAC uses the message encryption key to decrypt the second key ciphertext, so as to obtain the second key, and uses the second key to decrypt the second authentication result information ciphertext, so as to obtain the second authentication result information.

At S111, the AAC determines an identity authentication result of the REQ according to the $Res_{REQ}$ in the second authentication result information.

From the above technical solutions, it can be seen that, identify information of the REQ is subjected to confidential processing during authentication, and when the identify information is transmitted between the REQ and the AAC, the identify information of the AAC is subjected to confidential processing, so as to prevent the identify information of the REQ and the AAC from being exposed during a transmission process, thereby ensuring that an attacker cannot obtain private and sensitive information. Moreover, by means of involving an AS, MIA between the REQ and the AAC is achieved while the confidentiality of entity identity related information is guaranteed, such that the foundation that only a legal user can communicate with a legal network is laid.

In some embodiments, the REQInit of S101 may further include a digital signature $Sig_{REQ}$ of the REQ; and the to-be-signed data of the $Sig_{REQ}$ includes other fields before the $Sig_{REQ}$ in the REQInit. Before S111, the AAC further needs to determine whether the verification of the $Sig_{REQ}$ is successful, and S111 can only be executed when the verification is successful. It is to be noted that, if the AS-REQ and the AS-AAC are the same AS, the $Sig_{REQ}$ may be verified by the AS-AAC (which may also be represented as the AS-REQ), or may be verified by the AAC; and if the AS-REQ and the AS-AAC are two different ASs, the $Sig_{REQ}$ may be verified by the AS-REQ, or may be verified by the AAC. The AAC determines, by means of the following manners, whether the verification of the $Sig_{REQ}$ is successful in a manner including any of the following manners.

As an embodiment in which the AS verifies the $Sig_{REQ}$, in a case that the AS-REQ and the AS-AAC are the same AS (non-roaming), when the AS-AAC (which may also be represented as the AS-REQ) verifies the $Sig_{REQ}$, the $Sig_{REQ}$ may be carried in the AACVeri of S102 and transmitted to the AS-AAC (which may also be represented as the AS-REQ), and the AS-AAC (which may also be represented as the AS-REQ) verifies the $Sig_{REQ}$ by using the $Cert_{REQ}$ obtained by decrypting the $EncPub_{AS}$ in the AACVeri; if the verification is successful, steps of generating and sending the first authentication response message ASVeri, etc. are continued to be executed; and if the verification is failed, the steps of generating and sending the first authentication response message ASVeri, etc. are not executed. Therefore, the AAC may determine, according to whether the first authentication response message ASVeri can be received, whether the verification of the $Sig_{REQ}$ is successful; and if the AAC can receive the ASVeri of S103, the AAC may determine that the verification of the $Sig_{REQ}$ is successful.

As another embodiment in which the $Sig_{REQ}$ is verified by the AS, in a case that the AS-REQ and the AS-AAC are two different ASs (roaming), when the AS-REQ verifies the $Sig_{REQ}$, the $Sig_{REQ}$ may be carried in the AACVeri of S102 and the second authentication request message AS-AACVeri sent by the AS-AAC to the AS-REQ and transmitted to the AS-REQ, and the AS-REQ verifies the $Sig_{REQ}$ by using the $Cert_{REQ}$ obtained by decrypting the $EncPub_{AS}$ in the AS-AACVeri; if the verification is successful, steps of generating and sending the second authentication response message AS-REQVeri and generating and sending the subsequent ASVeri are continued to be executed; and if the verification is failed, the steps of generating and sending the AS-REQVeri and generating and sending the subsequent ASVeri are not executed. Therefore, the AAC may determine, according to whether the ASVeri can be received, whether the verification of the $Sig_{REQ}$ is successful; and if the AAC can receive the ASVeri of S103, the AAC may determine that the verification of the $Sig_{REQ}$ is successful.

As an embodiment in which the $Sig_{REQ}$ is verified by the AAC, the second authentication result information generated by the AS not only includes the $Res_{REQ}$, but also includes the $Cert_{REQ}$. After the AAC receives the REQAuth of S109, the second authentication result information obtained by using the second key to decrypt the second authentication result information ciphertext further includes the $Cert_{REQ}$ and the $Sig_{REQ}$ is verified by using the $Cert_{REQ}$ in the second authentication result information, such that whether the verification of the $Sig_{REQ}$ is successful is determined.

In some other embodiments, the REQAuth of S109 may further include a digital signature $Sig_{REQ}$ of the REQ. The to-be-signed data of the $Sig_{REQ}$ includes other fields before the $Sig_{REQ}$ in the REQAuth. In this case, in S110, the second authentication result information obtained by the AAC using the second key to decrypt the second authentication result information ciphertext further includes the $Cert_{REQ}$. Before S111, the AAC further needs to verify the $Sig_{REQ}$ by using the $Cert_{REQ}$ in the second authentication result information, to determine whether the verification of the $Sig_{REQ}$ is successful according to the verification result; and S111 can only be executed when the verification is successful.

In some embodiments, the AACVeri of S102 may further include a digital signature $Sig_{AAC}$ of the AAC. The to-be-signed data of the $Sig_{AAC}$ includes other fields before the $Sig_{AAC}$ in the AACVeri. Then before S108, the REQ further needs to determine whether the verification of the $Sig_{AAC}$ is successful, and S108 can only be executed when the verification is successful. The REQ determines whether the verification of the $Sig_{AAC}$ is successful in the following manner: the AS-AAC trusted by the AAC verifies the $Sig_{AAC}$ by using the $Cert_{AAC}$ in the AACVeri, and subsequent processes are continued to be executed after the verification is successful, such that if the REQ can receive the AACAuth of S105, the REQ determines that the verification of the $Sig_{AAC}$ has passed.

In some other embodiments, the AACAuth of S105 may further include the $Sig_{AAC}$ of the AAC. The to-be-signed data of the $Sig_{AAC}$ includes other fields before the $Sig_{AAC}$ in the AACAuth. Correspondingly, in the AACAuth, the first authentication result information in the to-be-encrypted data of the $EncData_{AAC}$ further includes the $Cert_{AAC}$. Then before S108, the REQ further needs to determine whether the verification of the $Sig_{AAC}$ is successful, and S108 can only be executed when the verification is successful. The REQ determines whether the verification of the $Sig_{AAC}$ is successful in the following manner: The REQ verifies the $Sig_{AAC}$ by using the $Cert_{AAC}$ in the first authentication result information that is obtained by decrypting the $EncData_{AAC}$, to determine whether the verification of the $Sig_{AAC}$ is successful according to the verification result.

Referring to FIG. 1, messages transmitted among the REQ, the AAC and the AS may further include parameter information such as random numbers generated by the AAC and/or the REQ, and identity identifiers. Normally, during identity authentication, these random numbers and/or identity identifiers should remain unchanged during the process of being transmitted through the messages, but in the event of network jitter or attacks, etc., this may result in the loss or tampering of the parameter information in messages. Therefore, the consistency of the identity identifiers and/or the random numbers in the messages may further be verified during identity authentication, so as to guarantee the reliability of authentication results. Examples are as follows.

For example, in the REQInit of S101, the to-be-encrypted data when the REQ generates identity information ciphertext $EncPub_{AS}$ may further include an identity identifier $ID_{REQ}$ of the REQ and a third key $Nonce_{REQID}$. The $Nonce_{REQID}$ is used for encrypting the $ID_{REQ}$. The AACVeri of S102 may further include an identity identifier $ID_{AAC}$ of the AAC. Correspondingly, the ASVeri of S103 further includes identity identifier ciphertext of the REQ and the $ID_{AAC}$. The to-be-encrypted data of the $EncData_{AAC}$ in the AACAuth of S105 further includes the identity identifier ciphertext of the REQ. The identity identifier ciphertext of the REQ is obtained by using the $Nonce_{REQID}$ to encrypt the $ID_{REQ}$. For example, an exclusive or operation (XOR) is performed on the $Nonce_{REQID}$ and the $ID_{REQ}$, that is, the $ID_{REQ} \oplus Nonce_{REQID}$ is used as the identity identifier ciphertext of the REQ. Therefore, before S108, the REQ uses the message encryption key to decrypt the $EncData_{AAC}$, so as to further obtain the identity identifier ciphertext of the REQ. The REQ further needs to verify, according to the self $ID_{REQ}$ and the $Nonce_{REQID}$, the identity identifier ciphertext of the REQ that is obtained by decrypting the $EncData_{AAC}$. For example, the verification may include the following. The REQ uses the $Nonce_{REQID}$ to encrypt the information including the self $ID_{REQ}$ of the REQ, so as to generate the identity identifier ciphertext of the REQ, and verifies consistency of the generated identity identifier ciphertext of the REQ and the identity identifier ciphertext of the REQ that is obtained by decrypting the $EncData_{AAC}$. Alternatively, the REQ uses the $Nonce_{REQID}$ to decrypt the identity identifier ciphertext of the REQ, so as to obtain the $ID_{REQ}$, and verifies consistency of the $ID_{REQ}$ obtained by means of decryption and the self $ID_{REQ}$ of the REQ. After the verification is successful, the REQ then executes S108. Before S111, the AAC may verify the consistency of the $ID_{AAC}$ in the ASVeri and the self-identity identifier $ID_{AAC}$ (which is the $ID_{AAC}$ sent by the AAC through the AACVeri) of the AAC. After the verification is successful, the AAC then executes S111.

Similar to the identity identifier, the REQInit of S101 may further include a second random number $Nonce_{REQ}$ generated by the REQ; the AACVeri of S102 may further include the $Nonce_{REQ}$ and a first random number $Nonce_{AAC}$ generated by the AAC. Then the ASVeri of S103 may further include the $Nonce_{REQ}$ and the $Nonce_{AAC}$ and the to-be-encrypted data of the $EncData_{AAC}$ in the AACAuth of S105 may further include the $Nonce_{REQ}$. Before S108, the REQ decrypts the $EncData_{AAC}$ to further obtain the $Nonce_{REQ}$, and verifies the consistency of the $Nonce_{REQ}$ obtained by means of decryption and the $Nonce_{REQ}$ generated by the REQ. After the verification is successful. S108 is then executed. Before S111, the AAC may verify the consistency of the $Nonce_{AAC}$ in the ASVeri and the $Nonce_{AAC}$ generated by the AAC. After the verification is successful. S111 is then executed.

In some other embodiments, in order to guarantee the reliability of the authentication results, the AAC may generate a message integrity check code. The AACAuth of S105 may further include a first message integrity check code $MacTag_{AAC}$. The $MacTag_{AAC}$ is generated by the AAC using a message integrity check key to perform calculation on fields, other than the $MacTag_{AAC}$, in the AACAuth. Correspondingly, before S108, the REQ further needs to verify the $MacTag_{AAC}$. After the verification is successful. S108 is then executed. When verifying the $MacTag_{AAC}$, the REQ should use the message integrity check key to perform calculation on the fields, other than the $MacTag_{AAC}$, in the AACAuth, so as to generate the $MacTag_{AAC}$, and compare the calculated $MacTag_{AAC}$ with the $MacTag_{AAC}$ in the received AACAuth. If the $MacTag_{AAC}$s are consistent, the verification is successful. If the $MacTag_{AAC}$s are not consistent, the verification is failed.

Likewise, the REQ may also generate the message integrity check code. The REQAuth of S109 may further include a second message integrity check code $MacTag_{REQ}$. The $MacTag_{REQ}$ is generated by the REQ using the message integrity check key to perform calculation on fields, other than the $MacTag_{REQ}$, in the REQAuth. Correspondingly, before S111, the AAC further needs to verify the Mac-$Tag_{REQ}$. After the verification is successful. S111 is then executed. When verifying the $MacTag_{REQ}$, the AAC should use the message integrity check key to perform calculation on the fields, other than the $MacTag_{REQ}$, in the REQAuth, so as to generate a $MacTag_{REQ}$, and compare the calculated $MacTag_{REQ}$ with the $MacTag_{REQ}$ in the received REQAuth. If the $MacTag_{REQ}$s are consistent, the verification is successful. If the $MacTag_{AAC}$s are not consistent, the verification is failed. The manner of generating the message integrity check key used by the REQ and the AAC is described in the next embodiment.

Figure 2:
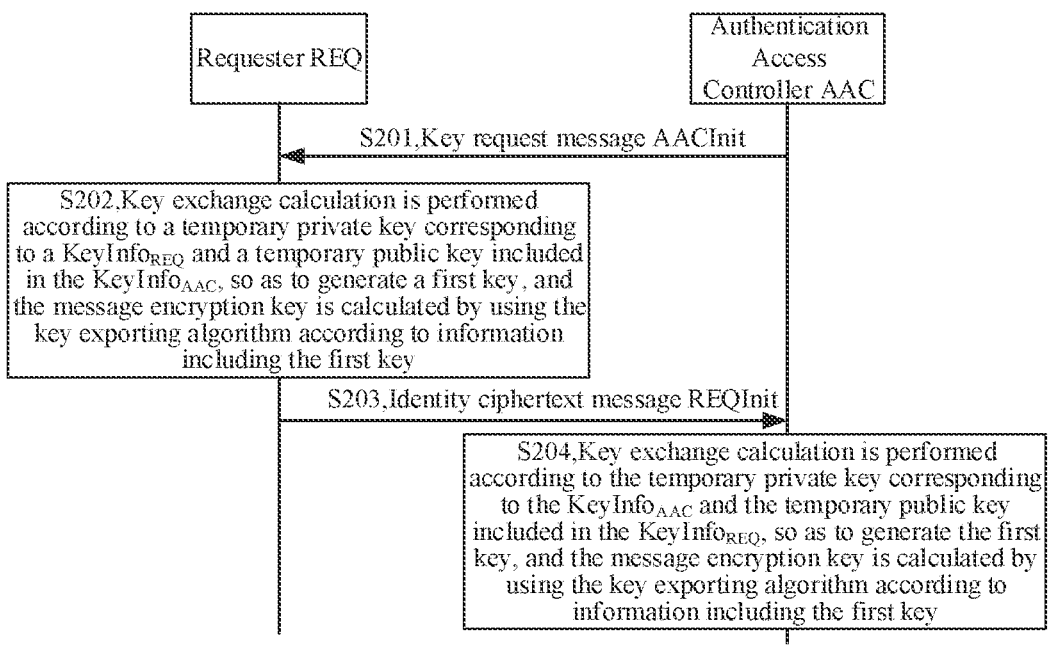
FIG. 2 is a schematic diagram of a method for negotiating a message encryption key between a Requester (REQ) and an Authentication Access Controller (AAC) according to an embodiment of the present application.

In the above embodiments, the message encryption keys used by the REQ and the AAC may be obtained by means of negotiation between the REQ and the AAC. Therefore, this embodiment further provides a method for negotiating the message encryption key between the REQ and the AAC. Referring to FIG. 2, the method includes the following operations.

At S201, the AAC sends a key request message AACInit to the REQ.

The AACInit includes a key exchange parameter $KeyInfo_{AAC}$ of the AAC. The $KeyInfo_{AAC}$ includes a temporary public key of the AAC. Key exchange refers to a key exchange algorithm such as Diffie-Hellman (DH). The AACInit may further include the $Nonce_{AAC}$ generated by the AAC.

The AACInit may further include Security $capabilities_{AAC}$. The Security $capabilities_{AAC}$ represents security capability parameter information supported by the AAC, including an identity authentication suite (which includes one or more identity authentication methods) supported by the AAC, one or more symmetric encryption algorithms, one or more integrity checking algorithms and/or one or more key derivation algorithms, so as to allow the REQ to select a specific security policy for use. Therefore, the REQ may select, according to the Security $capabilities_{AAC}$, the specific security policy Security $capabilities_{REQ}$ used by the REQ. The Security $capabilities_{REQ}$ indicates an identity authentication method, a symmetric encryption algorithm, an integrity checking algorithm and/or a key derivation algorithm the REQ correspondingly determines to use.

At S202, the REQ performs key exchange calculation according to information including a temporary private key corresponding to a key exchange parameter $KeyInfo_{REQ}$ of the REQ and a temporary public key included in the $KeyInfo_{AAC}$, so as to generate a first key, and calculates the message encryption key by using the key derivation algorithm according to the information including the first key.

If the AACInit in S201 further includes the $Nonce_{AAC}$ generated by the AAC, the REQ may perform key exchange calculation according to information including the temporary private key corresponding to the $KeyInfo_{REQ}$ and the temporary public key included in the $KeyInfo_{AAC}$, so as to generate the first key K1, combines the K1 with the information including the $Nonce_{AAC}$ and the $Nonce_{REQ}$ generated by the REQ, to calculate the message encryption key using the negotiated or preset key derivation algorithm. The negotiated key derivation algorithm may be a key derivation algorithm that the REQ selects to use according to the Security $capabilities_{AAC}$ sent by the AAC. The $KeyInfo_{REQ}$ is a key exchange parameter generated by the REQ, the key exchange parameter includes the temporary public key of the REQ. The temporary private key corresponding to the $KeyInfo_{REQ}$ is a temporary private key that is generated by the REQ and corresponds to the temporary public key of the REQ. That is, the temporary public key and the temporary private key are a temporary public-private key pair.

At S203, the REQ sends an identity ciphertext message REQInit to the AAC.

The REQInit includes the $KeyInfo_{REQ}$, such that the AAC obtains the message encryption key by perform calculation according to information including the temporary private key corresponding to the $KeyInfo_{AAC}$ and the temporary public key included in the $KeyInfo_{REQ}$. The temporary private key corresponding to the $KeyInfo_{AAC}$ is a temporary private key that is generated by the AAC and corresponds to the temporary public key of the AAC. That is, the temporary public key and the temporary private key are a temporary public-private key pair.

The REQInit may further include the Security $capabilities_{REQ}$. The REQInit may further include the $Nonce_{REQ}$, such that the AAC obtains the message encryption key by perform calculation according to information including the temporary private key corresponding to the $KeyInfo_{AAC}$, the temporary public key included in the $KeyInfo_{REQ}$, the $Nonce_{AAC}$ and the $Nonce_{REQ}$.

The REQInit may further include the $Nonce_{AAC}$, such that before performing the calculation for obtaining the message encryption key, the AAC may verify the consistency of the $Nonce_{AAC}$ in the REQInit and the $Nonce_{AAC}$ generated by the AAC, so as to ensure that the REQInit received by the AAC is a response message for the AACInit.

At S204, the AAC performs key exchange calculation according to information including the temporary private key corresponding to the $KeyInfo_{AAC}$ and the temporary public key included in the $KeyInfo_{REQ}$, so as to generate the first key, and calculates the message encryption key by using the key derivation algorithm according to the information including the first key.

If the REQInit further includes the $Nonce_{REQ}$, the AAC may perform key exchange calculation according to information including the temporary private key corresponding to the $KeyInfo_{AAC}$ and the temporary public key included in the $KeyInfo_{REQ}$, so as to generate the first key K1, combines the K1 with the information including the $Nonce_{AAC}$ and the $Nonce_{REQ}$, to calculate the message encryption key by means of the negotiated or preset key derivation algorithm. The negotiated key derivation algorithm may be a key derivation algorithm that the AAC selects to use according to the Security $capabilities_{REQ}$ sent by the REQ.

It is to be noted that, in the embodiment of FIG. 2, the REQ and the AAC may also generate the message integrity check key. The implementations of the REQ and the AAC to respectively generate the message integrity check key are the same as the implementations of the REQ and the AAC to respectively generate the message encryption key in the embodiment of FIG. 2. For example, the AAC may derive a string of key data by using the key derivation algorithm in the manner of the embodiment of FIG. 2. The key data may be used as the message encryption key and may also be the message integrity check key. Alternatively, one portion of the key data is used as the message encryption key, and the other portion of the key data is used as the message integrity check key. The AAC may also derive two same or different strings of key data in batches by using the key derivation algorithm in the manner of the embodiment of FIG. 2, one string is used as the message encryption key, and the other one string is used as the message integrity check key. The REQ may derive a string of key data by using the key derivation algorithm in the manner of the embodiment of FIG. 2. The key data may be used as the message encryption key and may also be the message integrity check key. Alternatively, one portion of the key data is used as the message encryption key, and the other portion of the key data is used as the message integrity check key. The REQ may also derive two same or different strings of key data in batches by using the key derivation algorithm in the manner of the embodiment of FIG. 2, one string is used as the message encryption key, and the other one string is used as the message integrity check key.

An embodiment of the present application further provides a method for determining the first authentication server AS-AAC and/or the second authentication server AS-REQ used during the current authentication process by using an information interaction between the AAC and the REQ.

Referring to FIG. 2, the AAC adds, in the AACInit of S201, the identity identifier $ID_{AS\_AAC}$ of at least one authentication server AS trusted by the AAC. Then the REQ determines, according to the $ID_{AS\_AAC}$, the $ID_{AS\_REQ}$ of at least one authentication server AS trusted by the REQ. During implementation, the REQ selects, from the $ID_{AS\_AAC}$, at least one authentication server AS that is trusted by the REQ as the $ID_{AS\_REQ}$. If the selection is failed, the REQ uses the at least one authentication server that is trusted by the REQ as the $ID_{AS\_REQ}$ (successful selection corresponds to a non-roaming case, and failed selection corresponds to a roaming case), and add the $ID_{AS\_REQ}$ into the REQInit of S203 and send it to the AAC. Therefore, the AAC may determine the first authentication server according to the $ID_{AS\_AAC}$ and the $ID_{AS\_REQ}$. For example, the AAC may determine whether there is at least one same identity identifier of authentication server in the $ID_{AS\_REQ}$ and the $ID_{AS\_AAC}$. If yes (that is the non-roaming case), the AAC determines the first authentication server involved in identity authentication from the identity identifier of the at least one authentication server that is commonly trusted by the REQ and the AAC. If no (that is the roaming case), the AAC needs to determine, according to the $ID_{AS\_AAC}$, the first authentication server AS-AAC involved in identity authentication, and sends the $ID_{AS\_REQ}$ to the AS-AAC, such that the AS-AAC determines the second authentication server AS-REQ according to the $ID_{AS\_REQ}$.

As another implementation, the AAC may not have to send the $ID_{AS\_AAC}$ to the REQ, and the REQ adds, in the REQInit of S203, the identity identifier $ID_{AS\_REQ}$ of at least one authentication server AS that is trusted by the REQ. The determination of the first authentication server AS-AAC and/or the second authentication server AS-REQ involved in the identity authentication process according to the $ID_{AS\_REQ}$ and the $ID_{AS\_AAC}$ of the AS trusted by the AAC is implemented as in the previous implementation.

Since the AS trusted by the REQ and the AS trusted by the AAC may be the same or different, when the AS trusted by the REQ and the AS trusted by the AAC are the same, it is the non-roaming case, and when the AS trusted by the REQ and the AS trusted by the AAC are different, it is the roaming case.

Figure 3:
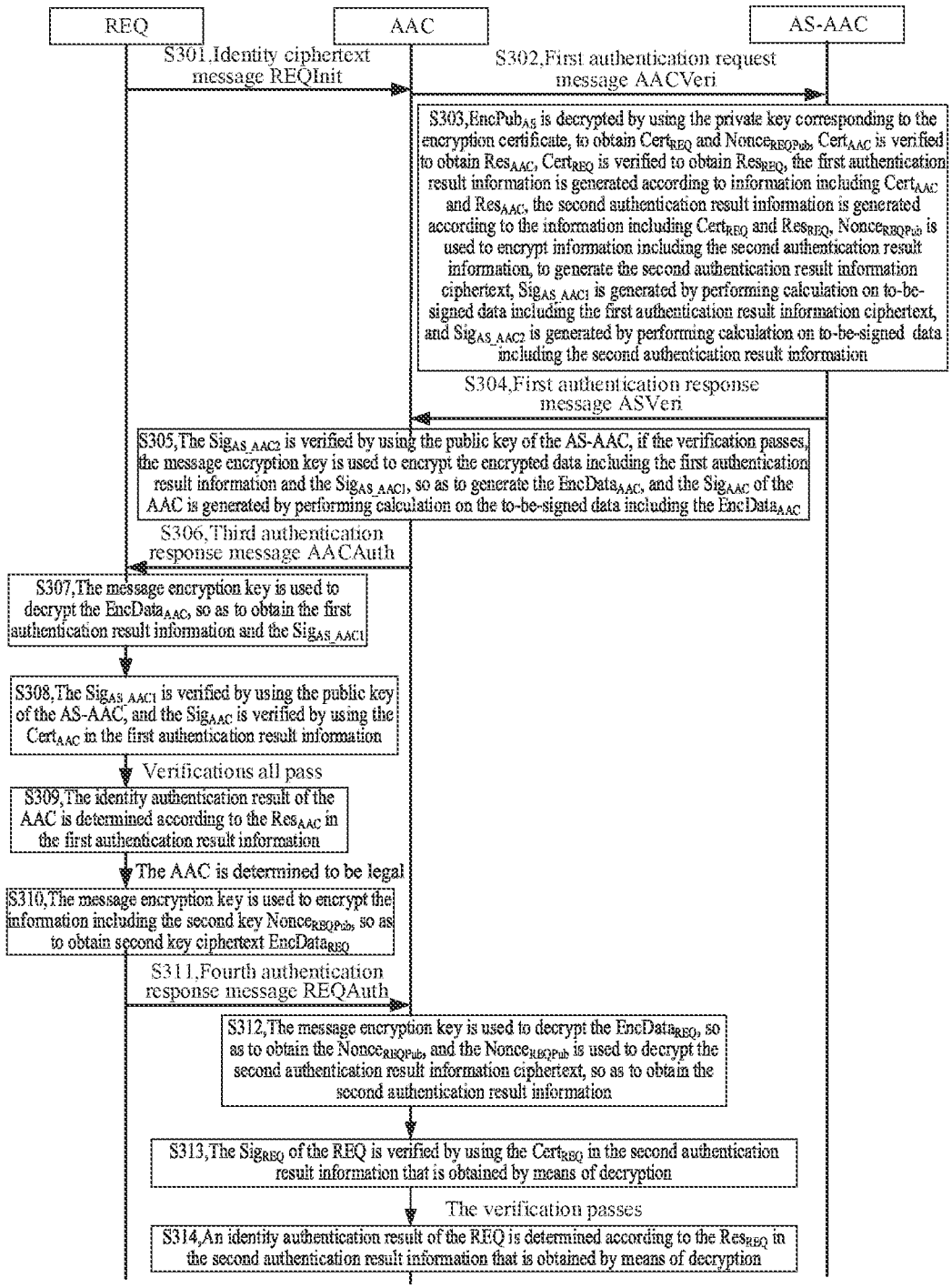
FIG. 3 is a schematic diagram of an identity authentication method in a non-roaming case according to an embodiment of the present application.

FIG. 3 is an embodiment of the identity authentication method in the non-roaming case. An AS-AAC (or an AS-REQ) may be used to represent an AS commonly trusted by a REQ and an AAC, and a digital signature $Sig_{REQ}$ of the REQ may also be verified during identity authentication. Before this embodiment is executed, the REQ and the AAC both have held a message encryption key. The message encryption key may be shared in advance by both parties, or may be obtained by means of negotiation by the method shown in FIG. 2. The identity authentication method for verifying the $Sig_{REQ}$ by the AAC includes the following operations.

At S301, the AAC acquires the identity ciphertext message REQInit sent by the REQ.

The REQInit includes the identity information ciphertext $EncPub_{AS}$ of the REQ and the digital signature $Sig_{REQ}$ of the REQ.

At S302, the AAC sends a first authentication request message AACVeri to the AS-AAC.

The AACVeri includes the $EncPub_{AS}$ and the $Cert_{AAC}$ of the AAC.

At S303, the AS-AAC decrypts the $EncPub_{AS}$ by using the private key corresponding to the encryption certificate, so as to obtain the $Cert_{REQ}$ of the REQ and the second key $Nonce_{REQ}$, respectively performs legality verification on the $Cert_{AAC}$ and the $Cert_{REQ}$, so as to obtain the first verification result $Res_{AAC}$ of the $Cert_{AAC}$ and the second verification result $Res_{REQ}$ of the $Cert_{REQ}$, generates the first authentication result information according to the information including the $Cert_{AAC}$ and the $Res_{AAC}$, generates the second authentication result information according to the information including the $Cert_{REQ}$ and the $Res_{REQ}$, generates the first digital signature $Sig_{AS\_AAC1}$ by perform calculation on the to-be-signed data including the first authentication result information, generates the second authentication result information ciphertext by encrypting the information including the second authentication result information using the $Nonce_{REQPub}$, and generates the second digital signature $Sig_{AS\_AAC2}$ by performing calculation on the to-be-signed data including the second authentication result information ciphertext.

At S304, the AAC receives a first authentication response message ASVeri sent by the AS-AAC.

The ASVeri includes the first authentication result information, the first digital signature $Sig_{AS\_AAC1}$, the second authentication result information ciphertext and the second digital signature $Sig_{AS\_AAC2}$.

At S305, the AAC verifies the $Sig_{AS\_AAC2}$ by using the public key of the AS-AAC. If the verification is successful, the AAC uses the message encryption key to encrypt the to-be-encrypted data including the first authentication result information and the $Sig_{AS\_AAC1}$, so as to generate the authentication result information ciphertext $EncData_{AAC}$, and generates the digital signature $Sig_{AAC}$ of the AAC by performing calculation for he to-be-signed data including the $EncData_{AAC}$.

At S306, the AAC sends a third authentication response message AACAuth to the REQ.

The AACAuth includes the $EncData_{AAC}$ and the $Sig_{AAC}$.

At S307, the REQ uses the message encryption key to decrypt the $EncData_{AAC}$, so as to obtain the first authentication result information and the $Sig_{AS\_AAC1}$.

At S308, the REQ verifies the $Sig_{AS\_AAC1}$ by using the public key of the AS-AAC, and verifies the $Sig_{AAC}$ by using the $Cert_{AAC}$ in the first authentication result information.

If the verifications all pass. S309 is then executed.

At S309, the REQ determines the identity authentication result of the AAC according to the $Res_{AAC}$ in the first authentication result information.

When the REQ determines that the AAC is legal. S310 is executed; and when the REQ determines that the AAC is illegal, the current authentication process is terminated.

At S310, the REQ uses the message encryption key to encrypt the information including the second key $Nonce_{REQPub}$, so as to obtain second key ciphertext $EncData_{REQ}$.

At S311, the REQ sends a fourth authentication response message REQAuth to the AAC.

The REQAuth includes the $EncData_{REQ}$.

At S312, the AAC uses the message encryption key to decrypt the $EncData_{REQ}$, so as to obtain the $Nonce_{REQPub}$, and uses the $Nonce_{REQPub}$ to decrypt the second authentication result information ciphertext, so as to obtain the second authentication result information.

At S313, the AAC verifies the $\text{Sig}_{REQ}$ of the REQ by using the $\text{Cert}_{REQ}$ in the second authentication result information that is obtained by means of decryption.

If the verification is successful, S314 is then executed.

At S314, the AAC determines an identity authentication result of the REQ according to the $\text{Res}_{REQ}$ in the second authentication result information that is obtained by means of decryption.

It is to be noted that, (1) the REQInit of S301 may not include the $\text{Sig}_{REQ}$, while the $\text{Sig}_{REQ}$ is added in the REQAuth of S311. That is to say, in S311, the REQ first generates the $\text{Sig}_{REQ}$ by performing calculation on the to-be-signed data including the $\text{EncData}_{REQ}$ in the REQAuth. In this case, the $\text{Sig}_{REQ}$ verified by the AAC in S313 is the $\text{Sig}_{REQ}$ in the REQAuth. (2) The operation of calculating the $\text{Sig}_{AAC}$ in S305 may also be changed to be previously executed in S302. That is, in S302, the AAC first generates the $\text{Sig}_{AAC}$ by performing calculation for the to-be-signed data including the $\text{EncPub}_{AS}$ in the AACVeri and the $\text{Cert}_{AAC}$, and then the AACVeri of S302 further includes the $\text{Sig}_{AAC}$. In S303, the AS-AAC further needs to verify the $\text{Sig}_{AAC}$; and then executes follow-up operations after the verification is successful. In this case, the AAC in S305 does not need to calculate the $\text{Sig}_{AAC}$. Correspondingly, the AACAuth of S306 does not include the $\text{Sig}_{AAC}$, the REQ in S308 does not verify the $\text{Sig}_{AAC}$, and in this case, the first authentication result information may not include the $\text{Cert}_{AAC}$.

Figure 4:
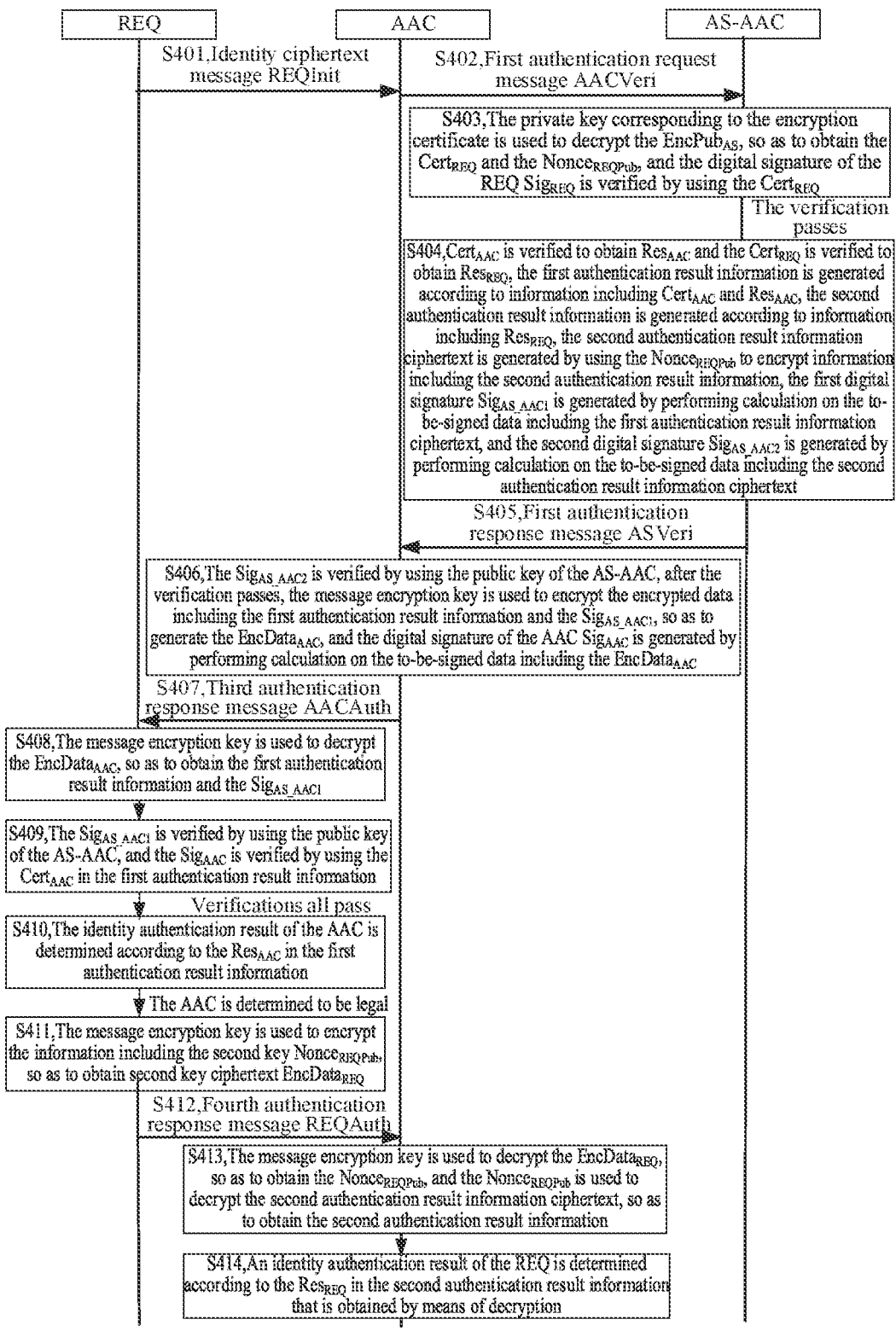
FIG. 4 is a schematic diagram of another identity authentication method in a non-roaming case according to an embodiment of the present application.

FIG. 4 is another embodiment of the identity authentication method in the non-roaming case. An AS-AAC (or an AS-REQ) may be used to represent an AS commonly trusted by a REQ and an AAC, and the $\text{Sig}_{REQ}$ of the REQ may also be verified during identity authentication. Before this embodiment is executed, the REQ and the AAC both have held a message encryption key. The message encryption key may be shared in advance by both parties, or may be obtained by means of negotiation by the method shown in FIG. 2. The identity authentication method for verifying the $\text{Sig}_{REQ}$ by the AS-AAC includes the following operations.

At S401, the AAC acquires an identity ciphertext message REQInit sent by the REQ.

The REQInit includes identity information ciphertext $\text{EncPub}_{AS}$ of the REQ and a digital signature $\text{Sig}_{REQ}$ of the REQ.

At S402, the AAC sends a first authentication request message AACVeri to the AS-AAC.

The AACVeri includes the REQInit and the $\text{Cert}_{AAC}$ of the AAC.

At S403, the AS-AAC uses the private key corresponding to the encryption certificate to decrypt the $\text{EncPub}_{AS}$ in the REQInit, so as to obtain the $\text{Cert}_{REQ}$ of the REQ and the second key $\text{Nonce}_{REQPub}$, and verifies the $\text{Sig}_{REQ}$ by using the $\text{Cert}_{REQ}$.

If the verification is successful, S404 is then executed.

At S404, the AS-AAC performs legality verification on the $\text{Cert}_{AAC}$ and the $\text{Cert}_{REQ}$, so as to obtain the first verification result $\text{Res}_{AAC}$ of the $\text{Cert}_{AAC}$ and the second verification result $\text{Res}_{REQ}$ of the $\text{Cert}_{REQ}$, generates a first authentication result information according to the information including the $\text{Cert}_{AAC}$ and the $\text{Res}_{AAC}$, generates a second authentication result information according to the information including the $\text{Res}_{REQ}$, generates a first digital signature $\text{Sig}_{AS\_AAC1}$ by performing calculation on the to-be-signed data including the first authentication result information, generates a second authentication result information ciphertext by encrypting the information including the second authentication result information using the $\text{Nonce}_{REQPub}$, and generates a second digital signature $\text{Sig}_{AS\_AAC2}$ by performing calculation on the to-be-signed data including the second authentication result information ciphertext.

At S405, the AAC receives a first authentication response message ASVeri sent by the AS-AAC.

The ASVeri includes the first authentication result information, the first digital signature $\text{Sig}_{AS\_AAC1}$, the second authentication result information ciphertext and the second digital signature $\text{Sig}_{AS\_AAC2}$.

At S406, the AAC verifies the $\text{Sig}_{AS\_AAC2}$ by using the public key of the AS-AAC. After the verification is successful, the AAC uses the message encryption key to encrypt the to-be-encrypted data including the first authentication result information and the $\text{Sig}_{AS\_AAC1}$, so as to generate the authentication result information ciphertext $\text{EncData}_{AAC}$, and generates the digital signature $\text{Sig}_{AAC}$ of the AAC by performing calculation on the to-be-signed data including the $\text{EncData}_{AAC}$.

At S407, the AAC sends a third authentication response message AACAuth to the REQ.

The AACAuth includes the $\text{EncData}_{AAC}$ and the $\text{Sig}_{AAC}$.

At S408, the REQ uses the message encryption key to decrypt the $\text{EncData}_{AAC}$, so as to obtain the first authentication result information and the $\text{Sig}_{AS\_AAC1}$.

At S409, the REQ verifies the $\text{Sig}_{AS\_AAC1}$ by using the public key of the AS-AAC, and verifies the $\text{Sig}_{AAC}$ by using the $\text{Cert}_{AAC}$ in the first authentication result information.

If the verifications all pass, S410 is then executed.

At S410, the REQ determines the identity authentication result of the AAC according to the $\text{Res}_{AAC}$ in the first authentication result information.

When the REQ determines that the AAC is legal, S411 is executed. When the REQ determines that the AAC is illegal, the current authentication process is terminated.

At S411, the REQ uses the message encryption key to encrypt the information including the second key $\text{Nonce}_{REQPub}$, so as to obtain second key ciphertext $\text{EncData}_{REQ}$.

At S412, the REQ sends a fourth authentication response message REQAuth to the AAC.

The REQAuth includes the $\text{EncData}_{REQ}$.

At S413, the AAC uses the message encryption key to decrypt the $\text{EncData}_{REQ}$, so as to obtain the $\text{Nonce}_{REQPub}$, and uses the $\text{Nonce}_{REQPub}$ to decrypt the second authentication result information ciphertext, so as to obtain the second authentication result information.

At S414, the AAC determines an identity authentication result of the REQ according to the $\text{Res}_{REQ}$ in the second authentication result information that is obtained by means of decryption.

It is to be noted that, the operation of calculating the $\text{Sig}_{AAC}$ in S406 may also be changed to be previously executed in S402. That is, in S402, the AAC first generates the $\text{Sig}_{AAC}$ by performing calculation on the to-be-signed data including the REQInit in the AACVeri and the $\text{Cert}_{AAC}$, and the AACVeri of S402 further includes the $\text{Sig}_{AAC}$. In S403, the AS-AAC further needs to verify the $\text{Sig}_{AAC}$; and then executes follow-up operations after the verification is successful. In this case, the AAC in S406 does not need to calculate the $\text{Sig}_{AAC}$. Correspondingly, the AACAuth of S407 does not include the SigAAC, the REQ in S409 does not verify the $\text{Sig}_{AAC}$, and in this case, the first authentication result information may not include the $\text{Cert}_{AAC}$.

Figure 5:
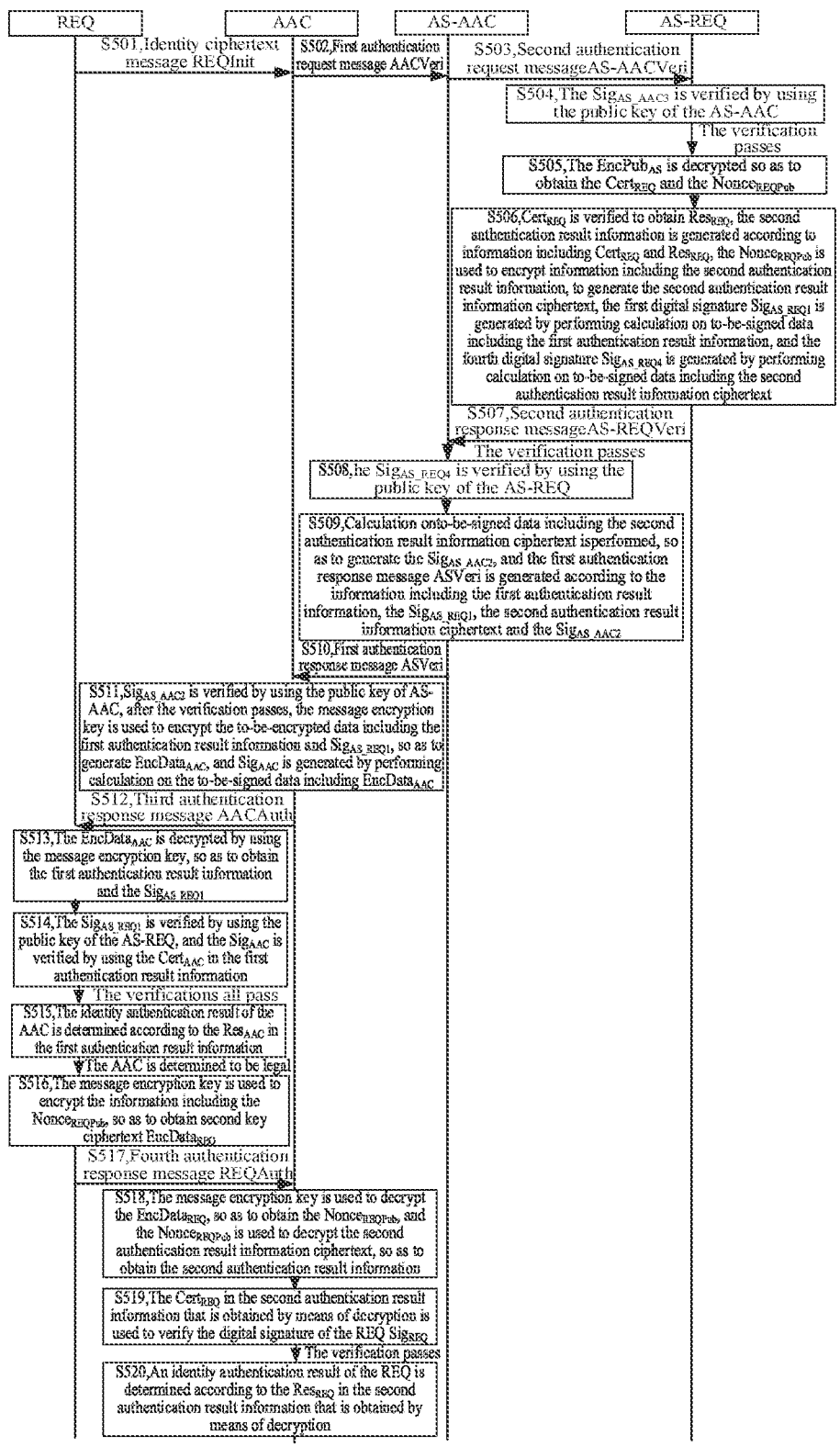
FIG. 5 is a schematic diagram of an identity authentication method in a roaming case according to an embodiment of the present application.

FIG. 5 is an embodiment of the identity authentication method in the roaming case. In this case, an AS-AAC and an AS-REQ are trusted with each other, know each other's digital certificate or a public key in a digital certificate, and a digital signature $Sig_{REQ}$ of a REQ may also be verified during identity authentication. Before this embodiment is executed, the REQ and an AAC both have held a message encryption key. The message encryption key may be shared in advance by both parties, or may be obtained by means of negotiation by the method shown in FIG. 2. The identity authentication method for verifying the $Sig_{REQ}$ by the AAC includes the following operations.

At S501, the AAC acquires an identity ciphertext message REQInit sent by the REQ.

The REQInit includes identity information ciphertext $EncPub_{AS}$ of the REQ, the identity identifier $ID_{AS\_REQ}$ of at least one AS trusted by the REQ, and a digital signature $Sig_{REQ}$ of the REQ.

At S502, the AAC sends a first authentication request message AACVeri to the AS-AAC.

The AACVeri includes the $EncPub_{AS}$, a $Cert_{AAC}$ of the AAC, and the $ID_{AS\_REQ}$, such that the AS-AAC performs legality verification on the $Cert_{AAC}$, so as to obtain a $Res_{AAC}$, generates first authentication result information according to the information including the $Cert_{AAC}$ and the $Res_{AAC}$, and then determines, according to the $ID_{AS\_REQ}$, the AS-REQ used during the current authentication process.

At S503, the AS-AAC sends a second authentication request message AS-AACVeri to the AS-REQ.

The AS-AACVeri includes the first authentication result information, the $EncPub_{AS}$ and a third digital signature $Sig_{AS\_AAC3}$. The $Sig_{AS\_AAC3}$ is generated by the AS-AAC performing calculation on to-be-signed data including the first authentication result information and the $EncPub_{AS}$.

At S504, the AS-REQ verifies the $Sig_{AS\_AAC}$ by using the public key of the AS-AAC.

If the verification is successful. S505 is then executed.

At S505, the AS-REQ uses a private key corresponding to an encryption certificate to decrypt the $EncPub_{AS}$, so as to obtain a $Cert_{REQ}$ and a second key $Nonce_{REQPub}$.

At S506, the AS-REQ performs legality verification on the $Cert_{REQ}$ to obtain a $Res_{REQ}$, so as to obtain the second authentication result information according to the information including the $Cert_{REQ}$ and the $Res_{REQ}$, uses the $Nonce_{REQPub}$ to encrypt the information including the second authentication result information, so as to generate the second authentication result information ciphertext, generates a first digital signature $Sig_{AS\_REQ1}$ by performing calculation on to-be-signed data including the first authentication result information, and generates a fourth digital signature $Sig_{AS\_REQ4}$ by performing calculation on to-be-signed data including the second authentication result information ciphertext.

At S507, the AS-REQ sends a second authentication response message AS-REQVeri to the AS-AAC.

The AS-REQVeri includes the first authentication result information, the first digital signature $Sig_{AS\_REQ1}$, the second authentication result information ciphertext and the fourth digital signature $Sig_{AS\_REQ4}$.

At S508, the AS-AAC verifies the $Sig_{AS\_REQ4}$ by using the public key of the AS-REQ.

If the verification is successful. S509 is executed.

At S509, the AS-AAC generate a second digital signature $Sig_{AS\_AAC2}$ by performing calculation on to-be-signed data including the second authentication result information ciphertext, and generates a first authentication response message ASVeri according to the information including the first authentication result information, the first digital signature $Sig_{AS\_REQ1}$, the second authentication result information ciphertext and the second digital signature $Sig_{AS\_AAC2}$.

At S510, the AS-AAC sends a first authentication response message ASVeri to the AAC.

At S511, the AAC verifies the $Sig_{AS\_AAC2}$ by using the public key of the AS-AAC. After the verification is successful, the AAC uses the message encryption key to encrypt the to-be-encrypted data including the first authentication result information and the $Sig_{AS\_REQ1}$, so as to generate authentication result information ciphertext $EncData_{AAC}$, and generates a digital signature $Sig_{AAC}$ of the AAC by performing calculation on to-be-signed data including the $EncData_{AAC}$.

At S512, the AAC sends a third authentication response message AACAuth to the REQ.

The AACAuth includes the $EncData_{AAC}$ and the $Sig_{AAC}$.

At S513, the REQ decrypts the $EncData_{AAC}$ by using the message encryption key, so as to obtain the first authentication result information and the $Sig_{AS\_REQ1}$.

At S514, the REQ verifies the $Sig_{AS\_REQ1}$ by using the public key of the AS-REQ, and verifies the $Sig_{AAC}$ by using the $Cert_{AAC}$ in the first authentication result information.

If the verification is successful, S515 is then executed.

At S515, the REQ determines an identity authentication result of the AAC according to the $Res_{AAC}$ in the first authentication result information.

When the REQ determines that the AAC is legal, S516 is executed. When the REQ determines that the AAC is illegal, the current authentication process is terminated.

At S516, the REQ uses the message encryption key to encrypt the information including a second key $Nonce_{REQPub}$, so as to obtain second key ciphertext $EncData_{REQ}$.

At S517, the REQ sends a fourth authentication response message REQAuth to the AAC.

The REQAuth includes the $EncData_{REQ}$.

At S518, the AAC uses the message encryption key to decrypt the $EncData_{REQ}$, so as to obtain the $Nonce_{REQPub}$, and uses the $Nonce_{REQPub}$ to decrypt the second authentication result information ciphertext, so as to obtain the second authentication result information.

At S519, the AAC verifies the digital signature $Sig_{REQ}$ of the REQ by using the $Cert_{REQ}$ in the second authentication result information that is obtained by means of decryption.

If the verification is successful, S520 is executed.

At S520, the AAC determines an identity authentication result of the REQ according to the $Res_{REQ}$ in the second authentication result information that is obtained by means of decryption.

It is to be noted that. (1) the REQInit of S501 may not include the $Sig_{REQ}$, while the $Sig_{REQ}$ is added in the REQAuth of S517. That is to say, in S517, the REQ first generates the $Sig_{REQ}$ by performing calculation on the to-be-signed data including the $EncData_{REQ}$ in the REQAuth. In this case, the $Sig_{REQ}$ verified by the AAC in S519 is the $Sig_{REQ}$ in the REQAuth. (2) The operation of calculating the $Sig_{AAC}$ in S511 may also be changed to be previously executed in S502. That is, in S502, the AAC first generates the $Sig_{AAC}$ by performing calculation on the to-be-signed data including the $EncPub_{AS}$ in the AACVeri, the $Cert_{AAC}$ and the $ID_{AS\_REQ}$, and the AACVeri of S502 further includes the $Sig_{AAC}$. In S503, the AS-AAC further needs to verify the $Sig_{AAC}$, and then executes follow-up operations after the verification is successful. In this case, the AAC in S511 does not need to calculate the $Sig_{AAC}$. Accordingly, the AACAuth of S512 does not include the $Sig_{AAC}$, the REQ in S514 does not verify the $Sig_{AAC}$, and in this case, the first authentication result information may not include the $Cert_{AAC}$.

Figure 6:
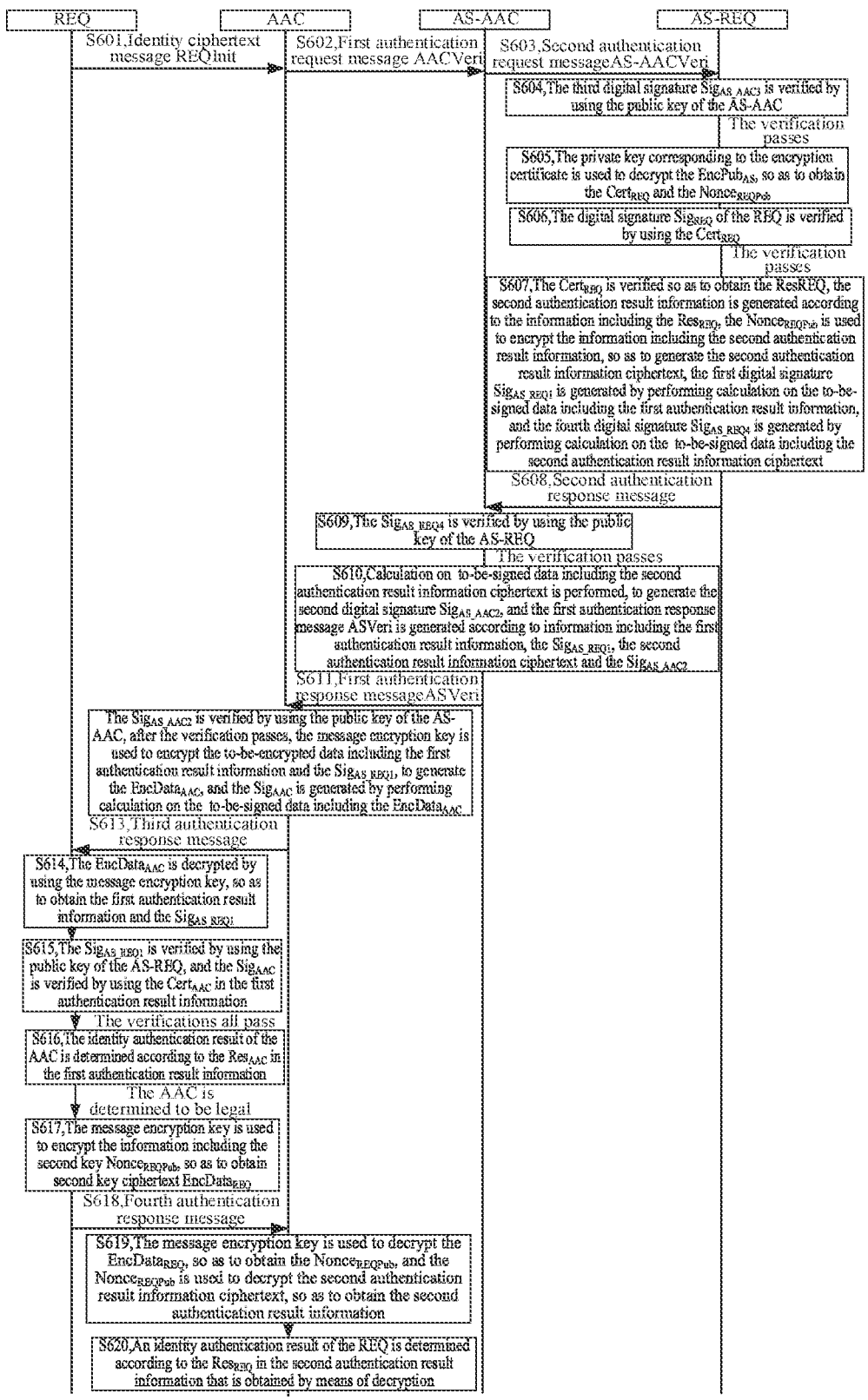
FIG. 6 is a schematic diagram of another identity authentication method in a roaming case according to an embodiment of the present application.

FIG. 6 is another embodiment of the identity authentication method in the roaming case. In this case, an AS-AAC and an AS-REQ are trusted with each other, know each other's digital certificate or a public key in a digital certificate, and a digital signature $Sig_{REQ}$ of a REQ may also be verified during identity authentication. Before this embodiment is executed, the REQ and a AAC both have held a message encryption key. The message encryption key may be shared in advance by both parties, or may be obtained by means of negotiation by the method shown in FIG. 2. The identity authentication method for verifying the $Sig_{REQ}$ by the AS-REQ includes the following operations.

At S601, the AAC acquires an identity ciphertext message REQInit sent by the REQ.

The REQInit includes identity information ciphertext $EncPub_{AS}$ of the REQ, the identity identifier $ID_{AS\_REQ}$ of at least one AS trusted by the REQ, and a digital signature $Sig_{REQ}$ of the REQ.

At S602, the AAC sends a first authentication request message AACVeri to the AS-AAC.

The AACVeri includes the REQInit and the $Cert_{AAC}$, such that the AS-AAC performs legality verification on the $Cert_{AAC}$, so as to obtain the $Res_{AAC}$, generates first authentication result information according to the information including the $Cert_{AAC}$ and the $Res_{AAC}$.

At S603, the AS-AAC sends a second authentication request message AS-AACVeri to the AS-REQ.

The AS-AAC determines, according to the $ID_{AS\_REQ}$ in the REQInit, the AS-REQ used during the current authentication process, and sends the AS-AACVeri to the AS-REQ. The AS-AACVeri includes the REQInit, the first authentication result information, and a third digital signature $Sig_{AS\_AAC3}$. The $Sig_{AS\_AAC3}$ is generated by the AS-AAC performing calculation on to-be-signed data including the REQInit and the first authentication result information.

At S604, the AS-REQ verifies the $Sig_{AS\_AAC3}$ by using the public key of the AS-AAC.

If the verification is successful, S605 is then executed.

At S605, the AS-REQ uses a private key corresponding to an encryption certificate to decrypt the $EncPub_{AS}$ in the REQInit, so as to obtain a $Cert_{REQ}$ and a second key $Nonce_{REQPub}$.

At S606, the AS-REQ verifies the $Sig_{REQ}$ of the REQ by using the $Cert_{REQ}$.

If the verification is successful, S607 is then executed.

At S607, the AS-REQ verifies the legality of the $Cert_{REQ}$, so as to obtain a $Res_{REQ}$, generates second authentication result information according to the information including the $Res_{REQ}$, uses the $Nonce_{REQPub}$ to encrypt the information including the second authentication result information, so as to generate second authentication result information ciphertext, generates a first digital signature $Sig_{AS\_REQ1}$ by performing calculation on to-be-signed data including the first authentication result information, and generates the a fourth digital signature $Sig_{AS\_REQ4}$ by performing calculation on to-be-signed data including the second authentication result information ciphertext.

At S608, the AS-REQ sends a second authentication response message AS-REQVeri to the AS-AAC.

The AS-REQVeri includes the first authentication result information, the first digital signature $Sig_{AS\_REQ1}$, the second authentication result information ciphertext and the fourth digital signature $Sig_{AS\_REQ4}$.

At S609, the AS-AAC verifies the $Sig_{AS\_REQ4}$ by using the public key of the AS-REQ.

If the verification is successful, S610 is executed.

At S610, the AS-AAC generate a second digital signature $Sig_{AS\_AAC2}$ by performing calculation on to-be-signed data including the second authentication result information ciphertext, and generates a first authentication response message ASVeri according to the information including the first authentication result information, the first digital signature $Sig_{AS\_REQ1}$, the second authentication result information ciphertext and the second digital signature $Sig_{AS\_AAC2}$.

At S611, the AS-AAC sends the first authentication response message ASVeri to the AAC.

At S612, the AAC verifies the $Sig_{AS\_AAC2}$ by using the public key of the AS-AAC. After the verification is successful, the AAC uses the message encryption key to encrypt the to-be-encrypted data including the first authentication result information and the $Sig_{AS\_REQ1}$, so as to generate authentication result information ciphertext $EncData_{AAC}$, and generates a digital signature $Sig_{AAC}$ of the AAC by performing calculation on to-be-signed data including the $EncData_{AAC}$.

At S613, the AAC sends a third authentication response message AACAuth to the REQ.

The AACAuth includes the $EncData_{AAC}$ and the $Sig_{AAC}$.

At S614, the REQ decrypts the $EncData_{AAC}$ by using the message encryption key, so as to obtain the first authentication result information and the $Sig_{AS\_REQ1}$.

At S615, the REQ verifies the $Sig_{AS\_REQ1}$ by using the public key of the AS-REQ, and verifies the $Sig_{AAC}$ by using the $Cert_{AAC}$ in the first authentication result information.

If the verifications all pass. S616 is executed.

At S616, the REQ determines an identity authentication result of the AAC according to the $Res_{AAC}$ in the first authentication result information.

When the REQ determines that the AAC is legal. S617 is executed; and when the REQ determines that the AAC is illegal, the current authentication process is terminated.

At S617, the REQ uses the message encryption key to encrypt the information including the second key $Nonce_{REQPub}$, so as to obtain second key ciphertext $EncData_{REQ}$.

At S618, the REQ sends a fourth authentication response message REQAuth to the AAC.

The REQAuth includes the $EncData_{REQ}$.

At S619, the AAC uses the message encryption key to decrypt the $EncData_{REQ}$, so as to obtain the $Nonce_{REQPub}$, and uses the $Nonce_{REQPub}$ to decrypt the second authentication result information ciphertext, so as to obtain the second authentication result information.

At S620, the AAC determines an identity authentication result of the REQ according to the $Res_{REQ}$ in the second authentication result information that is obtained by means of decryption.

It is to be noted that, the operation of calculating the $Sig_{AAC}$ in S612 may also be changed to be previously executed in S602. That is, in S602, the AAC first generates the $Sig_{AAC}$ by performing calculation on the to-be-signed data including the REQInit in the AACVeri and the $Cert_{AAC}$, and the AACVeri of S602 further includes the $Sig_{AAC}$. In S603, the AS-AAC further needs to verify the $Sig_{AAC}$, and then executes follow-up operations after the verification is successful. In this case, the AAC in S612 does not need to calculate the $Sig_{AAC}$. Accordingly, the AACAuth of S613 does not include the $Sig_{AAC}$, the REQ in S615 does not verify the $Sig_{AAC}$, and in this case, the first authentication result information may not include the $Cert_{AAC}$.

For ease of description, in the embodiments of FIG. 7 to FIG. 10, the first authentication result information may be represented by the field $Pub_{AAC}$, and the second authentication result information may be represented by the field $Pub_{REQ}$.

Figure 7:
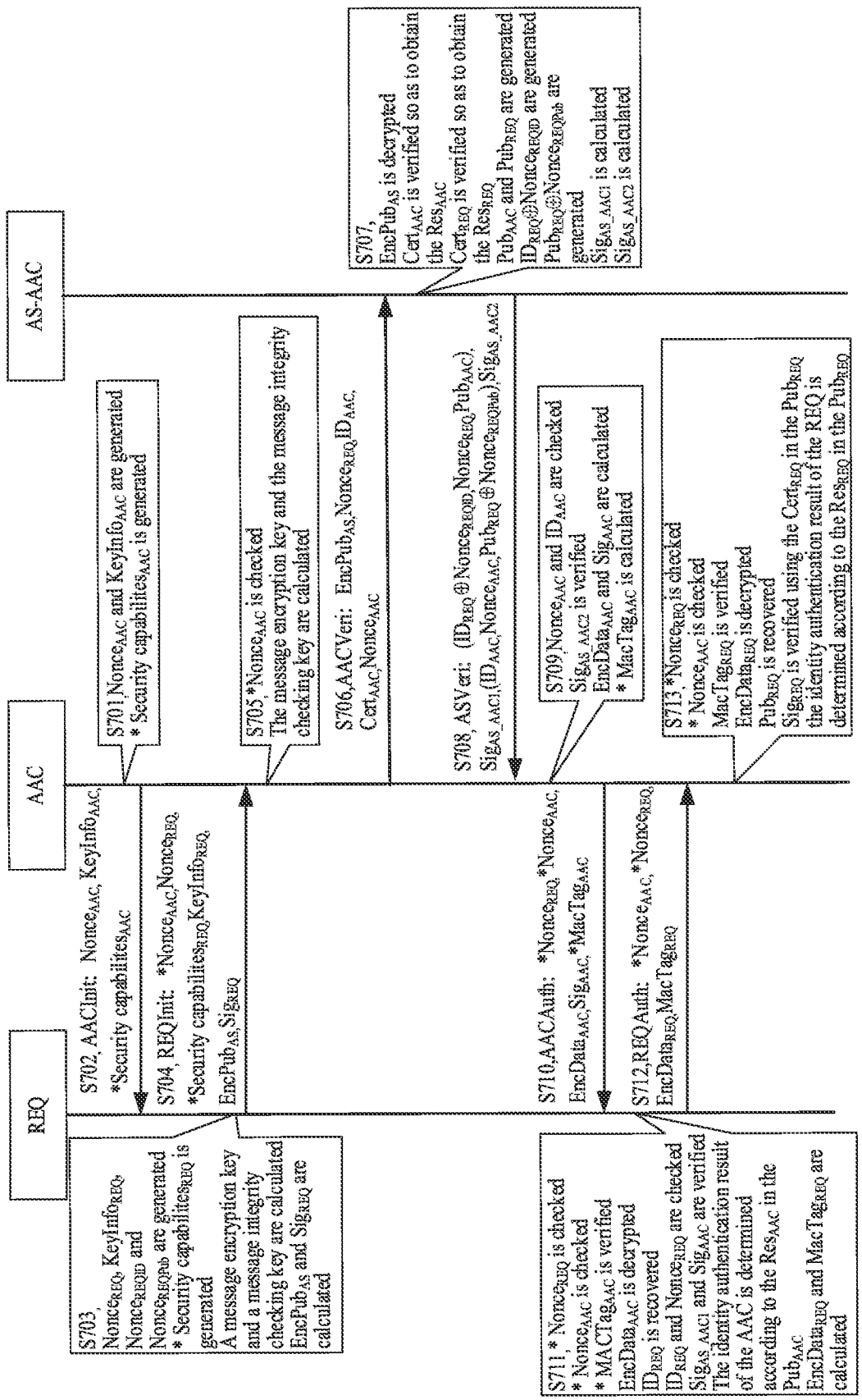
FIG. 7 is a schematic diagram of still another identity authentication method in a non-roaming case according to an embodiment of the present application, wherein "*" represents an optional field or an optional operation.

FIG. 7 is still another embodiment of the identity authentication method in the non-roaming case. In this case, an AS-AAC (or an AS-REQ) may be used to represent an AS commonly trusted by a REQ and an AAC. In this embodiment, the process of negotiating a message encryption key between the REQ and the AAC is fused in the identity authentication process in parallel, better facilitating project implementation. A digital signature $Sig_{REQ}$ of the REQ is verified by the AAC. The method includes the following operations.

At S701, the AAC generates a $Nonce_{AAC}$ and a $KeyInfo_{AAC}$, and generates Security capabilities$_{AAC}$ according to requirements.

At S702, the AAC sends a key request message AACInit to the REQ.

The AACInit includes the $Nonc_{ACC}$, the $KeyInfo_{AAC}$ and the Security capabilities$_{AAC}$. The Security capabilities$_{AAC}$ is an optional field and represents security capability parameter information supported by the AAC, including an identity authentication suite, one or more symmetric encryption algorithms, one or more integrity checking algorithms and/or one or more key derivation algorithms (same as the entire text) supported by the AAC.

At S703, the REQ generates a $Nonce_{REQ}$, a $KeyInfo_{REQ}$, a $Nonce_{REQID}$ and a $Nonce_{REQPub}$, generates Security capabilities$_{REQ}$ according to requirements, and performs key exchange calculation according to information including a temporary private key corresponding to a $KeyInfo_{REQ}$ and a temporary public key included in the $KeyInfo_{AAC}$, so as to generate a first key K1. Then the REQ combines the K1 with the $Nonce_{AAC}$, the $Nonce_{REQ}$ and other information (other information used by the REQ and the AAC being the same and optional, for example, a specific string), to calculate a message encryption key and a message integrity check key by using a negotiated or preset key derivation algorithm (this step may also be executed when the message integrity check key and/or the message integrity check key needs to be used later), calculates identity information ciphertext $EncPub_{AS}$ of the REQ by using a public key of an encryption certificate, and calculates a $Sig_{REQ}$.

The Security capabilities$_{REQ}$ is an optional field, and indicates the selection of the specific security policy made by the REQ according to the Security capabilities$_{AAC}$. That is, an identity authentication method, a symmetric encryption algorithm, an integrity checking algorithm and/or a key derivation algorithm which the REQ determines to use (same as the entire text). Whether the REQ generates the Security capabilities$_{REQ}$ depends on whether the Security capabilities$_{AAC}$ is carried in the AACInit sent from the AAC to the REQ.

At S704, the REQ sends an identity ciphertext message REQInit to the AAC.

The REQInit includes the $Nonce_{AAC}$, the $Nonce_{REQ}$, the Security capabilities$_{REQ}$, the $KeyInfo_{REQ}$, the $EncPub_{AS}$ and the $Sig_{REQ}$. The $Nonce_{AAC}$ and the Security capabilities$_{REQ}$ are optional fields. The $Nonce_{AAC}$ shall be equal to the $Nonce_{AAC}$ in the AACInit. The to-be-encrypted data of the $EncPub_{AS}$ includes an $ID_{REQ}$, a $Cert_{REQ}$, the $Nonce_{REQID}$ and the $Nonce_{REQPub}$. The to-be-signed data of the $Sig_{REQ}$ includes other fields before the $Sig_{REQ}$ in the REQInit. For example, when the REQInit successively includes the $Nonce_{AAC}$, the $Nonce_{REQ}$, the Security capabilities$_{REQ}$, the $KeyInfo_{REQ}$, the $EncPub_{AS}$ and the $Sig_{REQ}$, to-be-signed data of the $Sig_{REQ}$ includes the $Nonce_{AAC}$, the $Nonce_{REQ}$, the Security capabilities$_{REQ}$, the $KeyInfo_{REQ}$ and the $EncPub_{AS}$. In addition, when the REQInit does not include the $Nonce_{AAC}$, the to-be-signed data of the $Sig_{REQ}$ further includes the $Nonce_{AAC}$ in the AACInit.

At S705, after receiving the REQInit, the AAC executes the following operations (if there is no special explanation or logical relationship, actions numbered with (1), (2), . . . , in this specification do not necessarily have a sequential order due to their numbering, same as the entire text).

(1) If there is the $Nonce_{AAC}$ in the REQInit, whether the $Nonce_{AAC}$ is the same as the $Nonce_{AAC}$ generated by the AAC is checked. If the $Nonce_{AAC}$ is different from the $Nonce_{AAC}$ generated by the AAC, the REQInit is discarded.

(2) The first key K1 is generated by performing key exchange calculation according to information including the temporary private key corresponding to the $KeyInfo_{AAC}$ and the temporary public key included in the $KeyInfo_{REQ}$. The K1 is combined with the $Nonce_{AAC}$, the $Nonce_{REQ}$ and other information (other information used by the AAC and the REQ being the same and optional, for example, a specific string), to calculate the message encryption key and the message integrity check key by using the negotiated or preset key derivation algorithm. Definitely, the calculation may be executed when the message integrity check key and/or the message integrity check key needs to be used by the AAC.

At S706, the AAC sends a first authentication request message AACVeri to the AS-AAC.

The AACVeri includes the $EncPub_{AS}$, the $Nonce_{REQ}$, the $ID_{AAC}$, the $Cert_{AAC}$ and the $Nonce_{AAC}$. The $EncPub_{AS}$ and the $Nonce_{REQ}$ shall be respectively equal to corresponding fields in the REQInit. The $Nonce_{AAC}$ shall be equal to the $Nonce_{AAC}$ generated by the AAC.

At S707, after receiving the AACVeri, the AS-AAC executes the following operations.

(1) The private key corresponding to the encryption certificate is used to decrypt the $EncPub_{AS}$, so as to obtain the $Cert_{REQ}$, the $ID_{REQ}$, the $Nonce_{REQPub}$ and the $Nonce_{REQID}$.

(2) The legality of the $Cert_{AAC}$ and the legality of the $Cert_{REQ}$ are respectively verified to obtain the $Res_{AAC}$ and the $Res_{REQ}$. A $Pub_{AAC}$ is generated according to information including the $Cert_{AAC}$ and the $Res_{AAC}$. A $Pub_{REQ}$ is generated according to information including the $Cert_{REQ}$ and the $Res_{REQ}$. An XOR is performed on the $ID_{REQ}$ and the $Nonce_{REQID}$, so as to generate the $ID_{REQ}$ $Nonce_{REQID}$. The XOR is performed on the $Pub_{REQ}$ and the $Nonce_{REQPub}$, so as to generate the $Pub_{REQ}$ $Nonce_{REQPub}$.

(3) Signature calculation is performed on information including the $ID_{REQ}$ $Nonce_{REQID}$, the $Nonce_{REQ}$ and the $Pub_{AAC}$, so as to generate a first digital signature $Sig_{AS\_AAC1}$. Signature calculation is performed on information including the $ID_{AAC}$, the $Nonce_{AAC}$ and the $Pub_{REQ}$ $Nonce_{REQPub}$, so as to generate a second digital signature $Sig_{AS\_AAC2}$.

At S708, the AS-AAC sends a first authentication response message ASVeri to the AAC.

The ASVeri includes the $ID_{REQ}$ $Nonce_{REQID}$, the $Nonce_{REQ}$, the $Pub_{AAC}$, the $Sig_{AS\_AAC1}$, the $ID_{AAC}$, the $Nonce_{AAC}$, the $Pub_{REQ}$ $Nonce_{REQPub}$ and the $Sig_{AS\_AAC2}$. The $ID_{REQ}$, the $Nonc_{REQID}$, the $Nonce_{REQ}$, the $ID_{AAC}$, the $Nonce_{AAC}$ and the $Nonce_{REQPub}$ shall respectively be equal to corresponding fields in the AACVeri.

At S709, after receiving the ASVeri, the AAC executes the following operations.

(1) Whether the $ID_{AAC}$ and the $Nonce_{AAC}$ are respectively the same as the self $ID_{AAC}$ of the AAC and the $Nonce_{AAC}$ generated by the AAC.

(2) The $Sig_{AS\_AAC2}$ is verified by using the public key of the AS-AAC.

(3) If the checking and the verification all pass, an $EncData_{AAC}$ is calculated by using the message encryption key. If any one of the checking and verification operations is failed, the ASVeri is immediately discarded.

(4) A $Sig_{AAC}$ is calculated.

(5) A $MacTag_{AAC}$ is calculated according to requirements.

At S710, the AAC sends a third authentication response message AACAuth to the REQ.

The AACAuth includes the $Nonce_{REQ}$, the $Nonce_{AAC}$, the $EncData_{AAC}$, the $Sig_{AAC}$ and the $MacTag_{AAC}$. The $Nonce_{REQ}$ and the $Nonce_{AAC}$ are optional fields, and shall respectively be equal to the $Nonce_{REQ}$ in the REQInit and the $Nonce_{AAC}$ generated by the AAC. The to-be-encrypted data of the $EncData_{AAC}$ includes the $ID_{REQ} Nonce_{REQID}$, the $Nonce_{REQ}$, the $Pub_{AAC}$ and $Sig_{AS\_AAC1}$, where the $ID_{REQ} Nonce_{REQID}$, the $Nonce_{REQ}$, the $Pub_{AAC}$ and the $Sig_{AS\_AAC1}$ shall respectively be equal to corresponding fields in the ASVeri. To-be-signed data of the $Sig_{AAC}$ includes other fields before the $Sig_{AAC}$ in the AACAuth. The $MacTag_{AAC}$ is an optional field; and a calculation process of the $MacTag_{AAC}$ includes: performing calculating on the fields, other than the $MacTag_{AAC}$, in the AACAuth using the message integrity check key via the integrity checking algorithm, so as to generate the $MacTag_{AAC}$.

At S711, after receiving the AACAuth, the REQ executes the following operations.

(1) If there is the $Nonce_{REQ}$ in the AACAuth, whether the $Nonce_{REQ}$ is the same as the $Nonce_{REQ}$ generated by the REQ is checked. If there is the $Nonce_{AAC}$ in the AACAuth, whether the $Nonce_{AAC}$ is the same as the $Nonce_{AAC}$ in the AACInit is checked.

(2) If there is the $MacTag_{AAC}$ in the AACAuth, the $MacTag_{AAC}$ is verified.

A verification process is that: the REQ uses the message integrity check key to locally perform calculation on the fields, other than the $MacTag_{AAC}$, in the AACAuth by using the integrity checking algorithm, so as to generate the $MacTag_{AAC}$ (the calculation manner is the same as the manner in which the AAC calculates the $MacTag_{AAC}$), and compares the calculated $MacTag_{AAC}$ with the received $MacTag_{AAC}$ in the AACAuth.

(3) The message encryption key is used to decrypt the $EncData_{AAC}$ by using the symmetric encryption algorithm, so as to obtain the $ID_{REQ} Nonce_{REQID}$, the $Nonce_{REQ}$, the $Pub_{AAC}$ and the $Sig_{AS\_AAC1}$.

(4) The XOR is performed on the $ID_{REQ} Nonce_{REQ}$ and the $Nonce_{REQID}$, so as to recover the $ID_{REQ}$; whether the recovered $ID_{REQ}$ and the self $ID_{REQ}$ of the REQ are the same is verified; and whether the $Nonce_{REQ}$ is the same as the $Nonce_{REQ}$ generated by the REQ is verified.

(5) The $Sig_{AS\_AAC1}$ is verified by using the public key of the AS-AAC, and the $Sig_{AAC}$ is verified by using the $Cert_{AAC}$ in the $Pub_{AAC}$ that is obtained by means of decryption.

(6) If any one of the above checking and verification steps is failed, the AACAuth is immediately discarded; if the above checking and verification all pass, the identity authentication result of the REQ is determined according to the $Res_{AAC}$ in the $Pub_{AAC}$; and if it is determined that the AAC is illegal, the current authentication process is terminated.

(7) The message encryption key is used to calculate an $EncData_{REQ}$.

(8) An $MacTag_{REQ}$ is calculated.

At S712, the REQ sends a fourth authentication response message REQAuth to the AAC.

The AACAuth includes the $Nonce_{AAC}$, the $Nonce_{REQ}$ the $EncData_{REQ}$, and the $MacTag_{REQ}$. The $Nonce_{REQ}$ and the $Nonce_{AAC}$ are optional fields, and shall respectively be equal to the $Nonce_{REQ}$ generated by the REQ and the $Nonce_{AAC}$ in the AACInit. The to-be-encrypted data of the $EncData_{REQ}$ includes $Nonce_{REQPub}$, and the $Nonce_{REQPub}$ shall be equal to the $Nonce_{REQPub}$ generated by the REQ. The calculation process of the $MacTag_{REQ}$ includes: using the message integrity check key to perform calculation on the fields, other than the $MacTag_{REQ}$, in the REQAuth by using the integrity checking algorithm, so as to generate the $MacTag_{REQ}$.

At S713, after receiving the REQAuth, the AAC executes the following operations.

(1) If there is the $Nonce_{REQ}$ in the REQAuth, whether the $Nonce_{REQ}$ is the same as the $Nonce_{REQ}$ in the received REQInit is checked. If there is the $Nonce_{AAC}$ in the REQAuth, whether the $Nonc_{ACC}$ is the same as the $Nonce_{AAC}$ generated by the AAC is checked.

(2) The $MacTag_{REQ}$ is verified.

A verification process is as follows: the AAC uses the message integrity check key to locally performing calculation on the fields, other than the $MacTag_{REQ}$, in the REQAuth by using the integrity checking algorithm, so as to generate the $MacTag_{REQ}$ (the calculation manner is the same as the manner in which the REQ calculates the $MacTag_{REQ}$), and the calculated $MacTag_{REQ}$ is compared with the $MacTag_{REQ}$ in the received REQAuth.

(3) The message encryption key is used to decrypt the $EncData_{REQ}$ by using the symmetric encryption algorithm, so as to obtain the $Nonce_{REQPub}$.

(4) The XOR is performed on the $Nonce_{REQPub}$ and the $Pub_{REQ} Nonce_{REQPub}$, so as to recover the $Pub_{REQ}$.

(5) The $Sig_{REQ}$ is verified by using the $Cert_{REQ}$ in the $Pub_{REQ}$.

(6) After the above checking and the verification all pass, the identity authentication result of the REQ is determined according to the $Res_{REQ}$ in the $Pub_{REQ}$; and if any one of the above checking and verification is failed, the REQAuth is immediately discarded.

It is to be noted that, (1) the REQInit of S704 may not include the $Sig_{REQ}$, while the $Sig_{REQ}$ is added in the REQAuth of S712. That is to say, in S712, the REQ first generates the $Sig_{REQ}$ by performing signature calculation on information including the $Nonce_{AAC}$, the $Nonce_{REQ}$ and the $EncData_{REQ}$. In this case, the $Sig_{REQ}$ verified by the AAC in S713 is the $Sig_{REQ}$ in the REQAuth. (2) The operation of calculating the $Sig_{AAC}$ in S709 may also be changed to be first executed in S706. That is, in S706, the AAC first generates the $Sig_{AAC}$ by performing signature calculation on the information including the $EncPub_{AS}$ in the AACVeri, the $Nonce_{REQ}$, the $ID_{AAC}$, the $Cert_{AAC}$, and the $Nonce_{AAC}$, and then the AACVeri of S706 further includes the $Sig_{AAC}$. In S707, the AS-AAC further needs to verify the $Sig_{AAC}$; and then executes follow-up operations after the verification is successful. In this case, the AAC in S709 does not need to calculate the $Sig_{AAC}$. Correspondingly, the AACAuth of S710 does not include the $Sig_{AAC}$, the REQ in S711 is does not verify the $Sig_{AAC}$, and in this case, the $Pub_{AAC}$ may not include the $Cert_{AAC}$.

Figure 8:
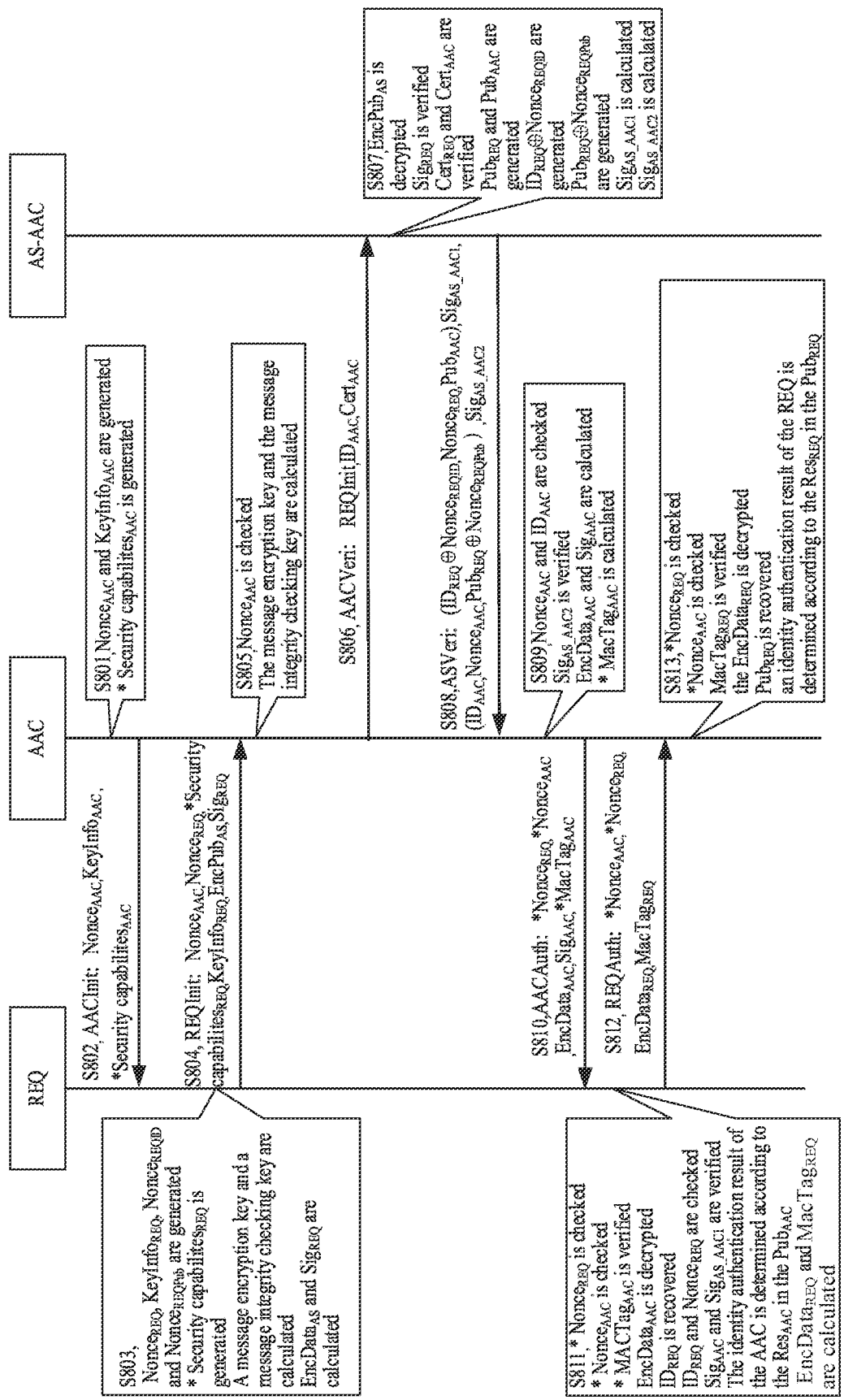
FIG. 8 is a schematic diagram of yet another identity authentication method in a non-roaming case according to an embodiment of the present application, wherein "*" represents an optional field or an optional operation.

FIG. 8 is yet another embodiment of the identity authentication method in the non-roaming case. In this case, the AS-AAC (or the AS-REQ) may be used to represent an authentication server commonly trusted by a REQ and an AAC. In this embodiment, the process of negotiating the message encryption key between the REQ and the AAC is fused in the identity authentication process in parallel, better facilitating project implementation. The $Sig_{REQ}$ is verified by the AS-AAC. The method includes the following operations.

At S801, the AAC generates a $Nonce_{AAC}$ and a $KeyInfo_{AAC}$, and generates Security capabilities$_{AAC}$ according to requirements.

At S802, the AAC sends a key request message AACInit to the REQ.

The AACInit includes the $Nonce_{AAC}$, the $KeyInfo_{AAC}$ and the Security capabilities$_{AAC}$. The Security capabilities$_{AAC}$ is an optional field.

At S803, the REQ generates a $Nonce_{REQ}$, a $KeyInfo_{REQ}$, a $Nonce_{REQID}$, and a $Nonce_{REQPub}$, generates Security capabilities$_{REQ}$ according to requirements, and performs key exchange calculation according to information including a temporary private key corresponding to the $KeyInfo_{REQ}$ and a temporary public key included in the $KeyInfo_{AAC}$, so as to generate the first key K1. Then the REQ combines the K1 with the $Nonce_{AAC}$, the $Nonce_{REQ}$ and other information (other information used by the REQ and the AAC being the same and optional, for example, a specific string), so as to calculate a message encryption key and a message integrity check key by using a negotiated or preset key derivation algorithm, calculates identity information ciphertext $EncPub_{AS}$ of the REQ by using a public key of an encryption certificate; and calculates a $Sig_{REQ}$.

At S804, the REQ sends an identity ciphertext message REQInit to the AAC.

The REQInit includes the $Nonce_{AAC}$, the $Nonce_{REQ}$, the Security capabilities$_{REQ}$, the $KeyInfo_{REQ}$, the $EncPub_{AS}$ and the $Sig_{REQ}$. The Security capabilities$_{REQ}$ is an optional field; the to-be-encrypted data of the $EncPub_{AS}$ includes the $ID_{REQ}$, the $Cert_{REQ}$, the $Nonce_{REQID}$ and the $Nonce_{REQPub}$. To-be-signed data of the $Sig_{REQ}$ includes other fields before the $Sig_{REQ}$ in the REQInit.

At S805, after receiving the REQInit, the AAC executes the following operations.

(1) Whether the $Nonce_{AAC}$ in the REQInit is the same as the $Nonce_{AAC}$ generated by the AAC is checked. If the $Nonce_{AAC}$ in the REQInit is different from the $Nonce_{AAC}$ generated by the AAC, the REQInit is discarded.

(2) the first key K1 is generated by performing Key exchange calculation according to information including the temporary private key corresponding to the $KeyInfo_{AAC}$ and the temporary public key included in the $KeyInfo_{REQ}$. The K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm.

At S806, the AAC sends a first authentication request message AACVeri to the AS-AAC.

The AACVeri includes the REQInit, the $ID_{AAC}$, and the $Cert_{AAC}$.

At S807, after receiving the AACVeri, the AS-AAC executes the following operations.

(1) The private key corresponding to the encryption certificate is used to decrypt the $EncPub_{AS}$ in the REQInit, so as to obtain the $Cert_{REQ}$, the $ID_{REQ}$, the $Nonce_{REQID}$, the and $Nonce_{REQPub}$.

(2) The $Sig_{REQ}$ in the REQInit is verified by using the $Cert_{REQ}$ obtained by means of decryption.

(3) After the legality of the $Cert_{AAC}$ and the legality of the $Cert_{REQ}$ is respectively verified to obtain the $Res_{AAC}$ and the $Res_{REQ}$, a $Pub_{AAC}$ is generated according to information including the $Cert_{AAC}$ and the $Res_{AAC}$. Then, a $Pub_{REQ}$ is generated according to the information including the $Res_{REQ}$; an XOR is performed on the $ID_{REQ}$ and the $Nonce_{REQID}$, so as to generate the $ID_{REQ}$ $Nonce_{REQID}$; and the XOR is performed on the $Pub_{REQ}$ and the $Nonce_{REQPub}$, so as to generate the $Pub_{REQ}$ $Nonce_{REQPub}$.

(4) Signature calculation is performed on the information including the $ID_{REQ}$ $Nonce_{REQID}$, the $Nonce_{REQ}$ and the $Pub_{AAC}$, so as to generate a first digital signature $Sig_{AS\_AAC1}$; and signature calculation is performed on the information including the $ID_{AAC}$, the $Nonce_{AAC}$ and the $Pub_{REQ}$ $Nonce_{REQPub}$, so as to generate a second digital signature $Sig_{AS\_AAC2}$.

At S808, the AS-AAC sends a first authentication response message ASVeri to the AAC.

The ASVeri includes the $ID_{REQ}$ $Nonce_{REQID}$, the $Nonce_{REQ}$, the $Pub_{AAC}$, the $Sig_{AS\_AAC1}$, the $ID_{AAC}$, the $Nonce_{AAC}$, the $Pub_{REQ}$ $Nonce_{REQ}$r and the $Sig_{AS\_AAC2}$. The $ID_{REQ}$, the $Nonce_{REQID}$, the $Nonce_{REQ}$, the $ID_{AAC}$, the $Nonce_{AAC}$ and the $Nonce_{REQPub}$ shall respectively be equal to corresponding fields in the AACVeri.

At S809, after receiving the ASVeri, the AAC executes the following operations.

(1) Whether the $ID_{AAC}$ and the $Nonce_{AAC}$ are respectively the same as the self $ID_{AAC}$ of the AAC and the $Nonce_{AAC}$ generated by the AAC.

(2) The $Sig_{AS\_AAC2}$ is verified by using the public key of the AS-AAC.

(3) If the above checking and the verification all pass, the $EncData_{AAC}$ is calculated by using the message encryption key; and if any one of the above checking and verification is failed, the ASVeri is immediately discarded.

(4) A $Sig_{AAC}$ is calculated.

(5) A $MacTag_{AAC}$ is calculated according to requirements.

At S810, the AAC sends a third authentication response message AACAuth to the REQ.

The AACAuth includes the $Nonce_{REQ}$, the $Nonce_{AAC}$, the $EncData_{AAC}$, the $Sig_{AAC}$ and the $MacTag_{AAC}$. The $Nonce_{REQ}$ and the $Nonce_{AAC}$ are optional fields, and shall respectively be equal to the $Nonce_{REQ}$ in the REQInit and the $Nonce_{AAC}$ generated by the AAC. The to-be-encrypted data of the $EncData_{AAC}$ includes the $ID_{REQ}$ $Nonce_{REQID}$, the $Nonce_{REQ}$, the $Pub_{AAC}$ and $Sig_{AS\_AAC1}$; and the $ID_{REQ}$ $Nonce_{REQID}$, the $Nonce_{REQ}$, the $Pub_{AAC}$ and the $Sig_{AS\_AAC1}$ shall respectively be equal to corresponding fields in the ASVeri. The to-be-signed data of the $Sig_{AAC}$ includes other fields before the $Sig_{AAC}$ in the AACAuth. The $MacTag_{AAC}$ is an optional field, and the calculation thereof is described as above.

At S811, after receiving the AACAuth, the REQ executes the following operations.

(1) If there is the $Nonce_{REQ}$ in the AACAuth, whether the $Nonce_{REQ}$ is the same as the $Nonce_{REQ}$ generated by the REQ is checked. If there is the $Nonce_{AAC}$ in the AACAuth, whether the $Nonce_{AAC}$ is the same as the $Nonce_{AAC}$ in the AACInit is checked.

(2) If there is the $MacTag_{AAC}$ in the AACAuth, the $MacTag_{AAC}$ is verified. The verification process is described in the embodiment of FIG. 7.

(3) The message encryption key is used to decrypt the $EncData_{AAC}$ by using the symmetric encryption algorithm, so as to obtain the $ID_{REQ}$ $Nonce_{REQID}$, the $Nonce_{REQ}$, the $Pub_{AAC}$ and the $Sig_{AS\_AAC1}$.

(4) The XOR is performed on the $ID_{REQ}$ $Nonce_{REQID}$ and the $Nonce_{REQID}$, so as to recover the $ID_{REQ}$; whether the recovered $ID_{REQ}$ and the self $ID_{REQ}$ of the REQ are the same is verified; and whether the $Nonce_{REQ}$ is the same as the $Nonce_{REQ}$ generated by the REQ is verified.

(5) The $Sig_{AS\_AAC1}$ is verified by using the public key of the AS-AAC, and the $Sig_{AAC}$ is verified by using the $Cert_{AAC}$ in the $Pub_{AAC}$ that is obtained by means of decryption.

(6) If any one of the above checking and verification is failed, the AACAuth is immediately discarded. If the above checking and verification all pass, the identity authentication result of the AAC is determined according to the $Res_{AAC}$ in the $Pub_{AAC}$, and if it is determined that the AAC is illegal, the current authentication process is terminated.

(7) The message encryption key is used to calculate the $EncData_{REQ}$.

(8) The $MacTag_{REQ}$ is calculated, and a calculation process is described in the embodiment of FIG. 7.

At S812, the REQ sends a fourth authentication response message REQAuth to the AAC.

The AACAuth includes the $Nonce_{AAC}$, the $Nonce_{REQ}$, the $EncData_{REQ}$, and the $MacTag_{REQ}$. The $Nonce_{REQ}$ and the $Nonce_{AAC}$ are optional fields, and shall respectively be equal to the $Nonce_{REQ}$ generated by the REQ and the $Nonce_{AAC}$ in the AACInit. The to-be-encrypted data of the $EncData_{REQ}$ includes the $Nonce_{REQPub}$; and the $Nonce_{REQPub}$ shall be equal to the $Nonce_{REQPub}$ generated by the REQ.

At S813, after receiving the REQAuth, the AAC executes the following operations.

(1) If there is the $Nonce_{REQ}$ in the REQAuth, whether the $Nonce_{REQ}$ is the same as the $Nonce_{REQ}$ in the received REQInit is checked. If there is the $Nonce_{AAC}$ in the REQAuth, whether the $Nonce_{AAC}$ is the same as the $Nonce_{AAC}$ generated by the AAC is checked.

(2) The $MacTag_{REQ}$ is verified; and a verification process is described in the embodiment of FIG. 7.

(3) The message encryption key is used to decrypt the $EncData_{REQ}$ by using the symmetric encryption algorithm, so as to obtain the $Nonce_{REQPub}$.

(4) The XOR is performed on the $Nonce_{REQPub}$ and the $Pub_{REQ}$ $Nonce_{REQPub}$, so as to recover the $Pub_{REQ}$.

(5) After the above checking and the verification all pass, an identity authentication result of the REQ is determined according to the $Res_{REQ}$ in the $Pub_{REQ}$; and if any one of the above checking and verification is failed, the REQAuth is immediately discarded.

It is to be noted that, the operation of calculating the $Sig_{AAC}$ in S809 may also be changed to be preciously executed in S806. That is, in S806, the AAC first generates the $Sig_{AAC}$ by performing signature calculation on the REQInit, the $ID_{AAC}$ and the $Cert_{AAC}$, and the AACVeri of S806 further includes the $Sig_{AAC}$. In S807, the AS-AAC further needs to verify the $Sig_{AAC}$, and then executes follow-up operations after the verification is successful. In this case, the AAC in S809 does not need to calculate the $Sig_{AAC}$. Correspondingly, the AACAuth of S810 does not include the $Sig_{AAC}$, the REQ in S811 does not verify the $Sig_{AAC}$, and in this case, the $Pub_{AAC}$ may not include the $Cert_{AAC}$.

Figure 9:
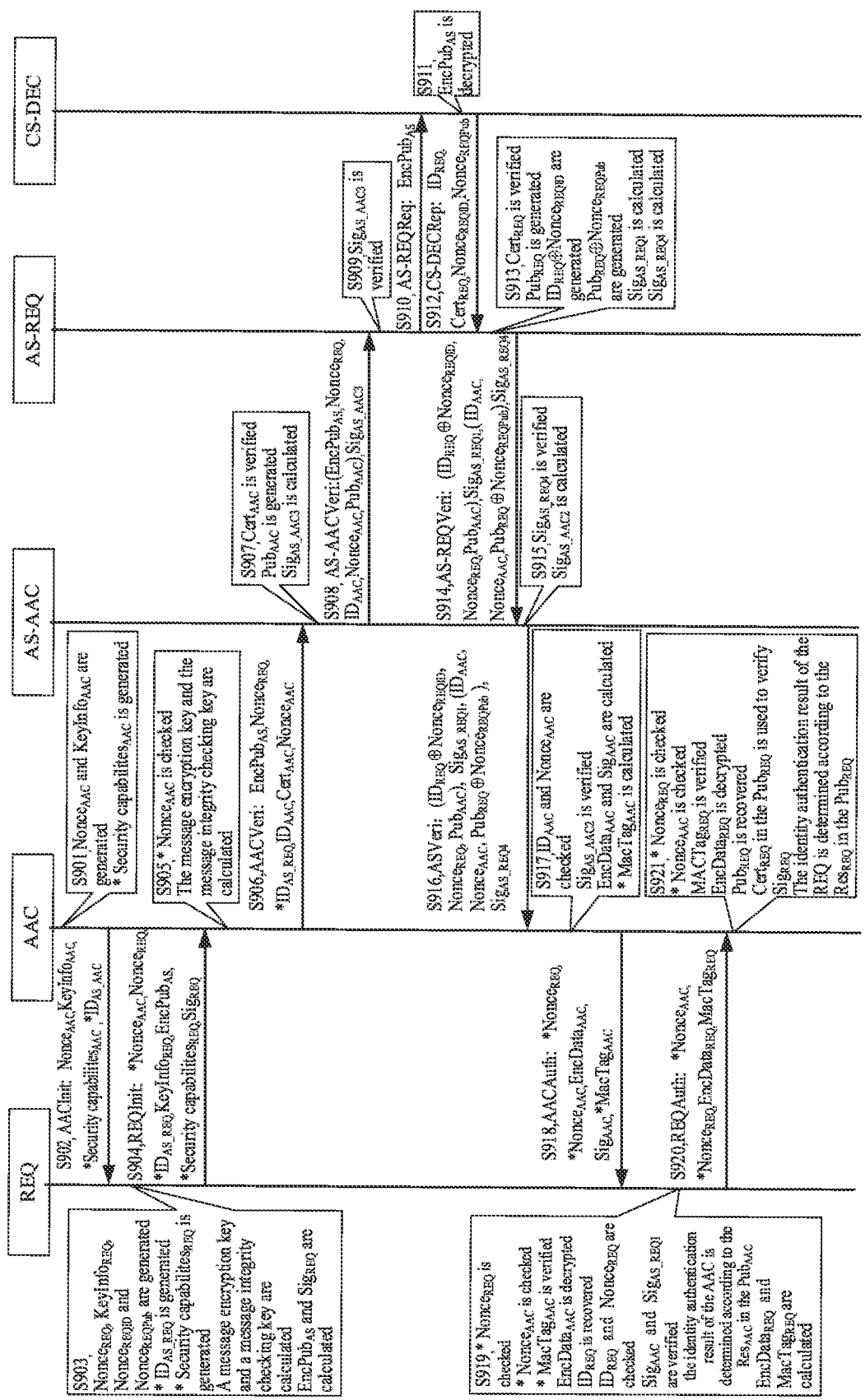
FIG. 9 is a schematic diagram of still another identity authentication method in a roaming case according to an embodiment of the present application, wherein "*" represents an optional field or an optional operation.

FIG. 9 is yet another embodiment of the identity authentication method in the roaming case. In this embodiment, the process of negotiating a message encryption key between a REQ and an AAC is fused in the identity authentication process in parallel, better facilitating project implementation. A $Sig_{REQ}$ of the REQ is verified by the AAC. The method includes the following steps.

At S901, the AAC generates a $Nonce_{AAC}$ and a $KeyInfo_{AAC}$, and generates Security capabilities$_{AAC}$ according to requirements.

At S902, the AAC sends a key request message AACInit to the REQ.

The AACInit includes the $Nonce_{AAC}$, the $KeyInfo_{AAC}$, the Security capabilities$_{AAC}$, and an $ID_{AS\_AAC}$. The Security capabilities$_{AAC}$ is an optional field. The $ID_{AS\_AAC}$ is an optional field and represents the identity identifier of at least one authentication server AS trusted by the AAC, so that the REQ determines, according to the $ID_{AS\_AAC}$, whether there is a commonly trusted authentication server AS (hereinafter the same).

At S903, the REQ generates a $Nonce_{REQ}$, a $KeyInfo_{REQ}$, a $Nonce_{REQID}$, and a $Nonce_{REQPub}$, generates the Security capabilities$_{REQ}$ and the $ID_{AS\_REQ}$ according to requirements, and performs key exchange calculation according to information including a temporary private key corresponding to the $KeyInfo_{REQ}$ and a temporary public key included in the $KeyInfo_{AAC}$, so as to generate the first key K1. Then the REQ combines the K1 with the $Nonce_{AAC}$, the $Nonce_{REQ}$ and other information (other information used by the REQ and the AAC being the same and optional, for example, a specific string), so as to calculate a message encryption key and a message integrity check key by using a negotiated or preset key derivation algorithm; calculates identity information ciphertext $EncPub_{AS}$ of the REQ by using a public key of the encryption certificate, and calculates a $Sig_{REQ}$.

At S904, the REQ sends an identity ciphertext message REQInit to the AAC.

The REQInit includes the $Nonce_{AAC}$, the $Nonce_{REQ}$, the $ID_{AS\_REQ}$, the $KeyInfo_{REQ}$, the $EncPub_{AS}$, the Security capabilities$_{REQ}$, and the $Sig_{REQ}$. The $Nonce_{AAC}$, the $ID_{AS\_REQ}$ and the Security capabilities$_{REQ}$ are optional fields. The $Nonce_{AAC}$ shall be equal to a corresponding field in the AACInit. The to-be-encrypted data of the $EncPub_{AS}$ includes the $ID_{REQ}$, the $Cert_{REQ}$, the $Nonce_{REQID}$, and the $Nonce_{REQPub}$. The to-be-signed data of the $Sig_{REQ}$ includes other fields before the $Sig_{REQ}$ in the REQInit. When the REQInit does not include the $Nonce_{AAC}$, the to-be-signed data of the $Sig_{REQ}$ further includes the $Nonce_{AAC}$ field in the AACInit. The $ID_{AS\_REQ}$ represents the identity identifier of at least one authentication server trusted by the REQ. When there is the $ID_{AS\_AAC}$ in the AACInit, the REQ tries to select, from the trusted ASs, at least one AS same as that in the $ID_{AS\_AAC}$ as the $ID_{AS\_REQ}$. If the selection is failed, the REQ uses at least one authentication server trusted by the REQ as the $ID_{AS\_REQ}$. When there is no $ID_{AS\_AAC}$ in the AACInit, the REQ uses the at least one AS trusted by the REQ as the $ID_{AS\_REQ}$ (same as the entire text).

At S905, after receiving the REQInit, the AAC executes the following operations.

(1) If there is the $Nonce_{AAC}$ in the REQInit, whether the $Nonce_{AAC}$ is the same as the $Nonce_{AAC}$ generated by the AAC is checked. If the $Nonce_{AAC}$ is different from the $Nonce_{AAC}$ generated by the AAC, the REQInit is discarded.

(2) The first key K1 is generated by performing key exchange calculation according to information including the temporary private key corresponding to the $KeyInfo_{AAC}$ and the temporary public key included in the $KeyInfo_{REQ}$. The K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm. The calculation may be executed when the message integrity check key and/or the message integrity check key needs to be used by the AAC.

(3) If the REQInit carries the $ID_{AS\_REQ}$, and the AACInit carries the $ID_{AS\_AAC}$, the AAC determines whether there is the identity identifier of at least one same AS in the $ID_{AS\_REQ}$ and the $ID_{AS\_AAC}$. If yes, that is the non-roaming case. The AAC determines a first authentication server involved in identity authentication from the identity identifier of the at least one AS that is commonly trusted by REQ and the AAC. If no, that is the roaming case. The AAC needs to determine, according to the $ID_{AS\_AAC}$, a first authentication server AS-AAC involved in identity authentication, and sends the $ID_{AS\_REQ}$ to the AS-AAC, such that the AS-AAC determines a second first authentication server AS-REQ according to the $ID_{AS\_REQ}$.

Alternatively, if the REQInit carries the $ID_{AS\_REQ}$, but the AACInit does not carry the $ID_{AS\_AAC}$, the AAC determines whether there is the identity identifier of at least one same AS in the ASs trusted by the $ID_{AS\_REQ}$ and the AAC. If yes, that is the non-roaming case. The AAC determines a first authentication server involved in identity authentication from the identity identifier of the at least one authentication server that is commonly trusted by REQ and the AAC. If no, that is the roaming case. The AAC needs to determine, according to the AS trusted by the ACC, a first authentication server involved in identity authentication, and sends the $ID_{AS\_REQ}$ to the AS-AAC, such that the AS-AAC determines a second authentication server AS-REQ according to the $ID_{AS\_REQ}$.

It is to be noted that, in this embodiment, the result of the determination is the roaming case.

At S906, the AAC sends a first authentication request message AACVeri to the AS-AAC.

The AACVeri includes the $EncPub_{AS}$, the $Nonce_{REQ}$, the $ID_{AS\_REQ}$, the $ID_{AAC}$, the $Cert_{AAC}$, and the $Nonce_{AAC}$. The $ID_{AS\_REQ}$ is an optional field. The $Nonce_{REQ}$ and the $ID_{AS\_REQ}$ shall be respectively equal to corresponding fields in the REQInit. The $Nonce_{AAC}$ shall be equal to the $Nonce_{AAC}$ generated by the AAC.

At S907, after receiving the AACVeri, the AS-AAC executes the following operations.

(1) The legality of the $Cert_{AAC}$ is verified to obtain the $Res_{AAC}$, and a $Pub_{AAC}$ is generated according to information including the $Cert_{AAC}$ and the $Res_{AAC}$.

(2) If there is the $ID_{AS\_REQ}$ in the AACVeri, the AS-AAC determines the second authentication server AS-REQ according to the $ID_{AS\_REQ}$. If there is no $ID_{AS\_REQ}$ in the AACVeri, it indicates that the AS-REQ has been known by the AS-AAC.

(3) A third digital signature $Sig_{AS\_AAC3}$ is calculated.

At S908, the AS-AAC sends a second authentication response message the AS-AACVeri to the AS-REQ.

The AS-AACVeri includes the $EncPub_{AS}$, the $Nonce_{REQ}$, the $ID_{AAC}$, the $Nonce_{AAC}$, the $Pub_{AAC}$, and the $Sig_{AS\_AAC3}$. The $EncPub_{AS}$, the $Nonce_{REQ}$, the $ID_{AAC}$, and the $Nonce_{AAC}$ shall be respectively equal to corresponding fields in the AACVeri. To-be-signed data of the $Sig_{AS\_AAC3}$ includes other fields before the $Sig_{AS\_AAC}$ in the AS-AACVeri.

At S909, after receiving the AS-AACVeri, the AS-REQ verifies the $Sig_{AS\_AAC3}$ by using the public key of the AS-AAC.

If the verification is successful, S910 is executed.

At S910, the AS-REQ sends a decryption request message AS-REQReq to the CS-DEC.

The AS-REQReq includes the $EncPub_{AS}$. The $EncPub_{AS}$ shall be equal to the corresponding field in the AS-AACVeri.

At S911, the CS-DEC decrypts the $EncPub_{AS}$, so as to obtain the $Cert_{REQ}$, the $ID_{REQ}$, the $Nonce_{REQID}$, and the $Nonce_{REQPub}$.

At S912, the CS-DEC sends a decryption response message CS-DECRep to the AS-REQ.

The CS-DECRep includes the $Cert_{REQ}$, the $ID_{REQ}$, the $Nonce_{REQ}$ and the $Nonce_{REQPub}$, which are obtained by means of decryption. The $Cert_{REQ}$, the $ID_{REQ}$, the Non-$ce_{REQID}$, and the $Nonce_{REQPub}$ shall respectively be equal to corresponding fields in the AS-AACVeri.

At S913, after receiving the CS-DECRep, the AS-REQ executes the following operations.

(1) The legality of the $Cert_{REQ}$ is verified to obtain the $Res_{REQ}$. A $Pub_{REQ}$ is generated according to information including the $Cert_{REQ}$ and the $Res_{REQ}$. An XOR is performed on the $ID_{REQ}$ and the $Nonce_{REQID}$, so as to generate the $ID_{REQ}$ $Nonce_{REQID}$; and the XOR is performed on the $Pub_{REQ}$ and the $Nonce_{REQPub}$, so as to generate the $Pub_{REQ}$ $Nonce_{REQPub}$.

(2) Signature calculation is performed on information including the $ID_{REQ}$ $Nonce_{REQID}$, the $Nonce_{REQ}$ and the $Pub_{AAC}$, so as to generate a first digital signature $Sig_{AS\_REQ1}$ and signature calculation is performed on information including the $ID_{AAC}$, the $Nonce_{AAC}$ and the $Pub_{REQ}$ $Nonce_{REQPub}$, so as to generate a fourth digital signature $Sig_{AS\_REQ4}$.

At S914, the AS-REQ sends a second authentication response message AS-REQVeri to the AS-AAC.

The AS-REQVeri includes the $ID_{REQ}$ $Nonce_{REQID}$, the $Nonce_{REQ}$, the $Pub_{AAC}$, the $Sig_{AS\_REQ1}$, the $ID_{AAC}$, the $Nonce_{AAC}$, the $Pub_{REQ}$ $Nonce_{REQPub}$ and the $Sig_{AS\_REQ4}$. The $ID_{REQ}$, the $Nonce_{REQID}$ and the $Nonce_{REQPub}$ shall be respectively equal to corresponding fields in the CS-DECRep. The $Nonce_{REQ}$, the $ID_{AAC}$, the $Nonce_{AAC}$, and the $Pub_{AAC}$ shall be respectively equal to corresponding fields in the AS-AACVeri.

At S915, the AS-AAC verifies the $Sig_{AS\_REQ4}$ by using the public key of the AS-REQ. If the verification is successful, the AS-AAC generates a second digital signature $Sig_{AS\_AAC}$ by performing signature calculation on information including the $ID_{AAC}$, the $Nonce_{AAC}$, and the $Pub_{REQ}$ $Nonce_{REQPub}$.

At S916, the AS-AAC sends a first authentication response message ASVeri to the AAC.

The ASVeri includes the $ID_{REQ}$ $Nonce_{REQID}$, the $Nonce_{REQ}$, the $Pub_{AAC}$, the $Sig_{AS\_REQ1}$, the $ID_{AAC}$, the $Nonce_{AAC}$, the $Pub_{REQ}$ $Nonce_{REQPub}$, and the $Sig_{AS\_AAC2}$. The $ID_{REQ}$ $Nonce_{REQID}$, the $Nonce_{REQ}$, the $Pub_{AAC}$, the $Sig_{AS\_REQ1}$, the $ID_{AAC}$ the $Nonce_{AAC}$, and the $Pub_{REQ}$ $Nonce_{REQPub}$ are all obtained from the AS-REQVeri.

At S917, after receiving the ASVeri, the AAC executes the following operations.

(1) Whether the $ID_{AAC}$ and the $Nonce_{AAC}$ are respectively the same as the self $ID_{AAC}$ of the AAC and the $Nonce_{AAC}$ generated by the AAC.

(2) The $Sig_{AS\_AAC2}$ is verified by using the public key of the AS-AAC.

(3) If the above checking and the verification all pass, the $EncData_{AAC}$ is calculated by using the message encryption key If any one of the above checking and verification is failed, the ASVeri is immediately discarded.

(4) The $Sig_{AAC}$ is calculated.

(5) The $MacTag_{AAC}$ is calculated according to requirements.

At S918, the AAC sends a third authentication response message AACAuth to the REQ.

The AACAuth includes the $Nonce_{REQ}$, the $Nonce_{AAC}$, the $EncData_{AAC}$, the $Sig_{AAC}$ and the $MacTag_{AAC}$. The to-be-signed data of the $Sig_{AAC}$ includes other fields before the $Sig_{AAC}$ in the AACAuth. The $Nonce_{REQ}$ and the $Nonce_{AAC}$ are optional fields, and shall respectively be equal to the $Nonce_{REQ}$ in the REQInit and the $Nonce_{AAC}$ generated by the AAC. The to-be-encrypted data of the $EncData_{AAC}$ includes the $ID_{REQ}$ $Nonce_{REQID}$, the $Nonce_{REQ}$, the $Pub_{AAC}$ and $Sig_{AS\_REQ1}$, where the $ID_{REQ}$ $Nonce_{REQID}$, the $Nonce_{REQ}$, the $Pub_{AAC}$ and the $Sig_{AS\_REQ1}$ shall respectively be equal to corresponding fields in the ASVeri. The MacTag$_{AAC}$ is an optional field, and the calculation of which is as described in the embodiment of FIG. 7.

At S919, after receiving the AACAuth, the REQ executes the following operations.

(1) If there is the Nonce$_{REQ}$ in the AACAuth, whether the Nonce$_{REQ}$ is the same as the Nonce$_{REQ}$ generated by the REQ is checked. If there is the Nonce$_{AAC}$ in the AACAuth, whether the Nonc$_{ACC}$ is the same as the Nonce$_{AAC}$ in the AACInit is checked.

(2) If there is the MacTag$_{AAC}$ in the AACAuth, the MacTag$_{AAC}$ is verified; and a verification process is as described in the embodiment of FIG. 7.

(3) The message encryption key is used to decrypt the EncData$_{AAC}$ by using the symmetric encryption algorithm, so as to obtain the ID$_{REQ}$ Nonce$_{REQID}$, the Nonce$_{REQ}$, the Pub$_{AAC}$ and the Sig$_{AS\_REQ1}$.

(4) The XOR is performed on the ID$_{REQ}$ Nonce$_{REQID}$ and the Nonce$_{REQID}$, so as to recover the ID$_{REQ}$; whether the recovered ID$_{REQ}$ and the self ID$_{REQ}$ of the REQ are the same is verified; and whether the Nonce$_{REQ}$ is the same as the Nonce$_{REQ}$ generated by the REQ is verified.

(5) The Sig$_{AS\_REQ1}$ is verified by using the public key of the AS-REQ, and the Sig$_{AAC}$ is verified by using the Cert$_{AAC}$ in the Pub$_{AAC}$ that is obtained by means of decryption.

(6) If any one of the above checking and verification is failed, the AACAuth is immediately discarded. If the above checking and verification all pass, the identity authentication result of the AAC is determined according to the Res$_{AAC}$ in the Pub$_{AAC}$. If it is determined that the AAC is illegal, the current authentication process is terminated.

(7) The message encryption key is used to calculate an EncData$_{REQ}$.

(8) The MacTag$_{REQ}$ is calculated, and a calculation process is as described in the embodiment of FIG. 7.

At S920, the REQ sends a fourth authentication response message REQAuth to the AAC.

The AACAuth includes the Nonce$_{AAC}$, the Nonc$_{REQ}$, the EncData$_{REQ}$, and the MacTag$_{REQ}$. The Nonce$_{REQ}$ and the Nonce$_{AAC}$ are optional fields, and shall respectively be equal to the Nonce$_{REQ}$ generated by the REQ and the Nonce$_{AAC}$ in the AACInit. The to-be-encrypted data of the EncData$_{REQ}$ includes the Nonce$_{REQPub}$, and the Nonce$_{REQPub}$ shall be equal to the Nonce$_{REQPub}$ generated by the REQ.

At S921, after receiving the REQAuth, the AAC executes the following operations.

(1) If there is the Nonce$_{REQ}$ in the REQAuth, whether the Nonce$_{REQ}$ is the same as the Nonce$_{REQ}$ in the received REQInit is checked. If there is the Nonc$_{ACC}$ in the REQ-Auth, whether the Nonce$_{AAC}$ is the same as the Nonce$_{AAC}$ generated by the AAC is checked.

(2) The MacTag$_{REQ}$ is verified; and a verification process is described in the embodiment of FIG. 7.

(3) The message encryption key is used to decrypt the EncData$_{REQ}$ by using the symmetric encryption algorithm, so as to obtain the Nonce$_{REQPub}$.

(4) The XOR is performed on the Nonce$_{REQPub}$ and the Pub$_{REQ}$ Nonce$_{REQPub}$, so as to recover the Pub$_{REQ}$.

(5) The Sig$_{REQ}$ is verified by using the Cert$_{REQ}$ in the Pub$_{REQ}$.

(6) After the above checking and the verification all pass, the identity authentication result of the REQ is determined according to the Res$_{REQ}$ in the Pub$_{REQ}$. If any one of the above checking and verification is failed, the REQAuth is immediately discarded.

It is to be noted that, (1) the REQInit of S904 may not include the Sig$_{REQ}$, while the Sig$_{REQ}$ is added in the REQ-Auth of S920. That is to say, in S920, the REQ first generates the Sig$_{REQ}$ by performing signature calculation on information including the Nonce$_{AAC}$, the Nonce$_{REQ}$ and the EncData$_{REQ}$. In this case, the Sig$_{REQ}$ verified in S921 is the Sig$_{REQ}$ in the REQAuth. (2) The operation of calculating the Sig$_{AAC}$ in S917 may also be changed to be previously executed in S906. That is, in S906, the AAC first generates the Sig$_{AAC}$ by performing signature calculation on the information including the EncPub$_{AS}$, the Nonce$_{REQ}$, the ID$_{AS\_REQ}$, the ID$_{AAC}$, the Cert$_{AAC}$, and the Nonce$_{AAC}$, and the AACVeri of S906 further includes the Sig$_{AAC}$. In S907, the AS-AAC further needs to verify the Sig$_{AAC}$; and then executes follow-up operations after the verification is successful. In this case, the AAC in S917 does not need to calculate the Sig$_{AAC}$. Correspondingly, the AACAuth of S918 does not include the Sig$_{AAC}$, the REQ in S919 does not verify the Sig$_{AAC}$, and in this case, the Pub$_{AAC}$ may not include the Cert$_{AAC}$.

Figure 10:
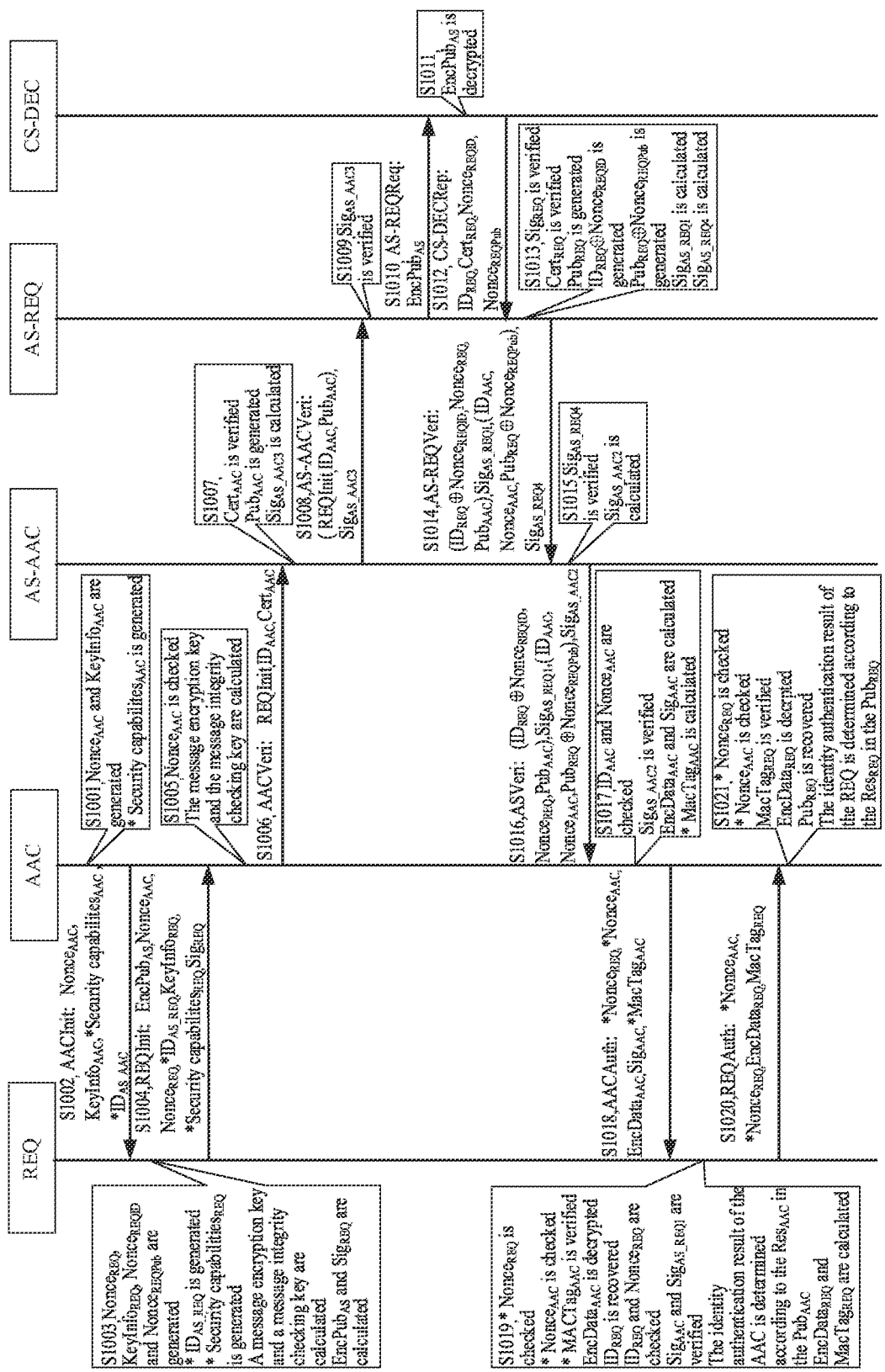
FIG. 10 is a schematic diagram of yet another identity authentication method in a roaming case according to an embodiment of the present application, wherein "*" represents an optional field or an optional operation.

FIG. 10 is still another embodiment of the identity authentication method in the roaming case. In this embodiment, the process of negotiating a message encryption key between a REQ and an AAC is fused in the identity authentication process in parallel, better facilitating project implementation. The Sig$_{REQ}$ is verified by the AS-REQ. The method includes the following steps.

At S1001, the AAC generates a Nonce$_{AAC}$ and a KeyInfo$_{AAC}$, and generates Security capabilities$_{AAC}$ according to requirements.

At S1002, the AAC sends a key request message AACInit to the REQ.

The AACInit includes the Nonce$_{AAC}$, the KeyInfo$_{AAC}$, the Security capabilities$_{AAC}$, and an ID$_{AS\_AAC}$. The Security capabilities$_{AAC}$ and the ID$_{AS\_AAC}$ are optional fields.

At S1003, the REQ generates a Nonce$_{REQ}$, a KeyInfo$_{REQ}$, a Nonce$_{REQID}$, and a Nonce$_{REQPub}$, generates Security capabilities$_{REQ}$ and an ID$_{AS\_REQ}$ according to requirements, and performs key exchange calculation according to information including a temporary private key corresponding to the KeyInfo$_{REQ}$ and a temporary public key included in the KeyInfo$_{AAC}$, so as to generate the first key K1. Then the REQ combines the K1 with the Nonce$_{AAC}$, the Nonce$_{REQ}$ and other information (other information used by the REQ and the AAC being the same and optional, for example, a specific string), so as to calculate a message encryption key and a message integrity check key by using a negotiated or preset key derivation algorithm; calculates identity information ciphertext EncPub$_{AS}$ of the REQ by using the public key of the encryption certificate; and calculates the Sig$_{REQ}$.

At S1004, the REQ sends an identity ciphertext message REQInit to the AAC.

The REQInit includes the EncPub$_{AS}$, the Nonce$_{AAC}$, the Nonce$_{REQ}$, the ID$_{AS\_REQ}$, the KeyInfo$_{REQ}$, the Security capabilities$_{REQ}$, and the Sig$_{REQ}$. The Nonce$_{AAC}$ shall be equal to a corresponding field in the AACInit. The Security capabilities$_{REQ}$ and the ID$_{AS\_REQ}$ are optional fields. The to-be-encrypted data of the EncPub$_{AS}$ includes the ID$_{REQ}$, the Cert$_{REQ}$, the Nonce$_{REQID}$, and the Nonce$_{REQPub}$. To-be-signed data of the Sig$_{REQ}$ includes other fields before the Sig$_{REQ}$ in the REQInit.

At S1005, after receiving the REQInit, the AAC executes the following operations.

(1) Whether the Nonce$_{AAC}$ in the REQInit is the same as the Nonce$_{AAC}$ generated by the AAC is checked; and if the Nonce$_{AAC}$ in the REQInit is different from the Nonce$_{AAC}$ generated by the AAC, the REQInit is discarded.

(2) Key exchange calculation is performed according to information including the temporary private key corresponding to the KeyInfo$_{AAC}$ and the temporary public key included in the KeyInfo$_{REQ}$, so as to generate a first key K1; the K1 is combined with the Nonce$_{AAC}$, the Nonce$_{REQ}$ and other information (other information used by the AAC and the REQ being the same and optional, for example, a specific string), so as to calculate the message encryption key and the message integrity check key by using the negotiated or preset key derivation algorithm. The calculation of the message integrity check key and/or the message integrity check key may also be executed when needed later.

(3) The determination of a first authentication server AS-AAC refers to the related description in the embodiment of FIG. 9.

It is to be noted that, in this embodiment, the result of the determination is the roaming case.

At S1006, the AAC sends a first authentication request message AACVeri to the AS-AAC.

The AACVeri includes the REQInit, the ID$_{AAC}$, and the Cert$_{AAC}$.

At S1007, after receiving the AACVeri, the AS-AAC executes the following operations.

(1) The legality of the Cert$_{AAC}$ is verified to obtain the Res$_{AAC}$, and a Pub$_{AAC}$ is generated according to information including the Cert$_{AAC}$ and the Res$_{AAC}$.

(2) The determination of the AS-REQ refers to related description in the embodiment of FIG. 9.

(3) The Sig$_{AS\_AAC}$ is calculated.

At S1008, the AS-AAC sends a second authentication response message AS-AACVeri to the AS-REQ.

The AS-AACVeri includes the REQInit, the ID$_{AAC}$, the Pub$_{AAC}$, and the Sig$_{AS\_AAC3}$. The REQInit and the ID$_{AAC}$ shall respectively be equal to the REQInit and the ID$_{AAC}$ in the AACVeri. To-be-signed data of the Sig$_{AS\_AAC3}$ includes other fields before the Sig$_{AS}$ AAC in the AS-AACVeri.

At S1009, after receiving the AS-AACVeri, the AS-REQ verifies the Sig$_{AS\_AAC3}$ by using the public key of the AS-AAC.

If the verification is successful, S1010 is executed.

At S1010, the AS-REQ sends a decryption request message AS-REQReq to the CS-DEC.

The AS-REQReq includes the EncPub$_{AS}$. The EncPub$_{AS}$ shall be equal to the corresponding field in the AS-AACVeri.

At S1011, the CS-DEC decrypts the EncPub$_{AS}$, so as to obtain the Cert$_{REQ}$, the ID$_{REQ}$, the Nonce$_{REQID}$, and the Nonce$_{REQPub}$.

At S1012, the CS-DEC sends a decryption response message CS-DECRep to the AS-REQ.

The CS-DECRep includes the Cert$_{REQ}$, the ID$_{REQ}$, the Nonce$_{REQID}$, and the Nonce$_{REQPub}$, which are obtained by means of decryption. The Cert$_{REQ}$, the ID$_{REQ}$, the Nonce$_{REQID}$, and the Nonce$_{REQPub}$ shall respectively be equal to corresponding fields in the AS-AACVeri.

At S1013, after receiving the CS-DECRep, the AS-REQ executes the following operations.

(1) The Sig$_{REQ}$ is verified by using the Cert$_{REQ}$; and if the verification is failed, the CS-DECRep is discarded.

(2) The legality of the Cert$_{REQ}$ is verified to obtain the Res$_{REQ}$. A Pub$_{REQ}$ is generated according to information including the Res$_{REQ}$. An XOR is performed on the ID$_{REQ}$ and the Nonce$_{REQID}$, so as to generate the ID$_{REQ}$ Nonce$_{REQID}$; and the XOR is performed on the Pub$_{REQ}$ and the Nonce$_{REQPub}$, so as to generate the Pub$_{REQ}$ Nonce$_{REQPub}$.

(3) Signature calculation is performed on information including the ID$_{REQ}$ Nonce$_{REQID}$, the Nonce$_{REQ}$ and the Pub$_{AAC}$, so as to generate a first digital signature Sig$_{AS\_REQ1}$; and signature calculation is performed on information including the ID$_{AAC}$, the Nonce$_{AAC}$ and the Pub$_{REQ}$ Nonce$_{REQPub}$, so as to generate a fourth digital signature Sig$_{AS\_REQ4}$.

At S1014, the AS-REQ sends a second authentication response message AS-REQVeri to the AS-AAC.

The AS-REQVeri includes the ID$_{REQ}$ Nonce$_{REQID}$, the Nonce$_{REQ}$, the Pub$_{AAC}$, the Sig$_{AS\_REQ1}$, the ID$_{AAC}$, the Nonce$_{AAC}$, the Pub$_{REQ}$ Nonce$_{REQ}$ and the Sig$_{AS\_REQ4}$. The ID$_{REQ}$, the Nonce$_{REQID}$ and the Nonce$_{REQPub}$ shall be respectively equal to corresponding fields in the CS-DECRep; and the Nonce$_{REQ}$, the ID$_{AAC}$, the Nonce$_{AAC}$, and the Pub$_{AAC}$ shall be respectively equal to corresponding fields in the AS-AACVeri.

At S1015, the AS-AAC verifies the Sig$_{AS\_REQ4}$ by using the public key of the AS-REQ If the verification is successful, the AS-AAC generates a second digital signature Sig$_{AS\_AAC2}$ by performing signature calculation on information including the ID$_{AAC}$, the Nonce$_{AAC}$, and the Pub$_{REQ}$ Nonce$_{REQPub}$.

At S1016, the AS-AAC sends a first authentication response message ASVeri to the AAC.

The ASVeri includes the ID$_{REQ}$ Nonce$_{REQID}$, the Nonce$_{REQ}$, the Pub$_{AAC}$, the Sig$_{AS\_REQ1}$, the ID$_{AAC}$, the Nonce$_{AAC}$, the Pub$_{REQ}$ Nonce$_{REQPub}$, and the Sig$_{AS\_AAC2}$. The ID$_{REQ}$ Nonce$_{REQID}$, the Nonce$_{REQ}$, the Pub$_{AAC}$, the Sig$_{AS\_REQ1}$, the ID$_{AAC}$, the Nonce$_{AAC}$, and the Pub$_{REQ}$ Nonce$_{REQPub}$ are all obtained from the AS-REQVeri.

At S1017, after receiving the ASVeri, the AAC executes the following operations.

(1) Whether the ID$_{AAC}$ and the Nonce$_{AAC}$ are respectively the same as the self ID$_{AAC}$ of the AAC and the Nonce$_{AAC}$ generated by the AAC.

(2) The Sig$_{AS\_AAC2}$ is verified by using the public key of the AS-AAC.

(3) If the above checking and the verification all pass, the EncData$_{AAC}$ is calculated by using the message encryption key. If any one of the above checking and verification is failed, the ASVeri is immediately discarded.

(4) The Sig$_{AAC}$ is calculated.

(5) The MacTag$_{AAC}$ is calculated according to requirements.

At S1018, the AAC sends a third authentication response message AACAuth to the REQ.

The AACAuth includes the Nonce$_{REQ}$, the Nonce$_{AAC}$, the EncData$_{AAC}$, the Sig$_{AAC}$ and the MacTag$_{AAC}$. To-be-signed data of the Sig$_{AAC}$ includes other fields before the Sig$_{AAC}$ in the AACAuth. The Nonce$_{REQ}$ and the Nonce$_{AAC}$ are optional fields, and shall respectively be equal to the Nonce$_{REQ}$ in the REQInit and the Nonce$_{AAC}$ generated by the AAC, to-be-encrypted data of the EncData$_{AAC}$ includes the ID$_{REQ}$ Nonce$_{REQID}$, the Nonce$_{REQ}$, the Pub$_{AAC}$ and Sig$_{AS\_REQ1}$, where the ID$_{REQ}$ Nonce$_{REQID}$, the Nonce$_{REQ}$, the Pub$_{AAC}$ and the Sig$_{AS\_REQ1}$ shall respectively be equal to corresponding fields in the ASVeri. The MacTag$_{AAC}$ is an optional field, and the calculation of which is as described in the embodiment of FIG. 7.

At S1019, after receiving the AACAuth, the REQ executes the following operations.

(1) If there is the Nonce$_{REQ}$ in the AACAuth, whether the Nonce$_{REQ}$ is the same as the Nonce$_{REQ}$ generated by the REQ is checked. If there is the Nonce$_{AAC}$ in the AACAuth, whether the Nonce$_{AAC}$ is the same as the Nonce$_{AAC}$ in the AACInit is checked.

(2) If there is the MacTag$_{AAC}$ in the AACAuth, the MacTag$_{AAC}$ is verified; and a verification process is as described in the embodiment of FIG. 7.

(3) The message encryption key is used to decrypt the EncData$_{AAC}$ by using the symmetric encryption algorithm, so as to obtain the ID$_{REQ}$ Nonce$_{REQID}$, the Nonce$_{REQ}$, the Pub$_{AAC}$ and the Sig$_{AS\_REQ1}$.

(4) The XOR is performed on the ID$_{REQ}$ Nonce$_{REQID}$ and the Nonce$_{REQID}$, so as to recover the ID$_{REQ}$; whether the recovered ID$_{REQ}$ and the self ID$_{REQ}$ of the REQ are the same is verified; and whether the Nonce$_{REQ}$ is the same as the Nonce$_{REQ}$ generated by the REQ is verified.

(5) The Sig$_{AS\_REQ1}$ is verified by using the public key of the AS-REQ, and the Sig$_{AAC}$ is verified by using the Cert$_{AAC}$ in the Pub$_{AAC}$ that is obtained by means of decryption.

(6) If any one of the above checking and verification is failed, the AACAuth is immediately discarded. If the above checking and verification all pass, the identity authentication result of the ACC is determined according to the Res$_{AAC}$ in the Pub$_{AAC}$. If it is determined that the AAC is illegal, the current authentication process is terminated.

(7) The message encryption key is used to calculate an EncData$_{REQ}$.

(8) The MacTag$_{REQ}$ is calculated, and a calculation process is as described in the embodiment of FIG. 7.

At S1020, the REQ sends a fourth authentication response message REQAuth to the AAC.

The AACAuth includes the Nonce$_{AAC}$, the Nonce$_{REQ}$, the EncData$_{REQ}$, and the MacTag$_{REQ}$. The Nonce$_{REQ}$ and the Nonce$_{AAC}$ are optional fields, and shall respectively be equal to the Nonce$_{REQ}$ generated by the REQ and the Nonce$_{AAC}$ in the AACInit. The to-be-encrypted data of the EncData$_{REQ}$ includes the Nonce$_{REQPub}$; and the Nonce$_{REQPub}$ shall be equal to the Nonce$_{REQPub}$ generated by the REQ.

At S1021, after receiving the REQAuth, the AAC executes the following operations.

(1) If there is the Nonce$_{REQ}$ in the REQAuth, whether the Nonce$_{REQ}$ is the same as the Nonce$_{REQ}$ in the received REQInit is checked. If there is the Nonce$_{AAC}$ in the REQ-Auth, whether the Nonce$_{AAC}$ is the same as the Nonce$_{AAC}$ generated by the AAC is checked.

(2) The MacTag$_{REQ}$ is verified; and a verification process is as described in the embodiment of FIG. 7.

(3) The message encryption key is used to decrypt the EncData$_{REQ}$ by using the symmetric encryption algorithm, so as to obtain the Nonce$_{REQPub}$.

(4) The XOR is performed on the Nonce$_{REQPub}$ and the Pub$_{REQ}$ Nonce$_{REQPub}$, so as to recover the Pub$_{REQ}$.

(5) After the above checking and the verification all pass, the identity authentication result of the REQ is determined according to the Res$_{REQ}$ in the Pub$_{REQ}$. If any one of the above checking and verification is failed, the REQAuth is immediately discarded.

It is to be noted that, the operation of calculating the Sig$_{AAC}$ in S1017 may also be changed to be previously executed in S1006. That is, in S1006, the AAC first generates the Sig$_{AAC}$ by performing signature calculation on the REQInit in the AACVeri, the ID$_{AAC}$ and the Cert$_{AAC}$, and the AACVeri of S1006 further includes the Sig$_{AAC}$. In S1007, the AS-AAC further needs to verify the Sig$_{AAC}$; and then executes follow-up operations after the verification is successful. In this case, the AAC in S1017 does not need to calculate the Sig$_{AAC}$. Correspondingly, the AACAuth of S1018 does not include the Sig$_{AAC}$, the REQ in S1019 is no longer verify the Sig$_{AAC}$, and in this case, the Pub$_{AAC}$ may not include the Cert$_{AAC}$.

In the above embodiments, each message may further carry a hash value HASH$_{X\_Y}$. The hash value HASH$_{X\_Y}$ is obtained by a sender entity X of the message performing calculation on the received latest preamble message sent by an opposite-end entity Y using a HASH algorithm. The hash value HASH$_{X\_Y}$ is used for the opposite-end entity Y to verify whether the entity X receives the whole latest preamble message. The HASH$_{REQ\_AAC}$ represents a hash value that is calculated by the REQ for the received latest preamble message sent by the AAC. The HASH$_{AAC\_REQ}$ represents a hash value that is calculated by the AAC for the received latest preamble message sent by the REQ. The HASH$_{AAC\_AS\-AAC}$ represents a hash value that is calculated by the AAC for the received latest preamble message sent by the AS-AAC. The HASH$_{AS\-AAC\_AAC}$ represents a hash value that is calculated by the AS-AAC for the received latest preamble message sent by the AAC, the HASH$_{AS\-AAC\_AS\-REQ}$ represents a hash value that is calculated by the AS-AAC for the received latest preamble message sent by the AS-REQ. The HASH$_{AS\-REQ\_AS\-AAC}$ represents a hash value that is calculated by the AS-REQ for the received latest preamble message sent by the AS-AAC. If a message currently sent by the sender entity X is the first message of the interaction between the entity X and the entity Y, which means that the entity X has not received any preamble message sent by the opposite-end entity Y. Therefore, the HASH$_{X\_Y}$ in the message may be non-existent or meaningless.

Correspondingly, after the opposite-end entity Y receives the message sent by the entity X, if the message includes the HASH$_{X\_Y}$, the entity Y ignores the HASH$_{X\_Y}$ when the entity Y has not sent any preamble message to the entity X. When the entity Y has sent a preamble message to the entity X, the entity Y uses the hash algorithm to locally calculate the hash value for the latest preamble message sent to the entity X, and compares the hash value with the HASH$_{X\_Y}$ carried in the received message. If the hash value is consistent with the HASH$_{X\_Y}$, the entity Y executes the follow-up operations. Otherwise, the entity Y discards or ends the current authentication process.

In the present invention, for the entity X, the preamble message sent by the opposite-end entity Y to the entity X refers to the message, which is sent to the entity X by the opposite-end entity Y and received by the entity X before the entity X sends the message M to the opposite-end entity Y. The latest preamble message sent by the opposite-end entity Y to the entity X refers to the latest message, which is sent to the entity X by the opposite-end entity Y and received by the entity X before the entity X sends the message M to the opposite-end entity Y. If the message M sent by the entity X to the opposite-end entity Y is the first message of the interaction between the entity X and the entity Y, then before the entity X sends the message M to the opposite-end entity Y, the preamble message sent by the opposite-end entity Y to the entity X does not exist.

The optional fields and the optional operations in the corresponding embodiments in FIG. 7, FIG. 8, FIG. 9 and FIG. 10 are represented by "*" in FIG. 7, FIG. 8, FIG. 9 and FIG. 10 of the drawings of the specification. The sequence of the content included in the messages involved in all of the above embodiments is not limited. In addition, the sequence in which the message receiver operates the relevant messages after receiving the messages, and the sequence in which the message receiver processes the content included in the messages are not limited unless otherwise specified.

Figure 11:
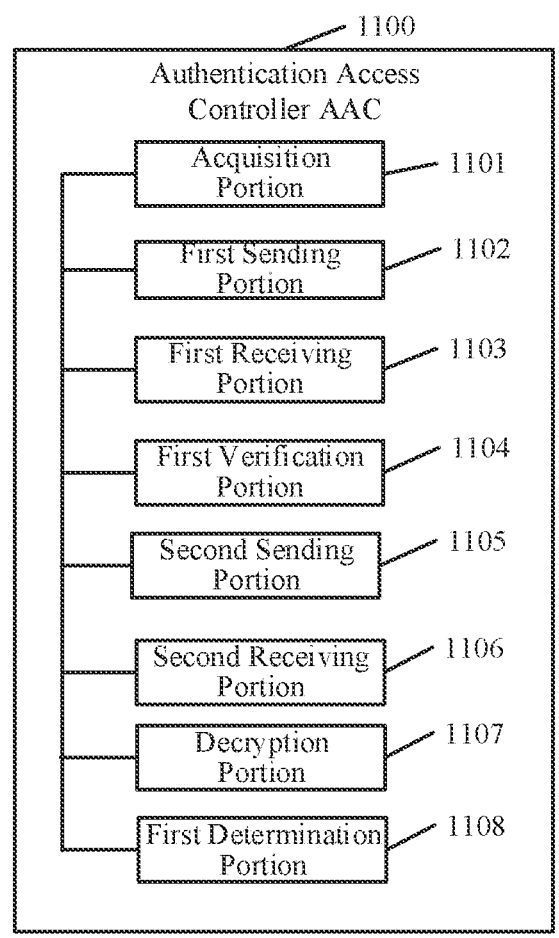
FIG. 11 is a structural block diagram of an AAC according to an embodiment of the present application.

On the basis of the embodiments corresponding to FIG. 1 to FIG. 10, referring to FIG. 11, an embodiment of the present application provides an AAC 1100. The AAC includes an acquisition portion 1101, a first sending portion 1102, a first receiving portion 1103, a first verification portion 1104, a second sending portion 1105, a second receiving portion 1106, a decryption portion 1107, and a first determination portion 1108.

The acquisition portion 1101 is configured to acquire an identity ciphertext message sent by an REQ. The identity ciphertext message includes identity information ciphertext of the REQ, and the identity information ciphertext is generated by encrypting using a public key of an encryption certificate, to-be-encrypted data including a digital certificate of the REQ and a second key.

The first sending portion 1102 is configured to send a first authentication request message to a first AS which is trusted by the AAC. The first authentication request message includes the identity information ciphertext of the REQ and a digital certificate of the AAC.

The first receiving portion 1103 is configured to receive a first authentication response message sent by the first AS. The first authentication response message includes first authentication result information, a first digital signature, second authentication result information ciphertext and a second digital signature; the first authentication result information includes a first verification result for the digital certificate of the AAC; the first digital signature is a digital signature which is generated by a second AS trusted by the REQ performing calculation on to-be-signed data including the first authentication result information, the second authentication result information ciphertext is obtained by encrypting, using the second key, information including second authentication result information: the second authentication result information includes a second verification result for the digital certificate of the REQ; and the second digital signature is a digital signature which is generated by the first AS performing calculation on to-be-signed data including the second authentication result information ciphertext.

The first verification portion 1104 is configured to verify, using a public key of a first AS, the second digital signature.

The second sending portion 1105 is configured to send, when the verification of the second digital signature is successful, a third authentication response message to the REQ. The third authentication response message includes authentication result information ciphertext. The authentication result information ciphertext is generated by encrypting, using a message encryption key, to-be-encrypted data including the first authentication result information and the first digital signature.

The second receiving portion 1106 is configured to receive a fourth authentication response message sent by the REQ. The fourth authentication response message includes second key ciphertext. The second key ciphertext is obtained by encrypting, using the message encryption key, information including the second key.

The decryption portion 1107 is configured to decrypt, using the message encryption key, the second key ciphertext, so as to obtain the second key, and decrypt, using the second key, the second authentication result information ciphertext, so as to obtain the second authentication result information.

The first determination portion 1108 is configured to determine, according to the second verification result in the second authentication result information, an identity authentication result of the REQ.

In some embodiments, the AAC further includes a third sending portion and a calculation portion.

The third sending portion is configured to send a key request message to the REQ. The key request message includes a key exchange parameter of the AAC, and the identity ciphertext message acquired by the acquisition portion 1101 further includes a key exchange parameter of the REQ.

The calculation portion, configured to perform key exchange calculation according to information including the temporary private key corresponding to the key exchange parameter of the AAC and the temporary public key included in the key exchange parameter of the REQ, so as to generate the first key, and calculate, according to the information including the first key, the message encryption key by using the key derivation algorithm.

In some embodiments, the key request message sent by the third sending portion further includes a first random number generated by the AAC; the identity ciphertext message acquired by the acquisition portion 1101 further includes a second random number generated by the REQ. The calculation portion is further configured to calculate, according to information including the first key, the first random number and the second random number, the message encryption key.

In some embodiments, the identity ciphertext message acquired by the acquisition portion 1101 further includes the first random number. The AAC further includes a second verification portion.

The second verification portion is configured to verify consistency of the first random number in the identity ciphertext message and the first random number generated by the AAC. The calculation portion is further configured to calculates the message encryption key if the verification is successful.

In some embodiments, the key request message sent by the third sending portion further includes security capability parameter information supported by the AAC, the identity ciphertext message acquired by the acquisition portion 1101 further includes a specific security policy, and the specific security policy is determined by the REQ according to the security capability parameter information supported by the AAC.

In some embodiments, the key request message sent by the third sending portion further includes the identity identifier of at least one AS trusted by the AAC; and the identity ciphertext message acquired by the acquisition portion 1101 further includes the at least one identity identifier of the at least one AS trusted by the REQ. The AAC further includes a second determination portion.

The second determination portion is configured to determine the first AS according to the at least one identity identifier of the at least one AS trusted by the REQ in the identity ciphertext message and the at least one identity identifier of the at least one AS trusted by the AAC in the key request message.

In some embodiments, the identity ciphertext message acquired by the acquisition portion 1101 further includes the identity identifier of at least one AS trusted by the REQ. The AAC further includes a third determination portion.

The third determination portion is configured to determine the first AS according to the the identity identifier of at least one AS trusted by the REQ and the identity identifier of at least one AS trusted by the AAC.

In some embodiments, the first authentication request message sent by the first sending portion 1102 further includes an identity identifier of the AAC and/or a first random number generated by the AAC; correspondingly, the first authentication response message received by the first receiving portion 1103 further includes the identity identifier of the AAC and/or the first random number.

The AAC further includes a third verification portion.

The third verification portion is configured to verify consistency of the identity identifier of the AAC in the first authentication response message and a self-identity identifier of the AAC, and/or verify consistency of the first random number in the first authentication response message and the first random number generated by the AAC. The first determination portion 1108 is configured to determine the identity authentication result of the REQ after the verification is successful.

In some embodiments, the identity ciphertext message acquired by the acquisition portion 1101 further includes a digital signature of the REQ, and the first determination portion 1108 is further configured to determine whether a verification of the digital signature of the REQ is successful, and, then determine, if it is determined that the verification of the digital signature of the REQ is successful, the identity authentication result of the REQ according to the second verification result.

In some implementations, the first determination portion 1108 is further configured to perform the following operations.

When the second authentication result information that is obtained by the decryption portion 1107 decrypting the second authentication result information ciphertext further includes the digital certificate of the REQ, and the digital signature of the REQ is verified by using the digital certificate of the REQ, whether the verification of the digital signature of the REQ is successful is determined according to a verification result.

And/or, in a case that the second AS verifies the digital signature of the REQ by using the digital certificate of the REQ that is obtained by decrypting the identity information ciphertext of the REQ, if the first receiving portion 1103 receives the first authentication response message, it is determined that the verification of the digital signature of the REQ has passed.

In some implementations, the fourth authentication response message received by the second receiving portion 1106 further includes a digital signature of the REQ, the second authentication result information decrypted by the decryption portion 1107 using the second key further includes a digital certificate of the REQ; and before the first determination portion 1108 determines the identity authentication result of the REQ, the first determination portion 1108 is further configured to verify the digital signature of the REQ by using the digital certificate of the REQ in the first authentication result information, and determine, if the verification is successful, the identity authentication result of the REQ according to the second verification result.

In some implementations, the third authentication response message sent by the second sending portion 1105 further includes a first message integrity check code, and the first message integrity check code is generated by the AAC performing calculation on fields, other than the first message integrity check code, in the third authentication response message using a message integrity check key.

And/or, the fourth authentication response message received by the second receiving portion 1106 further includes a second message integrity check code. The second message integrity check code is generated by the REQ perform calculation on fields, other than the second message integrity check code, in the fourth authentication response message using the message integrity check key, and the AAC further includes a fourth verification portion.

The fourth verification portion is configured to verify the second message integrity check code by using the message integrity check key. The first determination portion 1108 is further configured to determines, according to the second verification result, the identity authentication result of the REQ after the verification is successful.

In some implementations, a message sent to the REQ by the AAC further includes a hash value, which is calculated by the AAC for a received latest preamble message sent by the REQ; and a message sent to the AS-AAC by the AAC further includes a hash value, which is calculated by the AAC for a received latest preamble message sent by the AS-AAC.

Figure 12:
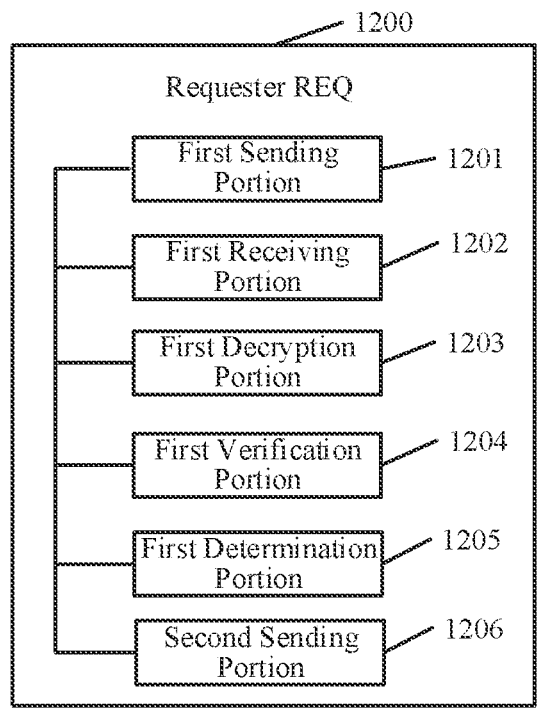
FIG. 12 is a structural block diagram of an REQ according to an embodiment of the present application.

Referring to FIG. 12, an embodiment of the present application provides an REQ 1200. The REQ includes a first sending portion 1201, a first receiving portion 1202, a first decryption portion 1203, and a first verification portion 1204.

The first sending portion 1201 is configured to send an identity ciphertext message to an AAC. The identity ciphertext message includes identity information ciphertext of the REQ. The identity information ciphertext is generated by encrypting, using a public key of an encryption certificate, to-be-encrypted data including a digital certificate of the REQ and a second key.

The first receiving portion 1202 is configured to receive a third authentication response message sent by the AAC. The third authentication response message includes authentication result information ciphertext. The authentication result information ciphertext is generated by encrypting, using a message encryption key, to-be-encrypted data including the first authentication result information and the first digital signature.

The first decryption portion 1203 is configured to decrypt, using the message encryption key, the authentication result information ciphertext, so as to obtain the first authentication result information and the first digital signature.

The first verification portion 1204 is configured to verify the first digital signature by using a public key of the second AS, the first determination portion 1205 is further configured to determine, according to the first verification result in the first authentication result information, an identity authentication result of the AAC if the verification of the first digital signature is successful and the second sending portion 1206 is further configured to send a fourth authentication response message to the AAC when the first determination portion 1205 determines that the identity authentication result of the AAC is legal.

Or, the first verification portion 1204 is configured to verify the first digital signature by using a public key of the second AS. The second sending portion 1206 is further configured to send a fourth authentication response message to the AAC if the verification of the first digital signature is successful. The first determination portion 1205 is further configured to determine, according to the first verification result in the first authentication result information, an identity authentication result of the AAC.

Or, the first verification portion 1204 is configured to verify the first digital signature by using a public key of the second AS. The first determination portion 1205 is further configured to determine, according to the first verification result in the first authentication result information, the identity authentication result of the AAC if the verification of the first digital signature is successful. The second sending portion 1206 is configured to send a fourth authentication response message to the AAC.

The fourth authentication response message includes second key ciphertext, and the second key ciphertext is obtained by encrypting, using the message encryption key, information including the second key.

In some embodiments, the REQ further includes a second receiving portion and a first calculation portion.

The second receiving portion is configured to receive a key request message sent by the AAC. The key request message includes a key exchange parameter of the AAC.

The first calculation portion is configured to perform key exchange calculation according to information including a temporary private key corresponding to a key exchange parameter of the REQ and a temporary public key included in the key exchange parameter of the AAC, so as to generate a first key, and calculate, according to information including the first key, the message encryption key by using a key derivation algorithm.

The identity ciphertext message sent by the first sending portion 1201 further includes a key exchange parameter of the REQ.

In some embodiments, the key request message received by the second receiving portion further includes a first random number generated by the AAC.

The calculation portion is further configured to calculate, according to information including the first key, the first random number and a second random number generated by the REQ, the message encryption key.

The identity ciphertext message sent by the first sending portion 1201 further includes the second random number.

In some embodiments, the key request message received by the second receiving portion further includes security capability parameter information supported by the AAC. The REQ further includes a second determination portion.

The second determination portion is configured to determine, according to the security capability parameter information, a specific security policy used by the REQ.

The identity ciphertext message sent by the first sending portion 1201 further includes the specific security policy.

In some embodiments, the key request message received by the second receiving portion further includes the identity identifier of at least one AS trusted by the AAC. The REQ further includes a third determination portion.

The third determination portion is configured to determine, according to the at least one identity identifier of the at least one AS trusted by the AAC, the identity identifier of at least one AS trusted by the REQ. The identity ciphertext message sent by the first sending portion 1201 further includes the at least one identity identifier of the at least one AS trusted by the REQ.

In some embodiments, the identity ciphertext message sent by the first sending portion 1201 further includes a second random number generated by the REQ, and/or the to-be-encrypted data of the identity information ciphertext in the identity ciphertext message further includes an identity identifier of the REQ and a third key.

Encrypted data of the authentication result information ciphertext in the third authentication response message received by the first receiving portion 1202 further includes the second random number and/or the identity identifier ciphertext of the REQ.

The first decryption portion 1203 is further configured to decrypt, using the message encryption key, the authentication result information ciphertext, so as to obtain the second random number and/or the identity identifier ciphertext of the REQ.

The REQ further includes a second verification portion.

The second verification portion is configured to verify consistency of the second random number obtained by means of decryption and the second random number generated by the REQ, and/or verify, according to the self-identity identifier of the REQ and the third key, the identity identifier ciphertext of the REQ. The first determination portion 1205 is further configured to determine the identity authentication result of the AAC if the verification is successful.

In some embodiments, the first determination portion 1205 is further configured to determine whether verification of A digital signature of the AAC is successful before determining the identity authentication result of the AAC, and determine, according to the first verification result, the identity authentication result of the AAC if it is determined that the verification of the digital signature of the AAC is successful.

In some implementations, the first determination portion 1205 is further configured to perform the following operations.

When a first authentication request message sent by the AAC to a first AS trusted by the AAC further includes a digital signature of the AAC, verifies the digital signature of the AAC is verified by the first AS using the digital certificate of the AAC in the first authentication request message, and if the third authentication response message is received by the first receiving portion 1202, it is determined that the verification of the digital signature of the AAC has passed.

And/or, when the third authentication response message further includes a digital signature of the AAC, and the first authentication result information further includes a digital certificate of the AAC, the first determination portion 1205 verifies, using the digital certificate of the AAC in the first authentication result information, the digital signature of the AAC, and determines, according to a verification result, whether the verification of the digital signature of the AAC is successful.

In some implementations, the third authentication response message received by the first receiving portion 1202 further includes a first message integrity check code, and the first message integrity check code is generated by the AAC, using a message integrity check key, performing calculation on fields, other than the first message integrity check code, in the third authentication response message. The REQ further includes a third verification portion.

The third verification portion is configured to verify, using the message integrity check key, the first message integrity check code. The first determination portion 1205 is configured to determine, according to the first verification result, the identity authentication result of the AAC after the verification of the first message integrity check code is successful.

And/or, the fourth authentication response message sent by the second sending portion 1206 further includes a second message integrity check code, and the second message integrity check code is generated by the REQ, using the message integrity check key, performing calculation on fields, other than the second message integrity check code, in the fourth authentication response message.

In some implementations, a message sent by the REQ to the AAC further includes a hash value, which is calculated by the REQ for a received latest preamble message sent by the AAC.

Figure 13:
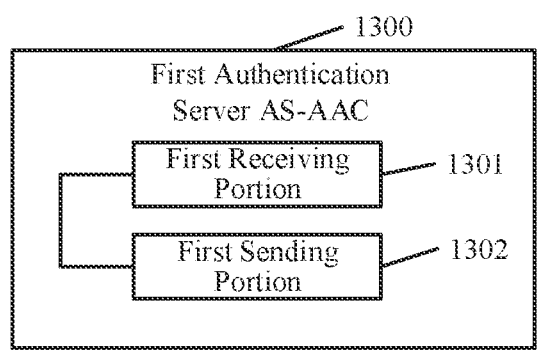
FIG. 13 is a structural block diagram of a first AS (AS-AAC) according to an embodiment of the present application.

Referring to FIG. 13, an embodiment of the present application provides an first authentication server AS-AAC 1300. The first authentication server AS-AAC 1300 is an AS trusted by an AAC, and includes a first receiving portion 1301 and a first sending portion 1302.

The first receiving portion 1301 is configured to receive a first authentication request message sent by the AAC. The first authentication request message includes identity information ciphertext of an REQ and a digital certificate of the AAC. The identity information ciphertext is generated by encrypt, using a public key of an encryption certificate, to-be-encrypted data including a digital certificate of the REQ and a second key.

The first sending portion 1302 is configured to send a first authentication response message to the AAC. The first authentication response message includes first authentication result information, a first digital signature, second authentication result information ciphertext and a second digital signature. The first authentication result information includes a first verification result for the digital certificate of the AAC. The first digital signature is a digital signature which is generated by a second AS trusted by the REQ performing calculation on to-be-signed data including the first authentication result information. The second authentication result information ciphertext is obtained by encrypting, using the second key, information including second authentication result information. The second authentication result information includes a second verification result for the digital certificate of the REQ. The second digital signature is a digital signature which is generated by the first AS performing calculation on to-be-signed data including the second authentication result information ciphertext.

In some implementations, the AS-AAC trusted by the AAC and the AS-REQ trusted by the REQ are the same AS. The AS-AAC further includes a first decryption portion, a first verification portion, and a first generation portion.

The first decryption portion is configured to decrypt, using a private key corresponding to the encryption certificate, the identity information ciphertext of the REQ, so as to obtain the digital certificate of the REQ and the second key.

The first verification portion is configured to perform legality verification on the digital certificate of the AAC, so as to obtain the first verification result, and perform legality verification on the digital certificate of the REQ, so as to obtain a second verification result.

The first generation portion is configured to generate, according to information including the first verification result, the first authentication result information, generate, according to information including the second verification result, the second authentication result information, generate the second authentication result information ciphertext by encrypting, using the second key, the information including the second authentication result information, generate the first digital signature by performing calculation on to-be-signed data including the first authentication result information, generate the second digital signature by performing calculate on to-be-signed data including the second authentication result information ciphertext, and generate, according to information including the first authentication result information, the first digital signature, the second authentication result information ciphertext and the second digital signature, the first authentication response message.

In some implementations, the first AS trusted by the AAC and the second AS trusted by the REQ are two different ASs. The AS-AAC further includes a second verification portion, a second generation portion, a second sending portion, a second receiving portion, a third verification portion, and a third generation portion.

The second verification portion is configured to perform legality verification on the digital certificate of the AAC, so as to obtain the first verification result.

The second generation portion is configured to generate, according to information including the first verification result, the first authentication result information, and generate a third digital signature by performing calculation on to-be-signed data including the first authentication result information and the identity information ciphertext of the REQ.

The second sending portion is configured to send a second authentication request message to the second AS. The second authentication request message includes the first authentication result information, the identity information ciphertext of the REQ and the third digital signature.

The second receiving portion is configured to receive a second authentication response message sent by the second AS. The second authentication response message includes the first authentication result information, the first digital signature, the second authentication result information ciphertext and a fourth digital signature. The fourth digital signature is a digital signature, which is generated by the second AS performing calculation on to-be-signed data including the second authentication result information ciphertext.

The third verification portion is configured to verify, using a public key of the second AS, the fourth digital signature.

The third generation portion is configured to generate the second digital signature by performing calculation on to-be-signed data including the second authentication result information ciphertext and generate, according to the first authentication result information, the first digital signature, the second authentication result information ciphertext and the second digital signature, the first authentication response message when the verification of the fourth digital signature is successful.

In some implementations, a message sent by the first AS to the AAC further includes a hash value, which is calculated by the first AS for a received latest preamble message sent by the AAC; and a message sent by the first AS to the second AS further includes a hash value, which is calculated by the first AS for a received latest preamble message sent by the second AS.

Figure 14:
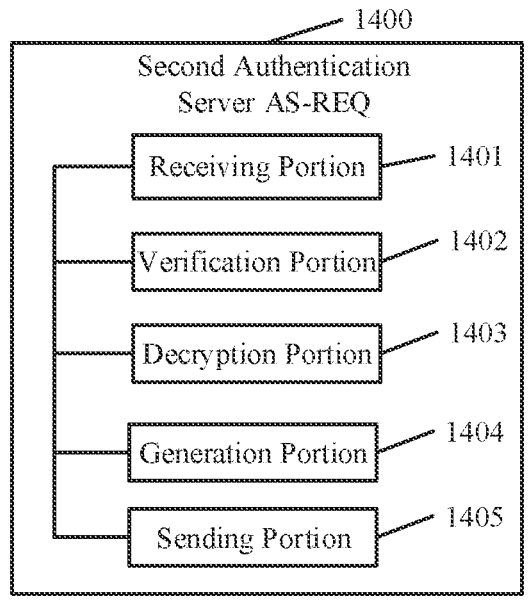
FIG. 14 is a structural block diagram of a second AS (AS-REQ) according to an embodiment of the present application.

Referring to FIG. 14, an embodiment of the present application provides a second authentication server AS-REQ (i.e. a second AS) 1400. The second authentication server AS-REQ 1400 is an authentication server trusted by an REQ. If a first authentication server (i.e. a first AS) trusted by an AAC and the second authentication server trusted by the REQ are two different ASs, the second authentication server AS-REQ 1400 includes a receiving portion 1401, a verification portion 1402, a decryption portion 1403, a generation portion 1404, and a sending portion 1405.

The receiving portion 1401 is configured to receive a second authentication request message sent by the first AS. The second authentication request message includes first authentication result information, identity information ciphertext of the REQ, and a third digital signature, the third digital signature is a digital signature, which is generated by the first AS performing calculation on to-be-signed data including the first authentication result information and the identity information ciphertext of the REQ. The identity information ciphertext is generated by encrypting, using a public key of an encryption certificate, to-be-encrypted data including a digital certificate of the REQ and a second key.

The verification portion 1402 is configured to verify the third digital signature by using a public key of the first AS.

The decryption portion 1403 is configured to decrypt, using the private key corresponding to the encryption certificate, the identity information ciphertext of the REQ when the verification of the third digital signature is successful, so as to obtain the digital certificate of the REQ and the second key.

The verification portion 1402 is further configured to perform legality verification on the digital certificate of the REQ, so as to obtain a second verification result.

The generation portion 1404 is configured to: generate a second authentication result information according to information including the second verification result; generate second authentication result information ciphertext by encrypting, using the second key; information including the second authentication result information; generate a first digital signature by performing calculation on to-be-signed data including the first authentication result information; and generate a fourth digital signature by performing calculation on to-be-signed data including the second authentication result information ciphertext.

The sending portion 1405 is configured to send a second authentication response message to the first AS. The second authentication response message includes the first authentication result information, the first digital signature, the second authentication result information ciphertext, and the fourth digital signature.

In some implementations, a message sent to the AS-AAC by the AS-REQ further includes a hash value, which is calculated by the AS-REQ for a received latest preamble message sent by the AS-AAC.

Figure 15:
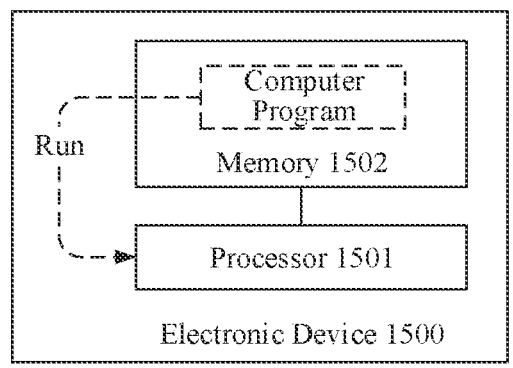
FIG. 15 is a schematic structural diagram of an electronic device according to an embodiment of the present application.

FIG. 15 is a schematic structural diagram of an electronic device according to an embodiment of the present application. As shown in FIG. 15, the electronic device 1500 may be the AAC, the REQ, the AS-AAC, or the AS-REQ. The electronic device 1500 includes a processor 1501 and a memory 1502. The memory 1502 is configured to store a computer program. The processor 1501 is configured to call and run the computer program stored in the memory 1502, so as to execute steps in any one of the above embodiments executed by the AAC, the REQ, the AS-AAC, or the AS-REQ. The processor 1501 and the memory 1502 of the electronic device 1500 may respectively be the processor 1501 and the memory 1502 of the AAC, the REQ, the AS-AAC, or the AS-REQ.

In combination with FIG. 15, the AAC, the REQ, the AS-AAC, or the AS-REQ is respectively exemplarily described below.

An embodiment of the present application further provides an AAC. The AAC includes a processor and a memory. The memory is configured to store a computer program; and the processor is configured to call and run the computer program stored in the memory, so as to execute steps, which are executed by the AAC, in any one of the above embodiments.

It should be understood that, the AAC may implement corresponding flows implemented by the AAC in each method of the embodiments of the present application. For simplicity, elaborations are omitted herein.

An embodiment of the present application further provides an REQ. The REQ includes a processor and a memory. The memory is configured to store a computer program; and the processor is configured to call and run the computer program stored in the memory, so as to execute steps, which are executed by the REQ, in any one of the above embodiments.

It should be understood that, the REQ may implement corresponding flows implemented by the REQ in each method of the embodiments of the present application. For simplicity, elaborations are omitted herein.

An embodiment of the present application further provides an AS-AAC. The AS-AAC is an AS trusted by the AAC, and includes a processor and a memory. The memory is configured to store a computer program; and the processor is configured to call and run the computer program stored in the memory, so as to execute steps, which are executed by the AS-AAC, in any one of the above embodiments.

It should be understood that, the AS-AAC may implement corresponding flows implemented by the AS-AAC, in each method of the embodiments of the present application. For simplicity, elaborations are omitted herein.

An embodiment of the present application further provides an AS-REQ. The AS-REQ is an AS trusted by the REQ. If the AS-AAC trusted by the AAC and the AS-REQ trusted by the REQ are two different ASs, the AS-REQ includes a processor and a memory. The memory is configured to store a computer program; and the processor is configured to call and run the computer program stored in the memory, so as to execute steps, which are executed by the AS-REQ, in any one of the above embodiments.

It should be understood that, the AS-REQ may implement corresponding flows implemented by the AS-REQ in each method of the embodiments of the present application. For simplicity, elaborations are omitted herein.

It is to be noted that, the processor in the AAC, the REQ, the AS-AAC, or the AS-REQ in the embodiments of the present application may further execute the method in other embodiments, for example, other methods in the above method embodiments, and the embodiments of the present application are not limited thereto.

Figure 16:
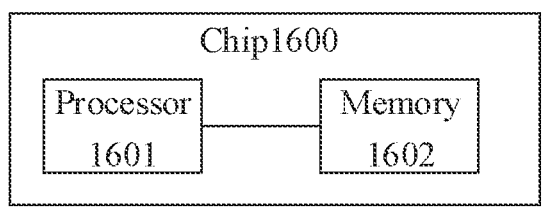
FIG. 16 is a schematic structural diagram of a chip according to an embodiment of the present application.

FIG. 16 is a schematic structural diagram of a chip according to an embodiment of the present application. As shown in FIG. 16, the chip 1600 includes a processor 1601 and a memory 1602. The processor 1601 is configured to call and run a computer program from a memory 1602, to enable:

an AAC having the chip 1600 mounted to execute steps, which are executed by the AAC, in any one of the above embodiments;

or a REQ having the chip 1600 mounted to execute steps, which are executed by the REQ in any one of the above embodiments;

or an AS-AAC having the chip 1600 mounted to execute steps, which are executed by the AS-AAC in any one of the above embodiments.

or an AS-REQ having the chip 1600 mounted to execute steps, which are executed by the AS-REQ in any one of the above embodiments.

The memory 1602 may be included in the chip 1600, or the memory 1602 may be provided outside the chip 1600.

An embodiment of the present application further provides a computer storage medium. The computer storage medium is configured to store a computer program. The computer program enables an AAC to execute steps, which are executed by the AAC in any one of the above embodiments.

Or the computer program enables an REQ to execute steps, which are executed by the REQ in any one of the above embodiments.

Or the computer program enables an AS-AAC to execute steps, which are executed by the AS-AAC in any one of the above embodiments.

Or the computer program enables an AS-REQ execute steps, which are executed by the AS-REQ in any one of the above embodiments.

An embodiment of the present application further provides a computer program. The computer program enables an AAC to execute steps, which are executed by the AAC in any one of the above embodiments.

Or the computer program enables an REQ to execute steps, which are executed by the REQ in any one of the above embodiments.

Or the computer program enables an AS-AAC to execute steps, which are executed by the AS-AAC in any one of the above embodiments.

Or the computer program enables an AS-REQ to execute steps, which are executed by the AS-REQ in any one of the above embodiments.

Those of ordinary skill in the art should know that all or part of the steps of the method embodiment may be implemented by related hardware instructed by means of a program, the program may be stored in a computer storage medium, and the program is executed to execute the steps of the method embodiment. The computer storage medium may be at least one of the following media: a Read-Only Memory (ROM), a Random Access Memory (RAM) and various media that can store program codes, such as a magnetic disk, or an optical disk.

Each component, the chip or the processor in the embodiments of the present application may be an integrated circuit chip and has a signal processing capacity. During implementation, each step of the above method embodiments may be completed by an integrated logical circuit of hardware in the processor or an instruction in a software form. Each component, the chip or the processor may include the integration of any one or at least two of the following: a general processor, an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a Graphics Processing Unit (GPU), a Neural-network Processing Unit (NPU), a controller, a microcontroller, a microprocessor, a programmable logic device, a discrete gate or transistor logic device, and a discrete hardware component.

It is to be noted that, each embodiment in this specification is described in a progressive manner, and reference may be made to each other for the same and similar parts among the various embodiments, and each embodiment focuses on the differences from other embodiments. In particular, for the device and system embodiments, since the device and system embodiments are consistent with and correspond to the method embodiments, the description is relatively simple, and related parts refer to the partial descriptions of the method embodiments. The above described device and system embodiments are merely exemplary. The parts described as separate components may or may not be physically separated. The components displayed as parts may or may not be physical parts, that is, the components may be located in one place, or may be distributed on the plurality of network parts. Part or all of the modules may be selected according to actual requirements to achieve the purposes of the solutions of this embodiment. It can be understood and implemented by those of ordinary skill in the art without creative labor.

The above is only the exemplary implementations of the present application and not intended to limit the scope of protection of the present application. Any variations or replacements apparent to those skilled in the art within the technical scope disclosed by the present application shall fall within the scope of protection of the present application. Therefore, the protection scope of the present application shall be subject to the protection scope of the claims.

INDUSTRIAL APPLICABILITY

The embodiments of the present disclosure disclose an identity authentication method and apparatus, and a device, a chip, a storage medium and a program. Identify information of the REQ is subjected to confidential processing during identity authentication, and when the identify information is transmitted between the REQ and the AAC, the identify information of the AAC is subjected to confidential processing, so as to prevent the identify information of the REQ and the AAC from being exposed during a transmission process, thereby ensuring that an attacker cannot obtain private and sensitive information. Moreover, by means of involving an authentication server, real-time mutual identity authentication between the REQ and the AAC is achieved while the confidentiality of entity identity related information is guaranteed, such that the foundation that only a legal user can access a legal network is laid.

The invention claimed is:

1. An identity authentication method, comprising:
acquiring, by an Authentication Access Controller (AAC), an identity ciphertext message sent by a Requester (REQ), wherein the identity ciphertext message comprises identity information ciphertext of the REQ, and the identity information ciphertext is generated by encrypting, using a public key of an encryption certificate, data to be encrypted comprising a digital certificate of the REQ and a second key, and wherein the REQ is a terminal device;
sending, by the AAC, a first authentication request message to a first Authentication Server (AS) which is trusted by the AAC, wherein the first authentication request message comprises the identity information ciphertext of the REQ and a digital certificate of the AAC;
receiving, by the AAC, a first authentication response message sent by the first AS, wherein the first authentication response message comprises first authentication result information, a first digital signature, second authentication result information ciphertext and a second digital signature, the first authentication result information comprises a first verification result for the digital certificate of the AAC, the first digital signature is a digital signature which is generated by a second AS trusted by the REQ performing calculation on to be signed comprising the first authentication result information, the second authentication result information ciphertext is obtained by encrypting information comprising second authentication result information using the second key, the second authentication result information comprises a second verification result for the digital certificate of the REQ, and the second digital signature is a digital signature which is generated by the first AS performing calculation on data to be signed comprising the second authentication result information ciphertext;
verifying, by the AAC using a public key of the first AS, the second digital signature, in response to the verification of the second digital signature being successful, sending, by the AAC, a third authentication response message to the REQ, wherein the third authentication response message comprises authentication result information ciphertext, and the authentication result information ciphertext is generated by encrypting, using a message encryption key, data to be encrypted comprising the first authentication result information and the first digital signature;
decrypting, by the REQ using the message encryption key, the authentication result information ciphertext, to obtain the first authentication result information and the first digital signature;

verifying, by the REQ using a public key of the second AS, the first digital signature, in response to the verification of the first digital signature being successful, determining, by the REQ according to the first verification result in the first authentication result information, an identity authentication result of the AAC, and in response to the REQ determining that the identity authentication result of the AAC is legal, sending, by the REQ, a fourth authentication response message to the AAC; or verifying, by the REQ using the public key of the second AS, the first digital signature; and in response to the verification of the first digital signature being successful, sending, by the REQ, the fourth authentication response message to the AAC, and determining, by the REQ according to the first verification result in the first authentication result information, the identity authentication result of the AAC; or verifying, by the REQ using the public key of the second AS, the first digital signature; in response to the verification of the first digital signature being successful, determining, by the REQ according to the first verification result in the first authentication result information, the identity authentication result of the AAC; and sending, by the REQ, the fourth authentication response message to the AAC, wherein the fourth authentication response message comprises second key ciphertext, and the second key ciphertext is obtained by encrypting information comprising the second key using the message encryption key; and after the AAC receives the fourth authentication response message, decrypting, by the AAC using the message encryption key, the second key ciphertext, to obtain the second key, decrypting, by the AAC using the second key, the second authentication result information ciphertext, to obtain the second authentication result information, and determining, by the AAC according to the second verification result in the second authentication result information, an identity authentication result of the REQ.

2. The method of claim 1, further comprising: before the AAC acquires the identity ciphertext message sent by the REQ, sending, by the AAC, a key request message to the REQ, wherein the key request message comprises a key exchange parameter of the AAC;

performing, by the REQ according to information including a temporary private key corresponding to a key exchange parameter of the REQ and a temporary public key comprised by the key exchange parameter of the AAC, key exchange calculation, to generate a first key, and calculating, by the REQ according to information comprising the first key, the message encryption key by using a key derivation algorithm, wherein correspondingly, the identity ciphertext message further comprises the key exchange parameter of the REQ; and performing, by the AAC according to information including the temporary private key corresponding to the key exchange parameter of the AAC and the temporary public key comprised by the key exchange parameter of the REQ, key exchange calculation, to generate the first key, and calculating, by the AAC according to the information comprising the first key, the message encryption key by using the key derivation algorithm.

3. The method of claim 2, wherein the key request message further comprises a first random number generated by the AAC, and calculating, by the REQ, the message encryption key comprises:

calculating, by the REQ according to information comprising the first key, the first random number and a second random number generated by the REQ, the message encryption key; and correspondingly, the identity ciphertext message further comprises the second random number, and calculating, by the AAC, the message encryption key comprises:

calculating, by the AAC according to the information comprising the first key, the first random number and the second random number, the message encryption key.

4. The method of claim 3, wherein the identity ciphertext message further comprises the first random number, and the method further comprises, before the AAC calculates the message encryption key, verifying, by the AAC, consistency of the first random number in the identity ciphertext message and the first random number generated by the AAC; and in response to the verification of the consistency being successful, calculating, by the AAC, the message encryption key.

5. The method of claim 2, wherein the key request message further comprises security capability parameter information supported by the AAC, and the method further comprises:

determining, by the REQ according to the security capability parameter information, a specific security policy used by the REQ, wherein the identity ciphertext message further comprises the specific security policy.

6. The method of claim 2, wherein the key request message further comprises an identity identifier of at least one AS trusted by the AAC, and the method further comprises:

determining, by the REQ according to the identity identifier of at least one AS trusted by the AAC, an identity identifier of at least one AS trusted by the REQ; and wherein the identity ciphertext message further comprises the identity identifier of the at least one AS trusted by the REQ, and the method further comprises:

determining, by the AAC according to the identity identifier of the at least one AS trusted by the REQ in the identity ciphertext message and the identity identifier of the at least one AS trusted by the AAC in the key request message, the first AS.

7. The method of claim 1, wherein the identity ciphertext message further comprises an identity identifier of at least one AS trusted by the REQ, and the method further comprises:

determining, by the AAC according to the identity identifier of the at least one AS trusted by the REQ and an identity identifier of at least one AS trusted by the AAC, the first AS.

8. The method of claim 1, wherein data to be encrypted of the identity information ciphertext in the first authentication request message further comprises an identity identifier of the REQ and a third key, and the first authentication request message further comprises an identity identifier of the AAC; or the first authentication request message further comprises a second random number generated by the REQ and a first random number generated by the AAC; or the data to be encrypted of the identity information ciphertext in the first authentication request message further comprises the identity identifier of the REQ and the third key, and the first authentication request message further comprises the identity identifier of the AAC, the second random number generated by the REQ and the first random number generated by the AAC;
correspondingly, the first authentication response message further comprises identity identifier ciphertext of the REQ and the identity identifier of the AAC, and the identity identifier ciphertext of the REQ is generated by encrypting information comprising the identity identifier of the REQ using the third key; or the first authentication response message further comprises the second random number and the first random number; or the first authentication response message further comprises the identity identifier ciphertext of the REQ, the identity identifier of the AAC, the second random number and the first random number, and the identity identifier ciphertext of the REQ is generated by encrypting information comprising the identity identifier of the REQ using the third key:
correspondingly, data to be encrypted of the authentication result information ciphertext in the third authentication response message further comprises the identity identifier ciphertext of the REQ, or the second random number, or the identity identifier ciphertext of the REQ and the second random number; and
the method further comprises:
decrypting, by the REQ using the message encryption key, the authentication result information ciphertext, to further obtain the identity identifier ciphertext of the REQ, or the second random number, or the identity identifier ciphertext of the REQ and the second random number; verifying, according to the identity identifier of the REQ and the third key, the identity identifier ciphertext of the REQ, or verifying consistency of the second random number obtained by means of decryption and the second random number generated by the REQ, or verifying the identity identifier ciphertext of the REQ according to the identity identifier of the REQ and the third key and verifying the consistency of the second random number obtained by means of decryption and the second random number generated by the REQ; and after the verification of the consistency is successful, determining the identity authentication result of the AAC; and
verifying, by the AAC, consistency of the identity identifier of the AAC in the first authentication response message and the identity identifier of the AAC, or verifying, by the AAC, consistency of the first random number in the first authentication response message and the first random number generated by the AAC, or verifying, by the AAC, the consistency of the identity identifier of the AAC in the first authentication response message and the identity identifier of the AAC and consistency of the first random number in the first authentication response message and the first random number generated by the AAC; and after the verification is successful, determining, by the AAC, the identity authentication result of the REQ.

9. The method of claim 1, wherein the identity ciphertext message further comprises a digital signature of the REQ; and the method further comprises: before the AAC determines the identity authentication result of the REQ,
determining, by the AAC, whether verification of the digital signature of the REQ is successful; and in response to determining that the verification of the digital signature of the REQ is successful, determining, by the AAC, the identity authentication result of the REQ according to the second verification result.

10. The method of claim 9, wherein determining, by the AAC, whether the verification of the digital signature of the REQ is successful comprises:
in response to the second authentication result information further comprising the digital certificate of the REQ, verifying, by the AAC using the digital certificate of the REQ in the second authentication result information, the digital signature of the REQ, and determining, according to a verification result, whether the verification of the digital signature of the REQ is successful; or
verifying, by the second AS using the digital certificate of the REQ that is obtained by decrypting the identity information ciphertext of the REQ, the digital signature of the REQ, and in response to the AAC receiving the first authentication response message, determining, by the AAC, that the verification of the digital signature of the REQ has passed.

11. The method of claim 1, wherein the fourth authentication response message further comprises a digital signature of the REQ, and the second authentication result information decrypted by the AAC using the second key further comprises the digital certificate of the REQ; and the method further comprises: before the AAC determines the identity authentication result of the REQ,
verifying, by the AAC using the digital certificate of the REQ in the second authentication result information, the digital signature of the REQ, and in response to the verification of the digital signature of the REQ being successful, determining, by the AAC according to the second verification result, the identity authentication result of the REQ.

12. The method of claim 1, further comprising: before the REQ determines the identity authentication result of the AAC,
determining, by the REQ, whether a verification of a digital signature of the AAC is successful; and in response to determining that the verification of the digital signature of the AAC is successful, determining, by the REQ according to the first verification result, the identity authentication result of the AAC.

13. The method of claim 12, wherein determining, by the REQ, whether the verification of the digital signature of the AAC is successful comprises:
when the first authentication request message further comprises the digital signature of the AAC, verifying, by the first AS using the digital certificate of the AAC in the first authentication request message, the digital signature of the AAC, and in response to the REQ receiving the third authentication response message, determining, by the REQ, that the verification of the digital signature of the AAC has passed; or
when the third authentication response message further comprises the digital signature of the AAC, the first authentication result information further comprises the digital certificate of the AAC, then verifying, by the REQ using the digital certificate of the AAC in the first authentication result information, the digital signature of the AAC, and determining, by the REQ according to a verification result, whether the verification of the digital signature of the AAC is successful.

14. The method of claim 2, wherein the third authentication response message further comprises a first message integrity check code, the first message integrity check code is generated by the AAC performing calculation on fields, other than the first message integrity check code, in the third authentication response message using a message integrity check key, and the method further comprises:
  verifying, by the REQ using the message integrity check key, the first message integrity check code, and after the verification is successful, determining, by the REQ according to the first verification result, the identity authentication result of the AAC;
or,
the fourth authentication response message further comprises a second message integrity check code, the second message integrity check code is generated by the REQ performing calculation on fields, other than the second message integrity check code, in the fourth authentication response message using the message integrity check key, and the method further comprises:
  verifying, by the AAC using the message integrity check key, the second message integrity check code, and after the verification is successful, determining, by the AAC according to the second verification result, the identity authentication result of the REQ;
or
the third authentication response message further comprises the first message integrity check code, the first message integrity check code is generated by the AAC performing calculation on fields, other than the first message integrity check code, in the third authentication response message using a message integrity check key, and the method further comprises:
  verifying, by the REQ using the message integrity check key, the first message integrity check code, and after the verification is successful, determining, by the REQ according to the first verification result, the identity authentication result of the AAC; and
the fourth authentication response message further comprises the second message integrity check code, the second message integrity check code is generated by the REQ performing calculation on fields, other than the second message integrity check code, in the fourth authentication response message using the message integrity check key, and the method further comprises:
  verifying, by the AAC using the message integrity check key, the second message integrity check code, and after the verification is successful, determining, by the AAC according to the second verification result, the identity authentication result of the REQ:
wherein
a manner of generating the message integrity check key of the AAC is the same as that of generating the message encryption key of the AAC, and a manner of generating the message integrity check key of the REQ is the same as that of generating the message encryption key of the REQ.

15. The method of claim 1, wherein the first AS trusted by the AAC and the second AS trusted by the REQ are the same AS, and the method further comprises:
  performing, by the first AS, legality verification on the digital certificate of the AAC, to obtain the first verification result;
  decrypting, by the first AS using a private key corresponding to the encryption certificate, the identity information ciphertext of the REQ, to obtain the digital certificate of the REQ and the second key;
  performing, by the first AS, legality verification on the digital certificate of the REQ, so as to obtain the second verification result;
  generating, by the first AS according to information comprising the first verification result, the first authentication result information;
  generating, by the first AS according to information comprising the second verification result, the second authentication result information;
  encrypting, by the first AS using the second key, information comprising the second authentication result information to generate the second authentication result information ciphertext;
  generating, by the first AS performing calculation on the data to be signed comprising the first authentication result information, the first digital signature;
  generating, by the first AS performing calculation on the data to be signed comprising the second authentication result information ciphertext, the second digital signature; and
  generating, by the first AS according to information comprising the first authentication result information, the first digital signature, the second authentication result information ciphertext and the second digital signature, the first authentication response message.

16. The method of claim 1, wherein the first AS trusted by the AAC and the second AS trusted by the REQ are two different ASs, and the method further comprises:
  performing, by the first AS, legality verification on the digital certificate of the AAC, to obtain the first verification result; generating, according to information comprising the first verification result, the first authentication result information; and generating a third digital signature by performing calculation on the data to be signed comprising the first authentication result information and the identity information ciphertext of the REQ;
  sending, by the first AS, a second authentication request message to the second AS, wherein the second authentication request message comprises the first authentication result information, the identity information ciphertext of the REQ, and the third digital signature;
  verifying, by the second AS using the public key of the first AS, the third digital signature, after the verification is successful, decrypting, by the second AS using a private key corresponding to the encryption certificate, the identity information ciphertext of the REQ, to obtain the digital certificate of the REQ and the second key;
  performing, by the second AS, legality verification on the digital certificate of the REQ, to obtain the second verification result; generating, according to information comprising the second verification result, the second authentication result information; encrypting, using the second key, information comprising the second authentication result information, to obtain the second authentication result information ciphertext; performing calculation on the data to be signed comprising the first authentication result information to generate the first digital signature; and performing calculation on the data to be signed comprising the second authentication result information ciphertext to generate a fourth digital signature;
  receiving, by the first AS, a second authentication response message sent by the second AS, wherein the second authentication response message comprises the first authentication result information, the first digital signature, the second authentication result information ciphertext, and the fourth digital signature; and verifying, by the first AS using the public key of the second AS, the fourth digital signature; and in response to the verification being successful, generating, by the first AS performing calculation on the data to be signed comprising the second authentication result information ciphertext, the second digital signature, and generating, according to the first authentication result information, the first digital signature, the second authentication result information ciphertext, and the second digital signature, the first authentication response message.

17. The method of claim 1, wherein a message sent to the AAC by the REQ further comprises a first hash value, which is calculated by the REQ for a received latest preamble message sent by the AAC;
in response to receiving the message sent by the REQ, the AAC first verifies the first hash value in the received message, and then executes follow-up operations after the verification is successful;
a message sent to the REQ by the AAC further comprises a second hash value, which is calculated by the AAC for a received latest preamble message sent by the REQ;
in response to receiving the message sent by the AAC, the REQ first verifies the second hash value in the received message, and then executes follow-up operations after the verification is successful;
a message sent to the first AS by the AAC further comprises a third hash value, which is calculated by the AAC for a received latest preamble message sent by the first AS;
in response to receiving the message sent by the AAC, the first AS first verifies the third hash value in the received message, and then executes follow-up operations after the verification is successful;
a message sent to the AAC by the first AS further comprises a fourth hash value, which is calculated by the first AS for the received latest preamble message sent by the AAC;
in response to receiving the message sent by the first AS, the AAC first verifies the fourth hash value in the received message, and then executes follow-up operations after the verification is successful;
a message sent to the second AS by the first AS further comprises a fifth hash value, which is calculated by the first AS for a received latest preamble message sent by the second AS;
in response to receiving the message sent by the first AS, the second AS first verifies the fifth hash value in the received message, and then executes follow-up operations after the verification is successful;
a message sent to the first AS by the second AS further comprises a sixth hash value, which is calculated by the second AS for the received latest preamble message sent by the first AS; and
in response to receiving the message sent by the second AS, the first AS first verifies the sixth hash value in the received message, and then executes follow-up operations after the verification is successful.

18. An Authentication Access Controller (AAC), comprising:
a processor; and
a memory for storing a computer program,
wherein the processor is configured to call and run the computer program to perform the following operations:
acquiring an identity ciphertext message sent by a Requester (REQ), wherein the identity ciphertext message comprises identity information ciphertext of the REQ, and the identity information ciphertext is generated by encrypting, using a public key of an encryption certificate, to be encrypted comprising a digital certificate of the REQ and a second key, and wherein the REQ is a terminal device;
sending a first authentication request message to a first Authentication Server (AS) which is trusted by the AAC, wherein the first authentication request message comprises the identity information ciphertext of the REQ and a digital certificate of the AAC;
receiving a first authentication response message sent by the first AS, wherein the first authentication response message comprises first authentication result information, a first digital signature, second authentication result information ciphertext and a second digital signature, the first authentication result information comprises a first verification result for the digital certificate of the AAC, the first digital signature is a digital signature which is generated by a second AS trusted by the REQ performing calculation on data to be signed comprising the first authentication result information, the second authentication result information ciphertext is obtained by encrypting, using the second key, information comprising second authentication result information, the second authentication result information comprises a second verification result for the digital certificate of the REQ, and the second digital signature is a digital signature which is generated by the first AS performing calculation on data to be signed comprising the second authentication result information ciphertext;
verifying, using a public key of the first AS, the second digital signature;
sending a third authentication response message to the REQ in response to the verification of the second digital signature being successful, wherein the third authentication response message comprises authentication result information ciphertext, and the authentication result information ciphertext is generated by encrypting, using a message encryption key, data to be encrypted comprising the first authentication result information and the first digital signature;
receiving a fourth authentication response message sent by the REQ, wherein the fourth authentication response message comprises second key ciphertext, and the second key ciphertext is obtained by encrypting, using the message encryption key, information comprising the second key;
decrypting, using the message encryption key, the second key ciphertext, to obtain the second key, and decrypting, using the second key, the second authentication result information ciphertext, to obtain the second authentication result information; and
determining, according to the second verification result in the second authentication result information, an identity authentication result of the REQ.

19. A Requester (REQ), the REQ is a terminal device, comprising:
a processor; and
a memory for storing a computer program,
wherein the processor is configured to call and run the computer program to perform the following operations:
sending an identity ciphertext message to an Authentication Access Controller (AAC), wherein the identity ciphertext message comprises identity information ciphertext of the REQ, and the identity information ciphertext is generated by encrypting, using a public key of an encryption certificate, data to be encrypted comprising a digital certificate of the REQ and a second key;

receiving a third authentication response message sent by the AAC, wherein the third authentication response message comprises authentication result information ciphertext, and the authentication result information ciphertext is generated by encrypting, using a message encryption key, data to be encrypted comprising first authentication result information and a first digital signature;

decrypting, using the message encryption key, the authentication result information ciphertext, to obtain the first authentication result information and the first digital signature; and verifying the first digital signature by using a public key of the second Authentication Server (AS);

determining, according to a first verification result in the first authentication result information, an identity authentication result of the AAC in response to the verification of the first digital signature being successful;

sending a fourth authentication response message to the AAC in response to determining that the identity authentication result of the AAC is legal; or verifying the first digital signature by using the public key of the second AS; sending the fourth authentication response message to the AAC in response to the verification of the first digital signature being successful; and determining, according to the first verification result in the first authentication result information, the identity authentication result of the AAC; or verifying the first digital signature by using the public key of the second AS; determining, according to the first verification result in the first authentication result information, the identity authentication result of the AAC in response to the verification of the first digital signature being successful; and sending the fourth authentication response message to the AAC, wherein the fourth authentication response message comprises second key ciphertext, and the second key ciphertext is obtained by encrypting information comprising the second key using the message encryption key.

20. A first Authentication Server (AS), being a first AS trusted by an Authentication Access Controller (AAC), and comprising:

a processor; and a memory for storing a computer program, wherein the processor is configured to call and run the computer program to perform the following operations:

receiving a first authentication request message sent by the AAC, wherein the first authentication request message comprises identity information ciphertext of a Requester (REQ) and a digital certificate of the AAC, and the identity information ciphertext is generated by encrypting, using a public key of an encryption certificate, data to be encrypted comprising a digital certificate of the REQ and a second key, and wherein the REQ is a terminal device; and sending a first authentication response message to the AAC, wherein the first authentication response message comprises first authentication result information, a first digital signature, second authentication result information ciphertext and a second digital signature, the first authentication result information comprises a first verification result for the digital certificate of the AAC, the first digital signature is a digital signature which is generated by a second AS trusted by the REQ performing calculation on data to be signed comprising the first authentication result information, the second authentication result information ciphertext is obtained by encrypting, using the second key, information comprising second authentication result information, the second authentication result information comprises a second verification result for the digital certificate of the REQ, and the second digital signature is a digital signature which is generated by the first AS performing calculation on data to be signed comprising the second authentication result information ciphertext.

21. A second Authentication Server (AS), being an AS trusted by a Requester (REQ) which is a terminal device, in a case that a first AS trusted by an Authentication Access Controller (AAC) and the second AS trusted by the REQ are two different ASs, the second AS comprises:

a processor; and a memory for storing a computer program, wherein the processor is configured to call and run the computer program to perform the following operations:

receiving a second authentication request message sent by the first AS, wherein the second authentication request message comprises first authentication result information, identity information ciphertext of the REQ, and a third digital signature, the third digital signature is a digital signature, which is generated by the first AS performing calculation on data to be signed comprising the first authentication result information and the identity information ciphertext of the REQ, and the identity information ciphertext is generated by encrypting, using a public key of an encryption certificate, data to be encrypted comprising a digital certificate of the REQ and a second key;

verifying the third digital signature by using a public key of the first AS;

decrypting, using a private key corresponding to the encryption certificate, the identity information ciphertext of the REQ in response to the verification of the third digital signature being successful, to obtain the digital certificate of the REQ and the second key, performing legality verification on the digital certificate of the REQ, to obtain a second verification result;

generating second authentication result information according to information comprising the second verification result; generating second authentication result information ciphertext by encrypting, using the second key, information comprising the second authentication result information; generating a first digital signature by performing calculation on the data to be signed comprising the first authentication result information; and generating a fourth digital signature by performing calculation on data to be signed comprising the second authentication result information ciphertext; and sending a second authentication response message to the first AS, wherein the second authentication response message comprises the first authentication result information, the first digital signature, the second authentication result information ciphertext, and the fourth digital signature.

\* \* \* \* \*